(12) United States Patent
Tabata et al.

(10) Patent No.: US 8,038,571 B2
(45) Date of Patent: Oct. 18, 2011

(54) CONTROL DEVICE FOR VEHICULAR DRIVE APPARATUS

(75) Inventors: Atsushi Tabata, Okazaki (JP); Yuji Inoue, Nisshin (JP); Atsushi Kamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 835 days.

(21) Appl. No.: 11/993,257

(22) PCT Filed: Jun. 22, 2006

(86) PCT No.: PCT/JP2006/312953
§ 371 (c)(1),
(2), (4) Date: Dec. 20, 2007

(87) PCT Pub. No.: WO2006/137591
PCT Pub. Date: Dec. 28, 2006

(65) Prior Publication Data
US 2010/0151988 A1 Jun. 17, 2010

(30) Foreign Application Priority Data

Jun. 22, 2005 (JP) .................................. 2005-182675
Jun. 24, 2005 (JP) .................................. 2005-184438
Jun. 24, 2005 (JP) .................................. 2005-185738

(51) Int. Cl.
*B60K 1/02* (2006.01)

(52) U.S. Cl. .......................................................... 477/3
(58) Field of Classification Search ........ 477/3; 180/65.7
See application file for complete search history.

(56) References Cited

U.S. PATENT DOCUMENTS

| 5,730,675 A | * | 3/1998 | Yamaguchi | 475/2 |
| 5,771,478 A | | 6/1998 | Tsukamoto et al. | |
| 5,775,449 A | | 7/1998 | Moroto et al. | |
| 5,982,045 A | | 11/1999 | Tabata et al. | |
| 6,053,833 A | | 4/2000 | Masaki | |
| 6,146,302 A | | 11/2000 | Kashiwase | |

(Continued)

FOREIGN PATENT DOCUMENTS

JP 7-336810 12/1995

(Continued)

*Primary Examiner* — Dirk Wright
(74) *Attorney, Agent, or Firm* — Oblon, Spivak, McClelland, Maier & Neustadt, L.L.P.

(57) ABSTRACT

A control device is provided for a vehicular drive apparatus, having a differential mechanism and a transmission, for miniaturizing the differential mechanism and/or providing improved fuel economy while preventing a busy shift. With the provision of a switching clutch C0 or a switching brake B0, a transmitting mechanism 10 can be placed in a continuously variable shifting state and a step-variable shifting state whereby the vehicular drive apparatus has combined advantages including a fuel saving effect of the transmission, enabled to electrically change a gear ratio, and a high transmitting efficiency of a gear type transmitting device enabled to mechanically transmit drive power. With a total speed ratio γ T set to a lower vehicle speed gear ratio than that for a given running state, if a required drive force or a drive force source brake is unavailable or if load torque of an electric motor is deviated from an allowable range, switching control mean 50 switches a differential portion 11 to the step-variable shifting state for thereby obtaining larger drive force or drive force source brake than those for the given running state without causing load torque of the electric motor from deviating from the allowable range while preventing the busy shift.

18 Claims, 25 Drawing Sheets

U.S. PATENT DOCUMENTS

| | | |
|---|---|---|
| 6,248,036 B1 | 6/2001 | Masaki |
| 6,629,024 B2 * | 9/2003 | Tabata et al. ............ 701/22 |
| 6,868,674 B2 * | 3/2005 | Tabata et al. ............ 60/706 |
| 6,953,409 B2 | 10/2005 | Schmidt et al. |
| 7,243,010 B2 * | 7/2007 | Tabata et al. ............ 701/22 |
| 7,481,737 B2 * | 1/2009 | Tabata et al. ............ 477/3 |
| 7,901,319 B2 * | 3/2011 | Tabata et al. ............ 477/3 |
| 2001/0008859 A1 | 7/2001 | Masaki |
| 2005/0204537 A1 | 9/2005 | Reed et al. |
| 2005/0204861 A1 | 9/2005 | Reed et al. |
| 2005/0204862 A1 | 9/2005 | Reed et al. |
| 2005/0205335 A1 | 9/2005 | Reed et al. |
| 2005/0205373 A1 | 9/2005 | Reed et al. |
| 2009/0036263 A1 * | 2/2009 | Iwase et al. ............ 477/3 |
| 2009/0037061 A1 * | 2/2009 | Tabata et al. ............ 701/55 |

FOREIGN PATENT DOCUMENTS

| | | |
|---|---|---|
| JP | 8-135762 A | 5/1996 |
| JP | 8-251708 A | 9/1996 |
| JP | 10-2241 A | 1/1998 |
| JP | 63-125446 A | 5/1999 |
| JP | 11 217025 | 8/1999 |
| JP | 11-301291 A | 11/1999 |
| JP | 2000 2327 | 1/2000 |
| JP | 2000-145951 | 5/2000 |
| JP | 2000 346187 | 12/2000 |
| JP | 2001 339805 | 12/2001 |
| JP | 2001-342933 A | 12/2001 |
| JP | 2002 89307 | 3/2002 |
| JP | 2002-89688 A | 3/2002 |
| JP | 2003 104090 | 4/2003 |
| JP | 2003 127679 | 5/2003 |
| JP | 2003 301731 | 10/2003 |
| JP | 2004 50910 | 2/2004 |
| JP | 2004-150507 A | 5/2004 |
| JP | 2004 270679 | 9/2004 |
| JP | 2004 278317 | 10/2004 |
| JP | 2005-132181 | 5/2005 |
| JP | 2006 2913 | 1/2006 |
| JP | 2006 17199 | 1/2006 |
| JP | 2006 44582 | 2/2006 |
| JP | 2006 118667 | 5/2006 |
| JP | 2006 220235 | 8/2006 |

* cited by examiner

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | TOTAL 4.76 |
| R |  |  | ○ |  |  |  | ○ | 3.209 |  |
| N | ○ |  |  |  |  |  |  |  |  |

○ ENGAGED
◎ ENGAGED IN STEP-VARIABLE, RELEASED IN CONTINUOUSLY-VARIABLE

|  | C0 | C1 | C2 | B0 | B1 | B2 | SPEED RATIO | STEPPING RATIO |
|---|---|---|---|---|---|---|---|---|
| 1st | ◎ | ○ |  |  |  | ○ | 2.804 | 1.54 |
| 2nd | ◎ | ○ |  |  | ○ |  | 1.531 | 1.53 |
| 3rd | ◎ | ○ | ○ |  |  |  | 1.000 | 1.42 |
| 4th |  | ○ | ○ | ◎ |  |  | 0.705 | TOTAL 3.977 |
| R |  |  | ○ |  |  | ○ | 2.393 |  |
| N | ○ |  |  |  |  |  |  |  |

○ ENGAGED
◎ ENGAGED IN STEP-VARIABLE,
  RELEASED IN CONTINUOUSLY-VARIABLE

FIG.28
(a) 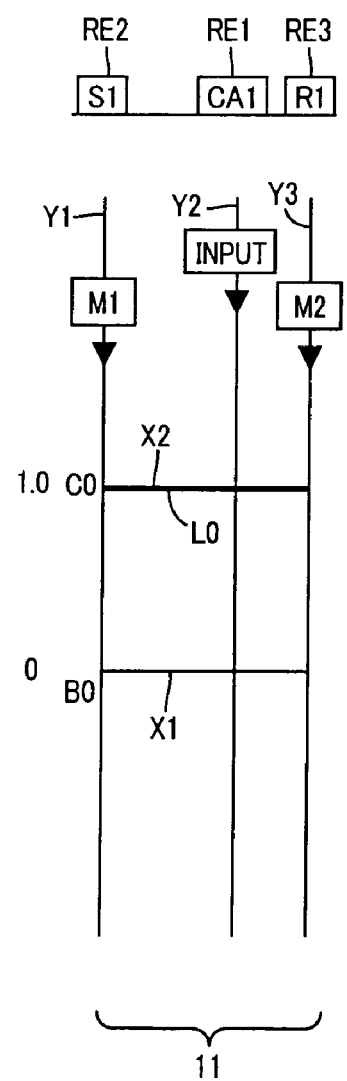
(b) 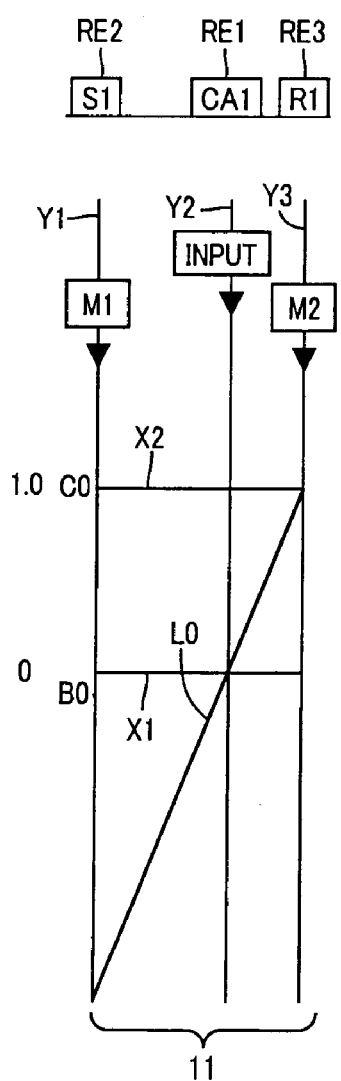

CONTROL DEVICE FOR VEHICULAR DRIVE APPARATUS

TECHNICAL FIELD

The present invention relates to vehicular drive apparatuses each having a differential mechanism operative to perform a differential action and an electric motor and, more particularly, to a technology of miniaturizing the electric motor or the like.

BACKGROUND ART

There has heretofore been known a drive apparatus of a vehicle including a differential device through which an output of a drive power source, such as an engine or the like, is distributed to a first electric motor and an output member, and a second electric motor disposed between the output member and drive wheels. Such drive apparatus for a hybrid vehicle is disclosed for example in a Patent Documents 1, 3 and 5. It includes a differential mechanism being comprised of a planetary gear unit and performing a differential action for mechanically transmitting a major part of power outputted from the engine to drive wheels. A remaining part of power from the engine is electrically transmitted from the first electric motor to the second electric motor using an electrical path.

Thus, the drive apparatus operates a transmission of which shifting ratio is electrically changed, for example as an electrically controlled continuously variable automatic transmission. The drive apparatus is controlled by the control device so that the vehicle runs with the optimum operation state of the engine, thus improving fuel consumption, i.e., mileage.

Patent Document 1: JP 2003-127679A
Patent Document 2: JP 2001-339805A
Patent Document 3: JP 2003-301731A
Patent Document 4: JP 2002-89307A
Patent Document 5: JP 2004-270679A In general, the continuously variable transmission has heretofore been known as a device for improving fuel consumption of a vehicle. A gear type power transmitting device such as a step variable automatic transmission has heretofore been known as a device having high transmitting efficiency. However, no power transmitting mechanism having such combined advantages has been put into practical use yet. For instance, the hybrid vehicle drive apparatus, disclosed in the above Patent Publication 1, includes the electrical path through which electric energy is transmitted from the first electric motor to the second electric motor, that is, a transmitting path through which a part of the vehicle drive force is transmitted in the form of electric energy. This inevitably causes the first electric motor to be made large-size with an increase in an output of the engine. Also, the second electric motor, driven with electric energy output from the first electric motor, is caused to increase in size. Thus, an issue arises with the occurrence of an increase in size of the drive apparatus.

Alternatively, since a part of the engine output is transmitted to the drive wheel after converted into electric energy once, the fuel consumption may be worsened depending on the running condition of the vehicle such as the high speed running. Similar problem occurs when the above power distributing device is used as the transmission of which shifting ratio is changed electrically, for example the electrically controlled CVT.

Meanwhile, with the drive apparatus for hybrid vehicle described above, there has heretofore been known a structure including a step-variable transmission disposed in a power transmitting path between an output member of a differential mechanism (electrically controlled continuously variable transmission) and drive wheels with a view to reducing a demanded capacity of the second electric motor when high drive torque is required to miniaturize the second electric motor. With such a vehicular drive apparatus, the output of the power drive force source is transferred through the two transmitting mechanisms such as the electrically controlled continuously variable transmission and the step-variable transmission, while establishing the total speed ratio of the drive apparatus based on the respective gear ratios of these transmitting mechanisms.

Further, in general, when a need arises for a vehicle drive force or engine brake greater than those required for the running of the vehicle on an even road, i.e., during the running of the vehicle on an ascending/descending road, a vehicular drive apparatus, having the step-variable transmission which is independently provided, operates so as to set a low vehicle speed side gear ratio (low gear) that is relatively larger in gear ratio than that set for the running of the vehicle on the even road or flat road. This allows the low gear to be maintained in phase up to a high vehicle speed in comparison to the gear position maintained for the vehicle running on the even road, thereby suppressing an upshift for thereby preventing a busy shift.

This similarly applies to a phase wherein the drive apparatus establishes the total speed ratio based on the respective gear ratios of the electrically controlled continuously variable transmission and the step-variable transmission. During the running of the vehicle on the ascending/descending road, for instance, the total speed ratio is set to the lower vehicle speed side gear ratio than that set for the running of the vehicle on the even road, suppressing the upshift for thereby preventing the busy shift.

However, with the electrically controlled continuously variable transmission functioning as the electrically controlled CVT, the first electric motor has a need to bear reaction torque depending on engine torque. Therefore, under a situation where the vehicle runs under high load of the engine like when the vehicle runs on the ascending road, reaction torque (load torque) born with the first electric motor increases, resulting in likelihood of a shortage occurring in the drive force depending on the performance of the first electric motor. From another point of view, in order to preclude the shortage in drive force during the running of the vehicle on the ascending road, the first electric motor needs to be increased in size.

Further, during the running of the vehicle on the descending road, the second electric motor is rendered operative as an electric power generator to convert kinetic energy to electric energy that is collected in a battery while achieving a regenerative brake due to power-generating resistance of the second electric motor for thereby obtaining a requisite drive force source brake. However, suppressing the upshift has resulted in likelihood of an increase in load torque of the second electric motor. Further, under a situation where the regeneration amount is unavailable to increase due to a full charge or the like of the battery, there has been a probability with a difficulty of obtaining the required drive force source brake.

Given this situation, with the vehicular drive apparatus in which the drive apparatus, enabled to address the issue of the drive apparatus for hybrid vehicle disclosed in Patent Publication 1, further includes an automatic transmission, it has been required to have a requisite drive force and drive force source brake while preventing the busy shift.

Further, with the hybrid vehicle disclosed in Patent Publication 3, the second electric motor is rendered operative as the electric power generator during the speed reduction running. This causes kinetic energy of the vehicle to be converted to electric energy for recovery to the battery, while causing power-generating resistance of the second electric motor to achieve the regeneration brake. When this takes place, a fuel supply to the engine is shut off causing the engine rotation speed to be zeroed or nearly zeroed for a reduction in engine drag for thereby increasing the regeneration amount. However, if the regeneration amount is unavailable to increase due to the full charge of the battery, there has been a probability with a difficulty occurring in obtaining a given drive condition and a target speed reduction magnitude set by a driver.

With the technology disclosed in Patent Publication 4, during the speed reduction running i.e., on-speed reduction running of the vehicle having an in-cylinder pressure variation suppression-based cylinder number variable engine, all the cylinders of the engine are brought into compression states when no regeneration brake is applied, thereby obtaining an engine brake effect. Meanwhile, when the regeneration brake is initiated, a part of the engine cylinders remaining inoperative are brought into in-cylinder pressure variation suppression states, i.e., decompression states. This causes a reduction in the engine braking effect to obtain a similar braking effect regardless of the existence or non-existence of the regeneration. However, changing the cylinder number of the engine and the regeneration amount allows the speed reduction magnitude to be controlled, resulting in likelihood of a difficulty arising in obtaining the given drive condition and the target speed reduction magnitude set by the driver.

Further, even with the vehicular drive apparatus, disclosed in Patent Publication 3, which is structured to address the issue of the drive apparatus for hybrid vehicle, likewise, there has been likelihood of a difficulty arising in obtaining the given drive condition and the target speed reduction magnitude set by the driver during the speed reduction running.

Patent Publication 5 discloses a technology of changing a cubic capacity of a combustion chamber to decrease a compression ratio of the engine during a regeneration for decreasing friction (drag) torque of the engine to improve a regeneration efficiency of an electric motor. Drag torque of the engine also varies depending on the engine rotation speed and it is likely that the lower the engine rotation speed, the less will be drag torque of the engine. So, if a uniform regeneration amount is set for the speed reduction running to allow the electric motor to perform the regeneration in accord with an engine state in increased engine drag torque, that is, in other words, a lessened level of the regeneration amount achieved by the electric motor, there has been likelihood of the occurrence of a deterioration in fuel consumption. This is because the regeneration amount is unavailable to increase even under the engine state available to obtain the increased regeneration amount.

Even with the vehicular drive apparatus structured to address the issue of the drive apparatus for hybrid vehicle disclosed in Patent Publication 3, there has been likelihood that if the electric motor uniformly performs the regeneration during the speed reduction running, the regeneration amount is unavailable to increase with a resultant deterioration in fuel consumption.

The present invention has been completed on the ground of the circumstances, described above, and has a first object to provide a control device for a vehicular drive apparatus, including an electrically controlled continuously variable shifting portion, composed of a differential mechanism operative to distribute an output of an engine to a first electric motor and a transmitting member and a second electric motor disposed in a power transmitting path between the transmitting member and drive wheels, and a transmission forming a part of the power transmitting path, which can be miniaturized in structure and/or have improved fuel consumption while preventing a busy shift.

It is a second object of the present invention to provide a control device for a vehicular drive apparatus, including a differential mechanism, operative to perform a differential action to distribute an output of an engine to a first electric motor and an output shaft, and a second electric motor disposed in a power transmitting path between the differential mechanism and drive wheels, which can be miniaturized in structure and/or have improved fuel consumption while improving a control performance on a speed reduction magnitude during the speed reduction running i.e., slow down running or deceleration running.

It is a third object of the present invention to provide a control device for a vehicular drive apparatus, including a differential mechanism, operative to perform a differential action to distribute an output of an engine to a first electric motor and an output shaft, and a second electric motor disposed in a power transmitting path between the differential mechanism and drive wheels, which can be miniaturized in structure and/or have improved fuel consumption while improving a fuel consumption during the speed reduction running.

DISCLOSURE OF THE INVENTION

According to the invention recited in the claim 1 or 2, there is provided a control device for a vehicular drive apparatus, having (a) a continuously variable shifting portion including a differential mechanism for distributing an output of an engine to a first electric motor and a transmitting member and a second electric motor disposed in a power transmitting path between the transmitting member and drive wheels to be operative as an electrically controlled continuously variable transmission, and a transmission portion or shifting portion forming a part of the power transmitting path, the control device comprising: (b) a differential state switch device disposed in the differential mechanism and operative to selectively switch the continuously variable shifting portion in a continuously variable shifting state enabling the continuously variable shifting portion to perform an electrically controlled continuously variable shifting operation and a non-continuously variable shifting state disenabling the electrically controlled continuously variable shifting operation of the continuously variable shifting portion; (c) shifting control mean or a shifting switch portion operative to set a total speed ratio, defined with the continuously variable shifting portion and the shifting portion, to a lower vehicle speed side gear ratio than that defined for a given running condition of a vehicle when a need arises for a greater vehicle drive force or drive force source brake than those for the given running condition of the vehicle; and (d) switching control means or a switching control portion operative to switch the continuously variable shifting portion from the continuously variable shifting state to the non-continuously variable shifting state (i) if a required vehicle drive force or drive force source brake is unavailable or (ii) if load torques of the first electric motor and/or the second electric motor are deviated from allowable ranges when the shifting control means sets the total speed ratio to the lower vehicle speed side gear ratio than that defined for the given running condition of the vehicle.

With such a structure, the differential state switch device selectively switches the continuously variable shifting portion of the drive apparatus to be placed in the continuously variable shifting state enabling the electrically controlled continuously variable shifting operation and the non-continuously variable shifting state disenabling the electrically controlled continuously variable shifting operation. Accordingly, the drive apparatus can have combined advantages of an improved fuel saving effect of the transmission, operative to electrically change the gear ratio, and a high transmitting efficiency of a gear type transmitting device operative to mechanically transmit drive power.

For instance, in a normal output region of the engine with a vehicle running at a low/intermediate speed and low/intermediate output, placing the continuously variable shifting portion in the continuously variable shifting state ensures a fuel saving performance of the vehicle. In addition, with the continuously variable shifting portion placed in the non-continuously variable shifting state during the running of the vehicle at the high speed, the output of the engine is transferred mainly through a mechanical power transmitting path to the drive wheels. This minimizes a loss in conversion between the vehicle drive force, occurring when the continuously variable shifting portion is caused to operate as a transmission for the speed ratio to be electrically changed, and electrical energy, resulting in improvement in fuel consumption.

Moreover, with the continuously variable shifting portion placed in the non-continuously variable shifting state during the running of the vehicle at the high output, the continuously variable shifting portion is actuated as the transmission to electrically change the speed ratio in a region under which the vehicle runs at the low/intermediate speed and low/intermediate output. This enables a reduction in a maximal value of electric energy, for the electric motor to generate, i.e., electric energy for the electric motor to transfer, resulting in a further minimization of the electric motor or the vehicle drive apparatus incorporating such an electric motor.

With the vehicular drive apparatus having the continuously variable shifting portion structured to be switchable to the continuously variable shifting state and the non-continuously variable shifting state, further, sometimes a need arises for the greater vehicle drive force or drive force source brake than those required for the given running condition of the vehicle. In this moment, if the shifting control means sets the total speed ratio to the lower vehicle speed gear ratio than that set for the given running condition of the vehicle, sometimes the required vehicle drive force or drive force source brake is unavailable or load torques of the first electric motor and/or the second electric motor are caused to deviate from the allowable ranges.

Even under such cases, the switching control means switches the continuously variable shifting portion from the continuously variable shifting state to the non-continuously variable shifting state, and no need arises for the first electric motor to bear reaction torque depending on output torque of the engine (hereinafter referred to as "engine torque"). Consequently, the engine can generate increased engine torque regardless of a torque capacity of the first electric motor, thereby obtaining a required drive force.

Further, since the engine rotation speed is bound with a vehicle speed, engine brake torque can be generated depending on the vehicle speed and the total speed ratio. This allows the required drive force source brake to be obtained without causing any increase in regeneration torque of the second electric motor. That is, the drive apparatus can have the greater vehicle drive force or drive force source brake than those required for the given running condition of the vehicle while preventing the busy shift without causing load torques of the first electric motor and/or the second electric motor from deviating from the allowable ranges.

With the invention recited in the claim 3, the expression "when the need arises for the greater vehicle drive force or drive force source brake than those required for the given running condition of the vehicle" refers to a phase in which the vehicle runs on an ascending road or a descending road. With such an arrangement, the drive apparatus can obtain the required vehicle drive force or drive force source brake during the running of the vehicle on the ascending road or the descending road.

According to the invention recited in the claim 4, there is provided a control device for a vehicular drive apparatus, having (a) a continuously variable shifting portion including a differential mechanism for distributing an output of an engine to a first electric motor and a transmitting member and a second electric motor disposed in a power transmitting path between the transmitting member and drive wheels to be operative as an electrically controlled continuously variable transmission, the control device comprising: (b) a differential action limitation device disposed in the differential mechanism for limiting a differential action of the differential mechanism to thereby limit an operation of the continuously variable shifting portion as the electrically controlled continuously variable transmission; and (c) engine brake control means operative to limit the differential action of the differential mechanism in order to obtain brake torque with engine brake during a speed reduction running.

With such a structure, the differential action limitation device is placed in the differential state in which no the differential action of the differential mechanism is limited to allow the differential action to be initiated. This causes the continuously variable shifting portion of the vehicular drive apparatus to be placed in the continuously variable shifting state to be operative to perform the electrically controlled continuously variable shifting operation. Besides, the differential action limitation device limits the differential action of the differential mechanism and the operation of the electrically controlled continuously variable transmission is limited. Therefore, the non-differential state, for instance, a locked state is placed with no differential action being initiated, resulting in a non-continuously variable shifting state, inoperative to perform the electrically controlled continuously variable shifting operation, for instance, a step-variable shifting state. As a result, the drive apparatus can have combined advantages of an improved fuel saving effect of the transmission, in which the gear ratio is electrically changed, and a high transmitting efficiency of the gear-type transmitting device in which drive power is mechanically transferred.

For instance, in a normal output region of the engine with a vehicle running at a low/intermediate speed and low/intermediate output, placing the continuously variable shifting portion in the continuously variable shifting state ensures a fuel saving performance of the vehicle. In addition, with the continuously variable shifting portion placed in the non-continuously variable shifting state during the running of the vehicle at the high speed, the output of the engine is transferred mainly through a mechanical power transmitting path to the drive wheels. This minimizes a loss in conversion between the vehicle drive force, occurring when the continuously variable shifting portion is caused to operate as a transmission for the speed ratio to be electrically changed, and electrical energy, resulting in improvement in fuel consumption.

Moreover, with the continuously variable shifting portion placed in the non-continuously variable shifting state during the running of the vehicle at the high output, the continuously variable shifting portion is actuated as the transmission to electrically change the speed ratio in a region under which the vehicle runs at the low/intermediate speed and low/intermediate output. This enables a reduction in a maximal value of electric energy, for the electric motor to generate, i.e., electric energy for the electric motor to transfer, resulting in a further minimization of the electric motor or the vehicle drive apparatus incorporating such an electric motor.

With the vehicular drive apparatus having the continuously variable shifting portion whose operation as the electrically controlled continuously variable transmission can be limited, the engine brake control means limits the differential action of the differential mechanism during the speed reduction running for the purpose of obtaining brake torque. This results in an increase of a range for the speed reduction magnitude to be controlled with resultant improvement in control performance on the speed reduction magnitude during the speed reduction running. For instance, the vehicle can have brake torque due to engine brake torque in addition to regeneration torque of the second electric motor. This provides an increased range for the speed reduction magnitude to be controlled with resultant improvement in control performance on the speed reduction magnitude during the speed reduction running. From another standpoint, brake torque can be adjusted with regeneration torque and engine brake torque, providing improved control performance on the speed reduction magnitude during the speed reduction running.

The invention recited in the claim 5 is featured by engine brake control means operative to place the differential mechanism of the continuously variable shifting portion in a non-differential state during the speed reduction running. With such a structure, the engine rotation speed is bound with the vehicle speed. This allows engine torque and therefore a large speed reduction magnitude to be immediately obtained. Utilizing this engine torque with regeneration torque of the second electric motor in combination enables the large speed reduction magnitude to be immediately obtained.

The invention recited in the claim 6 is featured by engine brake control means operative to vary a limiting amount initiated by the differential action limitation device during the speed reduction running.

With such a structure, the continuously variable shifting portion takes an intervening state between the continuously variable shifting state, available to achieve the operation as the electrically controlled continuously variable transmission, and the non-continuously variable shifting state disenabling the electrically controlled continuously variable shifting operation. Accordingly, the engine rotation speed intervenes between a nearly zeroed level and a value bound with the vehicle speed. Thus, engine brake torque can be adjusted within a range of the engine rotation speed, thereby providing improved control performance on the speed reduction magnitude during the speed reduction running.

In the invention recited in the claim 7, the engine is possible to perform an in-cylinder pressure variation suppression operation and engine brake control means varies an in-cylinder pressure variation suppression amount of the engine during the speed reduction running. With such a structure, a rotational resistance can be varied even with the same engine rotation speed, causing a change in engine brake torque. This results in further improvement in control performance on the speed reduction magnitude during the speed reduction running.

The invention recited in the claim 8 is further featured by target speed reduction magnitude control means operative to determine brake torque to be effectuated by an engine brake, depending on whether or not the second electric motor is possible to regenerate in order to obtain the target speed reduction magnitude of a vehicle during the speed reduction running. The target speed reduction magnitude control means serves to limit a differential action of the differential mechanism so as to obtain brake torque with the engine brake.

With such a structure, the brake based on the regeneration is executed with top priority in consideration of energy efficiency. Further, if no target speed reduction magnitude is possible to be achieved only with the regeneration or if no target speed reduction magnitude is possible to be achieved due to a regeneration amount being suppressed, brake torque can be obtained with the engine brake. This results in improvement in control performance of the speed reduction magnitude during the speed reduction running.

According to the invention recited in the claim 9, there is provided a control device for a vehicular drive apparatus, having (a) a differential portion including a differential mechanism for distributing an output of an engine to a first electric motor and a transmitting member and a second electric motor disposed in a power transmitting path between the transmitting member and drive wheels, the control device comprising: (b) a differential action limitation device disposed in the differential mechanism for limiting a differential action of the differential mechanism to thereby limit a differential action of the differential portion; and (c) engine brake control means operative to limit the differential action of the differential portion in order to obtain brake torque with engine brake during the speed reduction running.

With such a structure, the differential action limitation device places the differential mechanism in a differential state in which no differential action is limited to allow the differential to be effectuated, causing the differential portion of the vehicular drive apparatus to be placed in the differential state operative to perform the differential action. Besides, the differential action limitation device limits the differential action of the differential mechanism that is consequently placed in a non-differential state such as, for instance, a locked state. This allows the differential mechanism to be placed in the non-differential state such as, for instance, the locked state in which no differential action is effectuated. Accordingly, a drive apparatus can have a structure with combined advantages of a fuel saving effect of a transmission, in which a gear ratio can be electrically changed, and a high transmitting efficiency of a gear-type transmitting device in which drive power is mechanically transferred.

For instance, in a normal output region of the engine with a vehicle running at a low/intermediate speed and low/intermediate output, placing the differential portion in the differential state ensures a fuel saving performance of the vehicle. In addition, with the differential portion placed in the non-differential state during the running of the vehicle at the high speed, the output of the engine is transferred mainly through a mechanical power transmitting path to the drive wheels. This minimizes a loss in conversion between the vehicle drive force, occurring when the differential portion is caused to operate as a transmission for the speed ratio to be electrically changed, and electrical energy, resulting in improvement in fuel consumption.

Moreover, with the differential portion placed in the non-differential state during the running of the vehicle at the high output, the differential portion is actuated as the transmission to electrically change the speed ratio in a region under which the vehicle runs at the low/intermediate speed and low/intermediate output. This enables a reduction in a maximal value of electric energy, for the electric motor to generate, i.e., electric energy for the electric motor to transfer, resulting in a further minimization of the electric motor or the vehicle drive apparatus incorporating such an electric motor.

With the vehicular drive apparatus having the differential portion whose operation is limited, the engine brake control means limits the differential action of the differential portion during the speed reduction running for the purpose of obtaining brake torque. Thus, the brake torque is increased. This results in an increase of a range for the speed reduction magnitude to be controlled with resultant improvement in control performance on the speed reduction magnitude during the speed reduction running. For instance, the vehicle can have brake torque due to engine brake torque in addition to regeneration torque of the second electric motor. This provides an increased range for the speed reduction magnitude to be controlled with resultant improvement in control performance on the speed reduction magnitude during the speed reduction running. From another standpoint, brake torque can be adjusted with regeneration torque and engine brake torque, providing improved control performance on the speed reduction magnitude during the speed reduction running.

The invention recited in the claim 10 is featured by engine brake control means places the differential portion in a non-differential state inoperative to perform the differential action during the speed reduction running. With such a structure, the engine rotation speed is bound with a vehicle speed, permitting brake torque to be immediately obtained for promptly obtaining a large speed reduction magnitude. For instance, using engine brake torque in combination with regeneration torque of the second electric motor allows a large reduction magnitude to be immediately obtained.

The invention recited in the claim 11 is featured by engine brake control means is operative to vary a control amount of the differential action limitation device during the speed reduction running. With such a structure, the differential portion can be placed between a differential state enabling the differential action and a non-differential state disenabling the differential action. This allows an engine rotation speed to lie in a value between a nearly zeroed level and a value bound with a vehicle speed. Accordingly, engine brake torque can be adjusted within a range of the engine rotation speed, providing improved control performance on the speed reduction magnitude during the speed reduction running.

In the invention recited in the claim 12, the engine is possible to perform an in-cylinder pressure variation suppression operation, and the engine brake control means varies an in-cylinder pressure variation suppression amount during the speed reduction running. With such a structure, a rotational resistance is caused to vary even at the same engine rotation speed, causing a change in engine brake torque. This results in further improvement in control performance during the speed reduction running.

The invention recited in the claim 13 is further featured by target speed reduction magnitude control means for determining brake torque with engine brake, depending on whether or not the second electric motor is operative to regenerate, so as to allow the vehicle to obtain a target speed reduction magnitude during the speed reduction running wherein the engine brake control means limits a differential action of the differential portion so as to obtain brake torque with the engine brake. With such a structure, the brake is obtained based on the regeneration with top priority in consideration of energy efficiency. Further, if no target speed reduction magnitude is possible to be achieved only with the regeneration, or if no target speed reduction magnitude is possible to be achieved due to a regeneration amount being suppressed, brake torque can be obtained with the engine brake. This results in improvement in control performance of the speed reduction magnitude during the speed reduction running.

According to the invention recited in the claim 14, there is provided a control device for a vehicular drive apparatus, having (a) a differential portion including a differential mechanism for distributing an output of an engine to a first electric motor and a transmitting member and a second electric motor disposed in a power transmitting path between the transmitting member and drive wheels, the control device comprising: (b) a differential state switch device disposed in the differential mechanism for selectively switching the differential portion to a differential state enabling a differential action and a non-differential state disenabling the differential action; and (c) regeneration control means for altering a regeneration amount depending on whether or not the differential portion is placed in the differential state during an speed reduction running.

With such a structure, the differential state switch device selectively switches the differential portion to the differential state enabling the differential action and the non-differential state, for instance, the locked state disenabling the differential action. Accordingly, the drive apparatus can have combined advantages of an improved fuel saving effect of the transmission, in which the gear ratio is electrically changed, and a high transmitting efficiency of a gear-type transmitting device in which drive power is mechanically transferred.

For instance, in a normal output region of the engine with a vehicle running at a low/intermediate speed and low/intermediate output, placing the differential portion in the differential state ensures a fuel saving performance of the vehicle. In addition, with the differential portion placed in the non-differential state during the running of the vehicle at the high speed, the output of the engine is transferred mainly through a mechanical power transmitting path to the drive wheels. This minimizes a loss in conversion between the vehicle drive force, occurring when the differential portion is caused to operate as a transmission for the speed ratio to be electrically changed, and electrical energy, resulting in improvement in fuel consumption.

Moreover, with the differential portion placed in the non-differential state during the running of the vehicle at the high output, the differential portion is actuated as the transmission to electrically change the speed ratio in a region under which the vehicle runs at the low/intermediate speed and low/intermediate output. This enables a reduction in a maximal value of electric energy, for the electric motor to generate, i.e., electric energy for the electric motor to transfer, resulting in a further minimization of the electric motor or the vehicle drive apparatus incorporating such an electric motor.

With the vehicular drive apparatus including the differential portion with a structure switchable to the differential state and the non-differential state, the regeneration control means changes the regeneration amount depending on drag torque of the engine during the speed reduction running. Accordingly, the regeneration is performed at a regeneration amount depending on drag torque of the engine. That is, the regeneration is performed depending on the differential state, in which the engine rotation speed is nearly zeroed regardless of the vehicle speed due to the differential action, and the non-differential state in which the engine rotation speed is bound with the vehicle speed to allow the engine to have greater drag torque than that appearing during the differential state. This results in an increase in the regeneration amount in comparison to that achieved when the regeneration is performed at a regeneration amount uniformly set in conjunction with the non-differential state with a provability of an increase in drag torque of the engine, thereby providing improved fuel consumption.

The invention recited in the claim 15 is featured by regeneration control means operative to increase the regeneration amount to be greater than that appearing in the non-differential state when the differential portion is placed in the differential state. Thus, with the differential portion placed in such a differential state, the differential action causes a drop in the engine rotation speed to a lower level than that appearing in the non-differential state. This allows the regeneration to be performed at a greater regeneration amount with the same vehicle speed during the speed reduction running.

In the invention recited in the claim 16, the engine is possible to perform an in-cylinder pressure variation suppression control and the regeneration control means alters a regeneration amount based on an in-cylinder pressure variation suppression control amount appearing when the engine performs the in-cylinder pressure variation suppression control. With such a structure, even if the engine rotation speed remains at the same level, the regeneration is performed at a regeneration amount depending on the in-cylinder pressure variation suppression control amount during the operation in the in-cylinder pressure variation suppression control in which drag torque of the engine is caused vary. For instance, the regeneration amount is caused to increase to be greater than that achieved when the regeneration is performed at a regeneration amount uniformly set in conjunction with a state under which the in-cylinder pressure variation suppression control amount is minimized to cause the engine to have increased drag torque, thereby providing improved fuel consumption.

The invention recited in the claim 17 is featured by regeneration control means operative to alter the regeneration amount depending on whether or not a fuel supply to the engine is stopped. With such a structure, the regeneration is performed at a regeneration amount depending on a state, in which a fuel is supplied to the engine to sustain an autonomous rotation with no occurrence of drag torque in the engine, and another state in which the fuel supply to the engine is shut off with the engine having a provability of the occurrence of drag torque. In this case, the regeneration amount is caused to increase to be greater than that achieved when the regeneration is performed at a regeneration amount uniformly set in conjunction with the state under which the fuel supply to the engine is shut off with the engine having a provability of the occurrence of drag torque, thereby providing improved fuel consumption.

Preferably, with the differential state switch device or the differential action limitation device placed in a differential state for the differential mechanism to perform the differential action, the continuously variable shifting portion or the differential portion is placed in a continuously variable shifting state enabling an electrically controlled continuously variable shifting operation. With the differential mechanism placed in a non-differential state, for instance, a locked state disenabling the differential action, the continuously variable shifting portion or the differential portion is placed in a non-continuously variable shifting state, for instance, a step-variable shifting state disenabling the electrically controlled continuously variable shifting operation. This limits the operation as the electrically controlled continuously variable shifting operation. With such a structure, the continuously variable shifting portion can be switched to the continuously variable shifting state and the non-continuously variable shifting state. Further, the differential portion can be switched to the continuously variable shifting state and the non-continuously variable shifting state.

Preferably, with the differential action limitation device rendered the differential mechanism to be placed in the differential state for enabling a differential action, the differential portion is placed in a differential state enabling the differential action. With the differential mechanism placed in a non-differential state, for instance, a locked state for disenabling the differential action, the differential action is limited. This causes the differential portion to be placed in the non-differential state, for instance, the locked state for disenabling the differential action such that the differential action is limited. With such a structure, the differential portion can be switched between the differential state and the non-differential state.

Suitably, the differential mechanism includes a first element connected to the engine, a second element connected to the first electric motor, and a third element connected to the transmitting member. The differential state switching device or the differential action limitation device allows the first element to the third element to rotate at speeds that are different from each other to bring the differential mechanism into the differential state. For example, it allows at least the second element and the third element to rotate in the different speed. The differential state switching device does not allow i.e., prohibits at least the second element and the third element to rotate in the different speed, to bring the differential mechanism into the non-differential state, e.g., in a locked state. For example, it allows the first element to the third element to rotate together with respect to each other or brings the second element into a non-rotatable state. In this case, the differential mechanism can be switched between the differential state and the non-differential state.

Preferably, the differential state switching device or the differential action limitation device is provided with the clutch and/or the brake. The clutch mutually connects two of the first element to the third element to cause them to integrally rotate as one unit, while the brake connects the second element to the non-rotatable member to place it in the non-rotatable state. With such structure, the differential mechanism can be easily switched between the differential state and the non-differential state.

Preferably, the differential mechanism is placed, by release of the clutch and the brake, in the differential state in which at least the second element and the third element are rotatable at different speed to operate as the electric differential device. The differential mechanism operates as the transmission having the gear ratio of 1 by engagement of the clutch, and operates as the speed-increasing transmission having the gear ratio smaller than 1 by engagement of the brake. With such structure, the differential mechanism is switched to the differential state and the non-differential state, and can operate as the transmission having the fixed gear ratio of the single stage or the multiple stages.

Preferably, the differential mechanism is comprised of the planetary gear unit, of which the carrier corresponds to the first rotary element, of which the sun gear corresponds to the second rotary element, and of which the ring gear corresponds to the first rotary element. With such structure, the differential mechanism can be short in the axial dimension, and can be easily constructed by one planetary gear unit.

Preferably, the planetary gear unit is comprised of the single pinion type one. With such structure, the differential mechanism can be short in the axial dimension, and can be easily constructed by one single pinion type planetary gear unit.

Preferably, the vehicle drive apparatus further includes the transmission portion i.e., shifting portion constructing a part of the power transmitting path between the transmitting member and the driving wheel. With such structure, the total gear ratio of the drive apparatus is determined based on the gear ratio of the continuously variable shifting portion and the gear ratio of the shifting portion, which renders the following advantages. That is, the driving force is widely obtained using the gear ratio of the shifting portion, and efficiency of the continuously variable shifting control at the continuously variable shifting portion is further increased. In addition, when the shifting portion functions as the speed reduction device having the gear ratio larger than 1, the second electric motor sufficiently outputs the small or low output torque to the output shaft of the shifting portion, being compactified or made compact in size.

Preferably, the vehicle drive apparatus further includes a transmission portion i.e., shifting portion constructing a part of the power transmitting path between the transmitting member and the driving wheel. With such structure, the total gear ratio of the drive apparatus is determined based on the gear ratio of the differential portion and the gear ratio of the transmission portion, which renders the following advantages. That is, the driving force is widely obtained using the gear ratio of the shifting portion. In addition, when the shifting portion functions as the speed reduction device having the gear ratio larger than 1, the second electric motor sufficiently outputs the small or low output torque to the output shaft of the shifting portion, being compactified in size.

Further, in the continuously variable shifting state of the continuously variable shifting portion, the continuously variable shifting portion and the shifting portion construct the continuously variable transmission, and in the non-continuously variable shifting state of the continuously variable shifting portion, the continuously variable shifting portion and the shifting portion construct the step variable transmission.

The shifting portion i.e., transmission portion is preferably a step variable automatic transmission. With this structure, in the continuously variable shifting state of the continuously variable shifting portion, the continuously variable shifting portion and the shifting portion construct the continuously variable transmission. In the non-continuously variable shifting state, the continuously variable shifting portion constructs, together with the shifting portion, the step variable transmission. Alternatively, in the differential state of the differential portion, the differential portion and the shifting portion construct the continuously variable transmission. In the non-differential state, the differential portion constructs, together with the shifting portion, the step variable transmission.

The stepwise change of the total gear ratio depending on the shifting action of the shifting portion is executed more rapidly, than the continuous change thereof. Consequently, the drive apparatus functioning as the continuously variable transmission can smoothly changes the drive torque thereof, and can change the gear ratio thereof to rapidly obtain the drive torque.

BRIEF DESCRIPTION OF THE DRAWINGS

FIG. 28 is a set of views showing statuses, plotted on collinear charts, of a differential portion during a speed reduction running. FIG. 28(a) represents a case where a switching clutch is engaged (locked) to place the differential portion in a non-continuously variable shifting state and FIG. 28(b) represents a case where with the differential portion placed in the non-continuously variable shifting state, fuel cut-off is initiated to stop the operation of an engine with a first electric motor remaining in an idling state.

EXPLANATION OF REFERENCES

8: engine
10, 70: shifting mechanism (drive apparatus)
11: differential portion (continuously variable transmission portion)
16: power distribution mechanism (differential mechanism)
18: transmitting member
20, 72: automatic shifting portion (shifting portion)
38: driving wheel
40: electronic control device (control device)
50: switching control means (engine brake control means)
52: hybrid control means (regeneration control means)
82: shifting control means
184: target speed reduction magnitude control means
M1: first electric motor
M2: second electric motor
C0: switching clutch (differential state switching device)
B0: switching brake (differential state switching device)

PREFERRED EMBODIMENT OF THE INVENTION

Hereinafter, embodiments of the present invention will be explained with reference to attaching drawings.

Embodiment 1

Figures 1, 2:
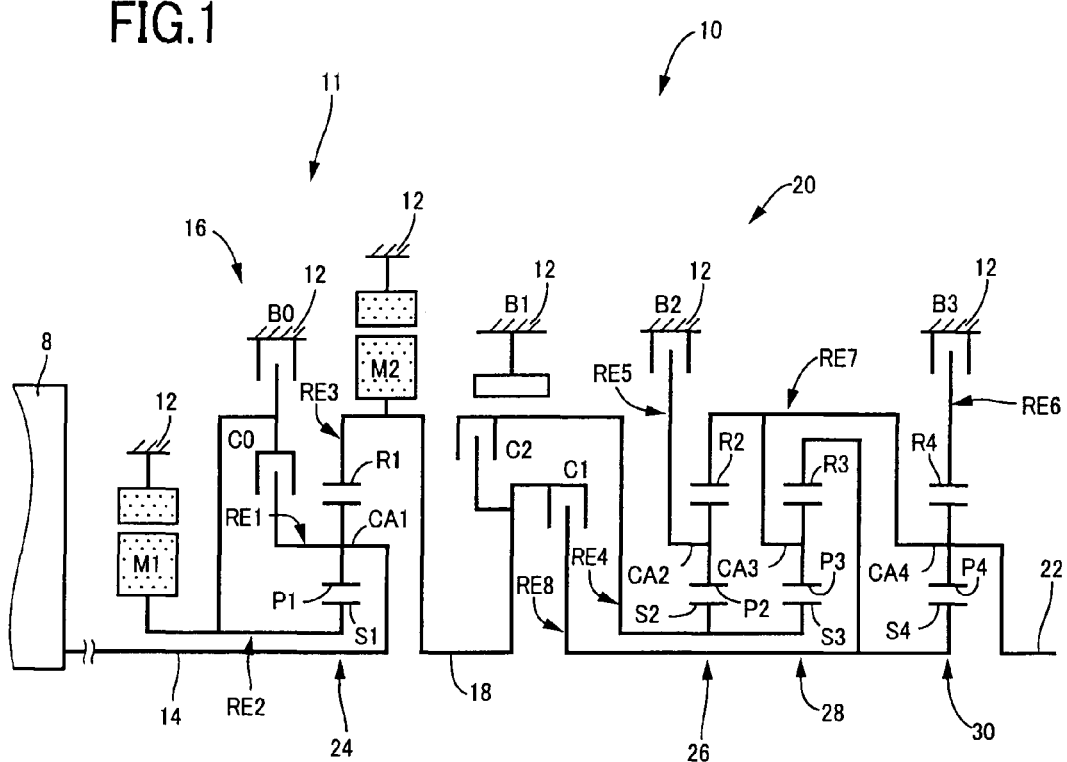
FIG. 1 is a skeleton view explaining a structure of a drive apparatus of hybrid vehicle which is one embodiment according to the present invention.
FIG. 2 is an operation Table explaining a relation between a shifting operation of the drive apparatus of the hybrid vehicle of the embodiment shown in FIG. 1 operable in a continuously variable shifting state or a step variable shifting state, and operation combinations of hydraulic-type frictionally engaging devices used therefor.

FIG. 1 is a skeleton view explaining a shifting mechanism 10 constructing a part of a drive apparatus of a hybrid vehicle according to one embodiment of the present invention. The shifting mechanism 10 includes an input shaft 14, a differential portion 11, an automatic transmission portion i.e., automatic shifting portion 20, and an output shaft 22 all coaxially disposed in a transmission case 12 (hereinafter briefly referred to as "case 12") as a non-rotatable member fixed to a vehicle body. The input shaft 14 as an input rotation member is fixed to the case 12. The differential portion 11 is connected to the input shaft 14 directly or indirectly via a pulsation absorbing damper (vibration damping device) not shown. The automatic transmission portion 20 functioning as a step-variable type transmission that is the shifting portion is disposed between the differential mechanism 11 and the output shaft 22 to be connected thereto in series. The output shaft 22 as an output rotation member is connected to the automatic transmission portion 20.

This shifting mechanism 10 of this embodiment is suitably used for a transverse FR vehicle (front-engine, rear-drive vehicle), and is disposed between a drive power source in the form of an engine 8 such as a gasoline engine or a diesel engine, and a pair of drive wheels 38 (FIG. 5), to transmit a vehicle drive force to the pair of drive wheels 38 through a differential gear device 36 (final speed reduction gear) and a pair of drive axles.

In the shifting mechanism 10 of this embodiment, the engine 8 and the differential portion 11 is directly connected. Here, "the direct connection" includes, in addition to a connection without using any fluid-type transmitting device such as a torque converter or fluid engaging, a connection with using vibration damping device. Noted that a lower half of the shifting mechanism 10, constructed symmetrically with respect to its axis, is omitted in FIG. 1. This is true for other embodiments to be explained hereinafter.

The differential portion 11 includes a first electric motor M1, a power distributing mechanism 16 and a second electric motor M2. The power distributing mechanism 16 is a mechanism for distributing an output of the engine 8 inputted to the input shaft 14 to the first electric motor M1 and the transmitting member 18, as the differential mechanism. The second electric motor M2, being rotatable integral with the transmitting member 18, may be disposed at any portion of a power transmitting path extending between the transmitting member 18 and the drive wheel 38.

In the present embodiment, each of the first electric motor M1 and the second electric motor M2 is a so-called motor/generator also functioning as an electric generator. The first electric motor M1 should function at least as an electric generator to generate an electric energy with generating a reaction force, and the second electric motor M2 should function at least as an electric motor to generate a drive force of the vehicle.

The power distributing mechanism 16 includes a first planetary gear unit 24 functioning as a differential device, a switching clutch C0 and a switching brake B1. The first planetary gear unit 24 of single pinion type has a gear ratio $\rho 1$ of about 0.418, for example. It has, as rotary elements, a first sun gear S1, a first planetary gear P1, a first carrier CA1 supporting the first planetary gear P1 to be rotatable about its axis and about the axis of the first sun gear S1, and a first ring gear R1 meshing with the first sun gear S1 through the first planetary gear P1. Assuming the numbers of teeth of the first sun gear 51 and the first ring gear R1 by ZS1 and ZR1, respectively, the above gear ratio $\rho 1$ is represented by ZS1/ZR1.

In the power distributing mechanism 16, the first carrier CA1 is connected to the input shaft 14, i.e., to the engine 8, the first sun gear S1 is connected to the first electric motor M1, and the first ring gear R1 is connected to the transmitting member 18. The switching brake B0 is disposed between the first sun gear S1 and the casing 12, and the switching clutch C0 is disposed between the first sun gear S1 and the first carrier CA1. Upon release of both the switching clutch C0 and switching brake B0, the power distributing mechanism 16 is placed in the differential state where the first sun gear S1, first carrier CA1 and first ring gear R1 of the first planetary gear unit 24 are placed in a differential state to be rotatable relative to each other to perform a differential action.

Thus, the output of the engine 8 is distributed to the first electric motor M1 and the transmitting member 18, and a part of the output distributed to the first electric motor M1 is used to generate and store power thereat or to drive the second electric motor M2. Accordingly, the differential portion 11 (power distributing mechanism 16) functions as the electrically controlled differential device, for example, in the continuously variable shifting state (electrically controlled CVT state), in which the rotation speed or rotational speed of the transmitting member 18 changes continuously, irrespective of the rotation speed of the engine 8. That is, the differential portion 11 placed in the continuously variable state by the differential state of the power distributing mechanism 16 functions as the electrically controlled continuously variable transmission in which gear ratio $\gamma 0$ (rotation speed $N_{14}$ of the driving device input shaft 14/rotation speed $N_{18}$ of the transmitting member 18) electrically changes from a minimum value $\gamma 0min$ to a maximum value $\gamma 0max$.

In this state, by engagement of the switching clutch C0 or switching brake B0, the power distributing mechanism 16 is placed to the non-differential state not to perform, that is impossible to perform the differential operation. Specifically, when the first sun gear S1 and the first carrier CA1 are engaged integrally by engagement of the switching clutch C0, the rotary elements of the first planetary gear unit 24 including the first sun gear S1, first carrier CA1 and first ring gear R1 are placed in a locked state or a non-differential state to be rotatable as a unit. With this, also the differential portion 11 is placed to the non-differential state. Thus, the rotation speed i.e., rotational speed of the engine 8 and the rotation speed of power transmitting member 18 (transmitting member rotation speed $N_{18}$) coincides with each other, so that the differential portion 11 power distributing mechanism 16) is placed in a fixed shifting state, that is a step-variable shifting state functioning as the transmission having a fixed gear ratio $\gamma 0$ equal to 1.

Then, when the switching brake B0 is engaged instead of the switching clutch C0 to connect the first sun gear S1 with the case 12, the power distributing mechanism 16 is placed in a locked state or non-differential state impossible to perform the differential operation with the non-rotating state of the first sun gear S1. With this, also the differential portion 11 is placed in the non-differential state. Due to the higher rotation speed of the first ring gear R1 than that of the first carrier CA1, the power distributing mechanism 16 functions as a speed-increasing mechanism. The differential portion 11 (power distributing mechanism 16) is placed in the fixed shifting state, i.e., the step-variable shifting state functioning as the speed-increasing mechanism of which a gear ratio $\gamma 0$ is fixed in a value smaller than 1, for example, about 0.7.

In the present embodiment, the switching clutch C0 and switching brake B0 selectively place the differential portion 11 (power distributing mechanism 16) to the differential state i.e., non-locked state, and in the non-differential state i.e., the locked state. In detail, in the differential state, the differential portion 11 (power distributing mechanism 16) is operable as the electrically controlled differential device. For example, in the continuously variable shifting state, it is operable as the continuously variable transmission of which shifting ratio is continuously variable.

The switching clutch C0 and switching brake B0 also place the differential portion 11 (power distributing mechanism 16) in the shifting state not operable as the electrically controlled differential device. For example, in the locked state with the shifting ratio being locked in the fixed value, the differential portion 11 (power distributing mechanism 16) is not operable as the continuously variable transmission, with the continuously variable shifting operation being inoperative. In other words, in the locked state, the differential portion 11 (power distributing mechanism 16) operates as the single-stage or multi-stage transmission having one or not less than two shifting ratio(s), not operative as the continuously variable transmission, with the continuously variable shifting operation being inoperative. The locked state can otherwise be expressed as the fixed shifting state where the differential portion 11 (power distributing mechanism 16) operates as the single-stage or multi-stage transmission having one or not less than two shifting ratio(s).

From another point of view, the switching clutch C0 and the switching brake B0 bring the power distributing mechanism 16 into the non-differential state to limit the differential action of the power distributing mechanism 16 thereby bringing the differential portion 11 into the non-continuously variable shifting state to limit the operation of the differential portion 11 as the electrically operated differential device. In other words, the switching clutch C0 and the switching brake B0 serve as a differential action limiting device that limits the operation of the differential portion 11 as an electrically operated continuously variable transmission.

In addition, the switching clutch C0 and the switching brake B0 brings the power distributing mechanism 16 into the differential state not to limit the differential action thereof. Thus, the switching clutch C0 and the switching brake B0 do not limit the differential action of the differential portion 11, as the electrically controlled differential device, that is operation of the electrically controlled continuously variable transmission.

The automatic transmission portion 20 includes plural planetary gear units, that is a single-pinion type second planetary gear unit 26, a single-pinion type third planetary gear unit 28 and a single-pinion type fourth planetary gear unit 30. The second planetary gear unit 26 includes a second sun gear S2, a second planetary gear P2, a second carrier CA2 supporting the second planetary gear P2 to be rotatable about its axis and about the axis of the second sun gear S2, and a second ring gear R2 meshing with the second sun gear S2 through the second planetary gear P2, having for example a gear ratio $\rho 2$ of about 0.562.

The third planetary gear unit 28 includes a third sun gear S3, a third planetary gear P3, a third carrier CA3 supporting the third planetary gear P3 to be rotatable about its axis and about the axis of the third sun gear S3, and a third ring gear R3 meshing with the third sun gear S3 through the third planetary gear P3, having for example a gear ratio $\rho 3$ of about 0.425. The fourth planetary gear unit 30 includes a fourth sun gear S4, a fourth planetary gear P4, a fourth carrier CA4 supporting the fourth planetary gear P4 to be rotatable about its axis and about the axis of the fourth sun gear S4, and the fourth ring gear R4 meshing with the fourth sun gear S4 through the fourth planetary gear P4, having a gear ratio $\rho 4$ of about 0.421.

Assuming the numbers of teeth of the second sun gear S2, second ring gear R2, third sun gear S3, third ring gear R3, fourth sun gear S4 and fourth ring gear R4 by ZS2, ZR2, ZS3, ZR3, ZS4 and ZR4 respectively, the above gear ratios $\rho 2$, $\rho 3$ and $\rho 4$ are represented by ZS2/ZR2, ZS3/ZR3, and ZS4/ZR4, respectively.

In the automatic transmission portion 20, the second sun gear S2 and the third sun gear S3 integrally fixed to each other as a unit are selectively connected to the transmitting member 18 through a second clutch C2, and are selectively fixed to the casing 12 through a first brake B1. The second carrier CA2 is selectively connected to the casing 12 through the second brake B2, and the fourth ring gear R4 is selectively fixed to the transmission casing 12 through a third brake B3. The second ring gear R2, third carrier CA3 and fourth carrier CA4 integrally fixed to each other are fixed to the output shaft 22. The third ring gear R3 and the fourth sun gear S4 integrally fixed to each other are selectively connected to the transmitting member 18 through a first clutch C1.

Thus, the automatic transmission portion 20 and the differential portion 11 (transmitting member 18) are selectively connected to each other through the first clutch C1 or the second clutch C2 used for establishing the gear shift position in the automatic transmission portion 20. In other words, the first clutch C1 and the second clutch C2 function as the engaging device between the transmitting member 18 and the automatic transmission portion 20.

That is, it selectively switches the power transmitting path between the differential portion 11 and the drive wheel 38 in a power transmitting condition allowing the power transmission therethrough, and a power interrupting condition interrupting the power transmission therethrough. That is, engagement of at least one of the first clutch C1 and the second clutch C2 bring the power transmitting path into the power transmitting condition, while release of both the first clutch C1 and the second clutch C2 bring the power transmitting path into the power interrupting condition. The automatic transmission portion 20 is the step variable transmission which executes a clutch to clutch shifting by release of the release side engaging device and engagement of the engage side engaging device.

The switching clutch C0, the first clutch C1, the second clutch C2, the switching brake B0, the first brake B1, the second brake B2 and the third brake B3 (hereinafter, they are referred to the clutch C, the brake B, when not specified) are hydraulic-type frictionally engaging devices as the engaging element used in a conventional vehicular automatic transmission. The frictionally engaging device includes a wet-type multiple-disc clutch in which a plurality of friction plates superposed on each other are forced against each other by a hydraulic actuator, or a band brake in which a rotary drum and one band or two bands wound on an outer circumferential surface thereof is tightened at one end by a hydraulic actuator.

In the shifting mechanism 10 of this embodiment, by engagement of any of the switching clutch C0 and switching brake B0 provided in the power distributing mechanism 16, the differential portion 11 can construct, in addition to the continuously variable shifting state operable as the continuously variable transmission, the non-continuously variable shifting state (fixed shifting state) operable as the transmission of the fixed shifting ratio. Accordingly, in the shifting mechanism 10, the differential portion 11 placed in the fixed shifting state by engagement of any of the switching clutch C0 and switching brake B0 and the automatic transmission portion 20, construct the step variable shifting state operable as the step-variable transmission.

The differential portion 11 placed in the continuously variable shifting state by non-engagement of both the switching clutch C0 and switching brake B0 and the automatic transmission portion 20, construct the continuously variable shifting state operable as the continuously variable transmission. In other words, the shifting mechanism 10 is switched to the step-variable shifting state by engagement of any of the switching clutch C0 and switching brake B0, and is switched to the continuously variable shifting state by non-engagement of both the switching clutch C0 and switching brake B0. The differential portion 11 is the transmission also switched to the step-variable shifting state and the continuously variable shifting state.

Concretely, when the shifting mechanism 10 functions as the step variable transmission with the differential portion 11 placed in the non-continuously variable shifting state, any one of the switching clutch C0 and the switching brake B0 is engaged, and the first clutch C1, the second clutch C2, the first brake B1, the second brake B2 and the third brake B3 are selectively engaged. That is, the engaging device relating to the shifting of the automatic transmission portion 20 is engaged and disengaged i.e., released. With this engagement, the hydraulic type frictionally engaging device i.e., engaging device at a release side (release side engaging device), and the hydraulic type frictionally engage device at an engage side (engage side engaging device), both related to the shifting, are automatically switched the gear ratio. For this switching, one of a first-gear position (first-speed position) through a fifth-gear position (fifth-speed position), a reverse-gear position (rear-drive position) and a neural position is selectively established.

A total gear ratio $\gamma T$ (input shaft rotation speed $N_{IN}$/output shaft rotation speed $N_{OUT}$) changing as geometric series can be obtained for every gear positions. This total gear ratio $\gamma T$ of the shifting mechanism 10 is the total or overall gear ratio of the entire shifting mechanism 10 formed based on a gear ratio γ0 of the differential portion 11, and a gear ratio γ of the automatic transmission portion 20.

For example, when the shifting mechanism 10 functions as the step-variable transmission, for example, as shown in the operation Table in FIG. 2, engagement of the switching clutch C0, the first clutch C1 and the third brake B3 establish the first-gear position having the highest gear ratio γ1 of about 3.357, for example, and engagement of the switching clutch C0, the first clutch C1 and the second brake B2 establish the second-gear position having the gear ratio γ2 of about 2.180, for example, which is lower than the gear ratio γ1. Further, engagement of the switching clutch C0, first clutch C1 and first brake B1 establish the third-gear position having the gear ratio γ3 of about 1.424, for example, which is lower than the gear ratio γ2, and engagement of the switching clutch C0, first clutch C1 and second clutch C2 establish the fourth-gear position having the gear ratio γ4 of about 1.000, for example, which is lower than the gear ratio γ3.

Engagement of the first clutch C1, second clutch C2 and switching brake B0 establish the fifth-gear position having the gear ratio γ5 of about 0.705, for example, which is smaller than the gear ratio γ4. Further, engagement of the second clutch C2 and the third brake B3 establish the reverse-gear position having the gear ratio γR of about 3.209, for example, which positions between the gear ratios γ1 and γ2. The neutral position N is established by engaging only the switching clutch C0.

However, when the shifting mechanism 10 functions as the continuously variable transmission, with the differential portion 11 placed in the continuously variable shifting state, the switching clutch C0 and the switching brake B0 are both released i.e., disengaged. With this, the differential portion 11 functions as the continuously variable transmission, and the automatic transmission portion 20 connected in series thereto functions as the step-variable transmission. The rotation speed to be input to the automatic transmission portion 20 (input rotation speed $N_{IN}$ automatic transmission portion 20) placed in one of the gear positions M, that is the rotation speed $N_{18}$ of the transmitting member 18 is continuously changed so that the continuously variable gear ratio width can be obtained for each of the gear positions. Accordingly, the total gear ratio γT of the shifting mechanism 10 is steplessly obtained.

For example, the case where the shifting mechanism 10 functions as the continuously variable transmission will be explained with reference to the operation Table in FIG. 2. In the state the switching clutch C0 and the switching brake B0 both released, the input rotation speed $N_{IN}$ of the automatic transmission portion 20 for each of the gear positions such as the first gear position, the second gear position, the third gear position, the fourth gear position of the automatic transmission portion 20, that is the rotation speed of the transmitting member 18 is steplessly changed (engagement of the automatic transmission portion 20 in the fifth gear position is equivalent to that of the fourth gear position). Thus, between the adjacent gear positions, the gear ratio changes steplessly and continuously, which leads to the stepless total gear ratio γT for the entire shifting mechanism 10.

Figure 3:
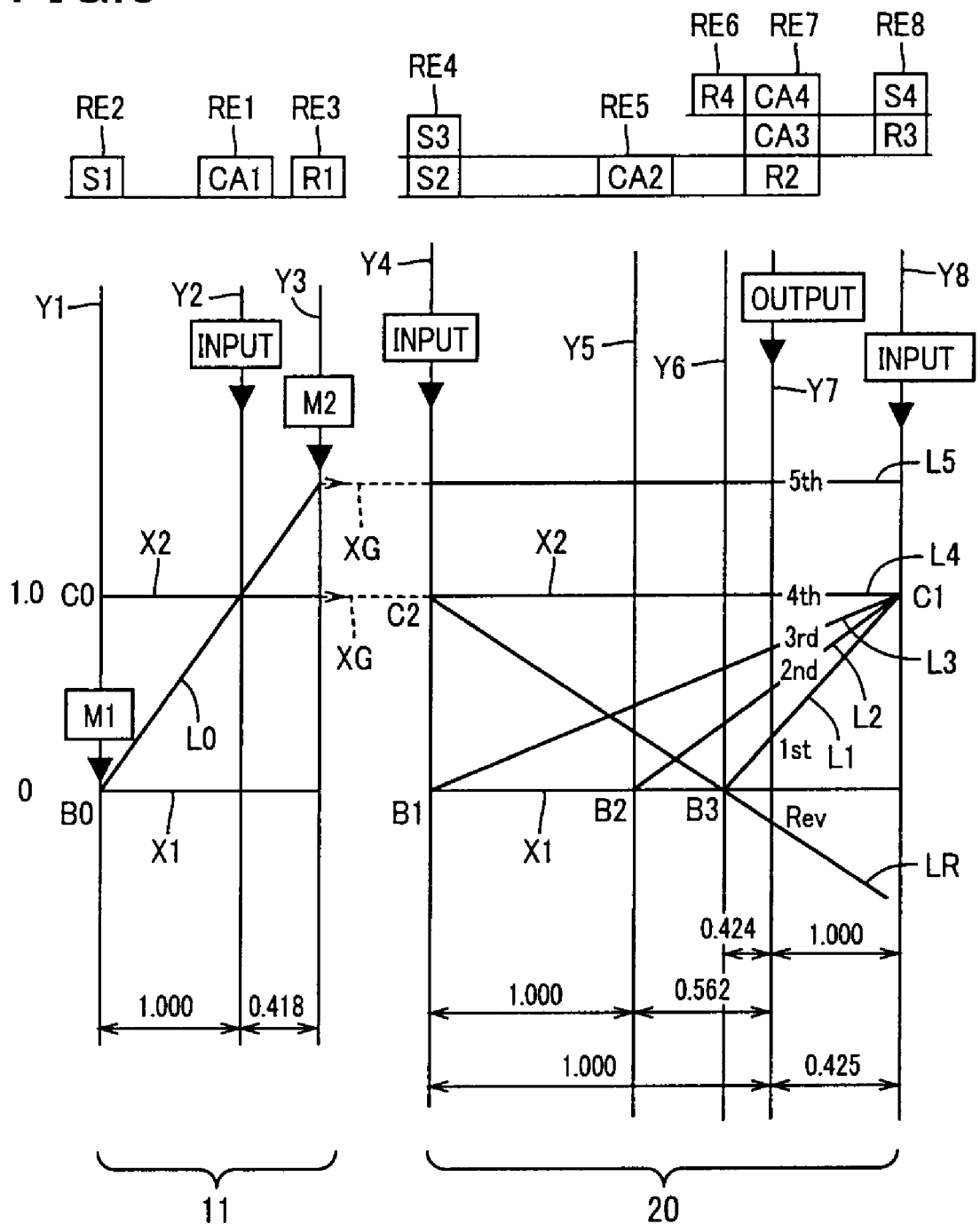
FIG. 3 is a collinear chart explaining relative rotation speeds of rotary elements in each of gear positions when the drive apparatus of the hybrid vehicle of the embodiment shown in FIG. 1 is operated in the step variable shifting mode.

FIG. 3 shows a collinear chart representing by straight lines a relation among the rotation speeds of the rotary elements different in each of the gear positions of the shifting mechanism 10. The shifting mechanism 10 is constituted by the differential portion 11 functioning as the continuously variable shifting portion or first shifting portion, and the automatic transmission portion 20 functioning as the step-variable shifting portion or second shifting portion. The collinear chart of FIG. 3 is a rectangular two-dimensional coordinate system in which the gear ratios ρ of the planetary gear units 24, 26, 28 and 30 are taken along the horizontal axis, while the relative rotation speeds of the rotary elements are taken along the vertical axis. A lower one X1 of three horizontal lines indicates the rotation speed of 0, and an upper one X2 indicates the rotation speed of 1.0, that is, an operating speed $N_E$ of the engine 8 connected to the input shaft 14. The horizontal line XG indicates the rotation speed of the transmitting member 18.

Among three vertical lines Y1, Y2 and Y3 corresponding to the three elements of the differential portion 11, respectively represent from the left the relative rotation speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined corresponding to the gear ratio ρ1 of the first planetary gear unit 24.

Further, five vertical lines Y4, Y5, Y6, Y7 and Y8 corresponding to the automatic transmission portion 20 respectively represent from the left the relative rotation speeds of a fourth rotary element (fourth element) RE4, a fifth rotary element (fifth element) RE5, a sixth rotary element (sixth element) RE6, a seventh rotary element (seventh element) RE7, and an eighth rotary element (eighth element) RE8. The fourth rotary element RE4 has a form of the second and third sun gears S2, S3 integrally fixed to each other, the fifth rotary element RE5 has a form of the second carrier CA2, and the sixth rotary element RE6 has a form of the fourth ring gear R4. The seventh rotary element RE7 has a form of the second ring gear R2 and third and fourth carriers CA3, CA4 integrally fixed to each other, and the eighth rotary element RE8 has a form of the third ring gear R3 and fourth sun gear S4 integrally fixed to each other. The distances between the adjacent pair of the vertical lines Y4 to Y8 are determined by the gear ratios ρ2, ρ3 and ρ4 of the second, third and fourth planetary gear units 26, 28 and 30.

In the relation between the vertical lines of the collinear chart, when distance between the sun gear and the carrier corresponds to "1", distance between the carrier and the ring gear corresponds to "ρ" of the planetary gear unit. That is, in the differential portion 11, distance between the vertical line Y1 and the vertical line Y2 is set to correspond to "1", and distance between the vertical lines Y2 and Y3 is set to correspond to "ρ1". Also, in the automatic transmission portion 20 for the second, third and fourth planetary gear unit 26, 28 and 30, the distance between the sun gear and the carrier is set to correspond to "1", and the distance between the carrier and the ring gear is set to correspond to "ρ".

Representing with the collinear chart of FIG. 3, the shifting mechanism 10 of this embodiment is, in the power distributing mechanism 16 (continuously variable shifting portion 11), arranged such that the first rotary element RE1 (the first carrier CA1), which is one of the three rotary elements of the first planetary gear unit 24, is fixed to the input shaft 14, and selectively connected to the second rotary element RE 2 (first sun gear S1) as another rotary element through the switching clutch C0. The second rotary element RE2 is fixed to the first electric motor M1 and selectively fixed to the casing 12 through the switching brake B0.

The third rotary element RE3 (the first ring gear R1) as still another rotary element is fixed to the transmitting member 18 and the second electric motor M2. Thus, rotation of the input shaft 14 is transmitted (inputted) to the automatic transmission portion (step-variable transmission portion) 20 through the transmitting member 18. An inclined straight line L0 which passes an intersection point between the lines Y2 and X2 represents a relation between the rotation speeds of the first sun gear S1 and the first ring gear R1.

For example, the case where the shifting mechanism 10 is switched to the continuously variable shifting state (differential state) will be explained, where the first to third rotary elements RE1 to RE3 are mutually rotatable by release of the switching clutch C0 and the switching brake B0. For example, the shifting mechanism 10 is switched to the continuously variable shifting state (differential state) where at least the second rotary element RE2 and the third rotary element RE3 are rotated at different rotation speeds. In this case, rotation of the sun gear S1 represented by the intersection point between the straight line L0 and the vertical line Y1 increases or decreases by control of the rotation speed of the first electric motor M1. When the rotation speed of the ring gear R1 determined depending on the vehicle speed V is substantially constant, the rotation speed of the first carrier CA1 represented by the intersection point between the straight line L0 and the vertical line Y2 i.e., the engine rotation speed $N_E$ increases or decreases.

When the first sun gear S1 and the first carrier CA1 are connected by engagement of the switching clutch C0, the power transmitting mechanism 16 is brought into the non-differential state when the above three rotary elements RE1, RE2 and RE3 are integrally rotated. Thus, since the non-differential state where at least the second rotary element RE2 and the third rotary element RE3 are not rotated at different rotation speed, the straight line L0 coincides with the lateral line X2, so that the transmitting member 18 rotates in the same rotation speed as the engine rotation speed $N_E$.

Alternatively, with connection of the first sun gear S1 to the casing 12 by engagement of the switching brake B0, the power distributing mechanism 16 is brought into the non-differential state where the second rotary element RE2 and the third rotary element RE3 are not rotated at different rotation speed, to function as the speed increasing mechanism with state of the straight line L0 shown in FIG. 3. Thus, the rotation speed of the first ring gear R1, i.e., the transmitting member rotation speed $N_{18}$ is represented by the intersection point between the straight line L0 with the state shown in FIG. 3 and the vertical line Y3, being inputted to the automatic transmission portion 20 in the increased rotation speed compared with the engine rotation speed $N_E$.

In the automatic transmission portion 20, the fourth rotary element RE4 is selectively connected to the transmitting member 18 through the second clutch C2 and selectively fixed to the casing 12 through the first brake B1, the fifth rotary element RE5 is selectively fixed to the casing 12 through the second brake B2, and the sixth rotary element RE6 is selectively fixed to the casing 12 through the third brake B3. The seventh rotary element RE7 is fixed to the output shaft 22, and the eighth rotary element RE8 is selectively connected to the transmitting member 18 through the first clutch C1.

As shown in FIG. 3, in the automatic transmission portion 20, upon engagement of the first clutch C1 and the third brake B3, the rotation speed of the output shaft 22 in the first-speed position is represented by an intersection point between the inclined linear line L1 and the vertical line Y7. Here, the inclined straight line L1 passes an intersection point between the vertical line Y8 indicative of the rotation speed of the eighth rotary element RE8 and the horizontal line X2, and an intersection point between the vertical line Y6 indicative of the rotation speed of the sixth rotary element RE6 and the horizontal line X1.

Similarly, the rotation speed of the output shaft 22 in the second-speed position is represented by an intersection point between an inclined straight line L2 determined by engagement of the first clutch C1 and second brake B2, and the vertical line Y7 indicative of the rotation speed of the seventh rotary element RE7 fixed to the output shaft 22. The rotation speed of the output shaft 22 in the third-speed position is represented by an intersection point between an inclined straight line L3 determined by engagement of the first clutch C1 and first brake B1, and the vertical line Y7 indicative of the rotation speed of the seventh rotary element RE7 fixed to the output shaft 22. The rotation speed of the output shaft 22 in the fourth-speed position is represented by an intersection point between a horizontal line L4 determined by engagement of the first clutch C1 and second clutch C2, and the vertical line Y7 indicative of the rotation speed of the seventh rotary element RE7 fixed to the output shaft 22.

In the first-speed through fourth-speed positions, as result of engagement of the switching clutch C0, power from the differential portion 11 i.e., the power distributing mechanism 16 is inputted to the eighth rotary element RE8 with the same rotation speed as the engine rotation speed $N_E$. However, when the switching clutch B0 engages instead of the switching clutch C0, since power from the differential portion 11 is inputted to the eighth rotary element RE8 with a speed higher than the engine rotation speed $N_E$, the rotation speed of the output shaft 22 in the fifth-speed position is represented by an intersection point between a horizontal line L5 and the vertical line Y7. Here, the horizontal line L5 is determined by engagement of the first clutch C1, second clutch C2 and switching brake B0, and the vertical line Y7 indicates the rotation speed of the seventh rotary element RE7 fixed to the output shaft 22.

Figure 4:
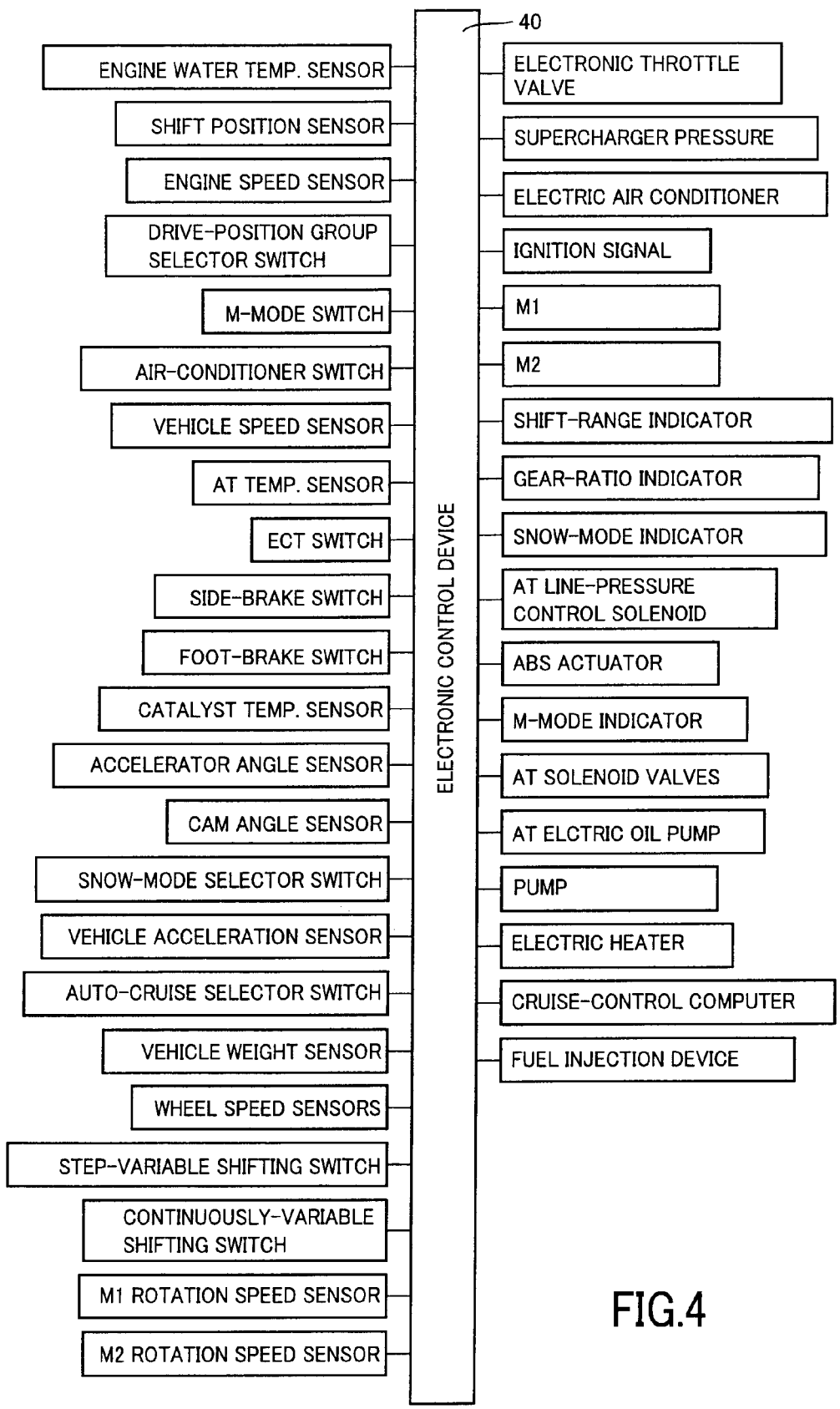
FIG. 4 is a view explaining input and output signals of an electronic control device provided in the drive apparatus of the embodiment shown in FIG. 1.

FIG. 4 illustrates signals input to an electronic control device 40 and signals output therefrom to control the shifting mechanism 10. This electronic control device 40 includes a so-called microcomputer incorporating a CPU, a ROM, a RAM and an input/output interface. By performing signal processing according to programs stored in the ROM utilizing a temporary data storage function of the ROM, the electronic control device 40 implements hybrid drive controls of the engine 8 and electric motors M1 and M2, and drive controls such as shifting controls of the automatic transmission portion 20.

To the electronic control device 40, from various sensors and switches shown in FIG. 4, various signals are inputted, which include a signal indicative of a temperature $TEMP_W$ of cooling water of the engine, a signal indicative of a selected operating position $P_{SH}$ of a shift lever, a signal indicative of the operating speed $N_E$ of the engine 8, a signal indicative of a set value of gear ratio row, a signal indicative of a command for M mode (motor drive mode), a signal indicative of an operated state of an air conditioner, a signal indicative of a vehicle speed V corresponding to the rotation speed $N_{OUT}$ of the output shaft 22, a signal indicative of a working oil temperature $T_{OIL}$ of the automatic transmission portion 20, a signal indicative of an operated state of a side brake, a signal indicative of an operated state of a foot brake, a signal indicative of a catalyst temperature, a signal indicative of an opened amount $A_{CC}$ of an accelerator pedal, a signal indicative of a cam angle, a signal indicative of a snow drive mode, a signal indicative of a longitudinal acceleration value of the vehicle, and a signal indicative of an auto-cruising drive mode.

Also inputted are a signal indicative of a vehicle weight, a signal indicative of wheel speed of each drive wheel, a signal indicative of operation of a step-variable switch for changing the differential portion 11 (power transmitting mechanism 16) to the step-variable shifting state (locked state) so that the shifting mechanism 10 functions as the step-variable transmission, a signal indicative of operation of a continuous-variable switch for changing the differential portion 11 (power transmitting mechanism 16) to the continuously variable shifting state (differential state) so that the shifting mechanism 10 functions as the continuously variable transmission, a signal indicative of the rotation speed $N_{M1}$ of the first electric motor M1, and a signal indicative of the rotation speed $N_{M2}$ of the second electric motor M2.

From the electronic control device 40, various control signals are outputted to the engine output control device 43 (refer to FIG. 5) which controls the engine output, which includes a signal to drive a throttle actuator 97 for controlling an opening degree $\theta_{TH}$ of a throttle valve 96 disposed in a suction tube 95 of the engine 8, a signal to control fuel supply amount to each cylinder of the engine 8 by a fuel injection tube 98, a signal to command an ignition timing in the engine 8 by an ignition device 99, a signal to adjust a supercharger pressure, a signal to operate the electric air conditioner, a signal for controlling an ignition timing of the engine 8, signals to operate the electric motors M1 and M2, a signal to operate a shift-range indicator for indicating the selected operating position of the shift lever, a signal to operate a gear-ratio indicator for indicating the gear ratio, a signal to operate a snow-mode indicator for indicating the selection of the snow drive mode, a signal to operate an ABS actuator for anti-lock braking of the wheels, and a signal to operate an M-mode indicator for indicating the selection of the M-mode.

Also outputted are signals to operate solenoid-operated valves incorporated in a hydraulic control unit 42 provided to control the hydraulic actuators of the hydraulically operated frictional engaging devices of the differential portion 11 and the automatic transmission portion 20, a signal to operate an electric oil pump used as a hydraulic pressure source for the hydraulic control unit 42, a signal to drive an electric heater, and a signal to be applied to a cruise-control.

Figure 5:
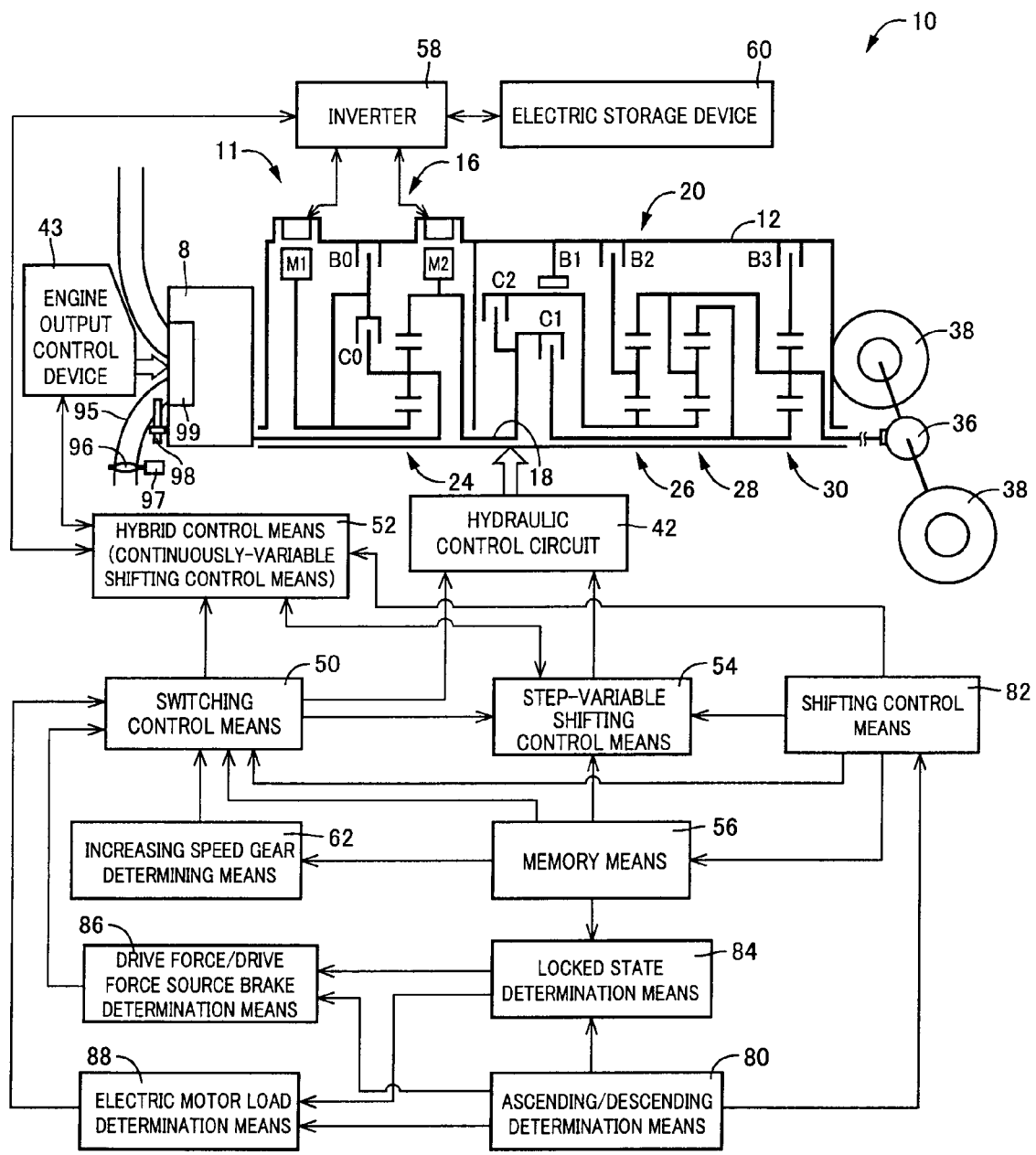
FIG. 5 is a functional block diagram explaining an essence of control operation to be executed by the electronic control device shown in FIG. 4.
Figure 6:
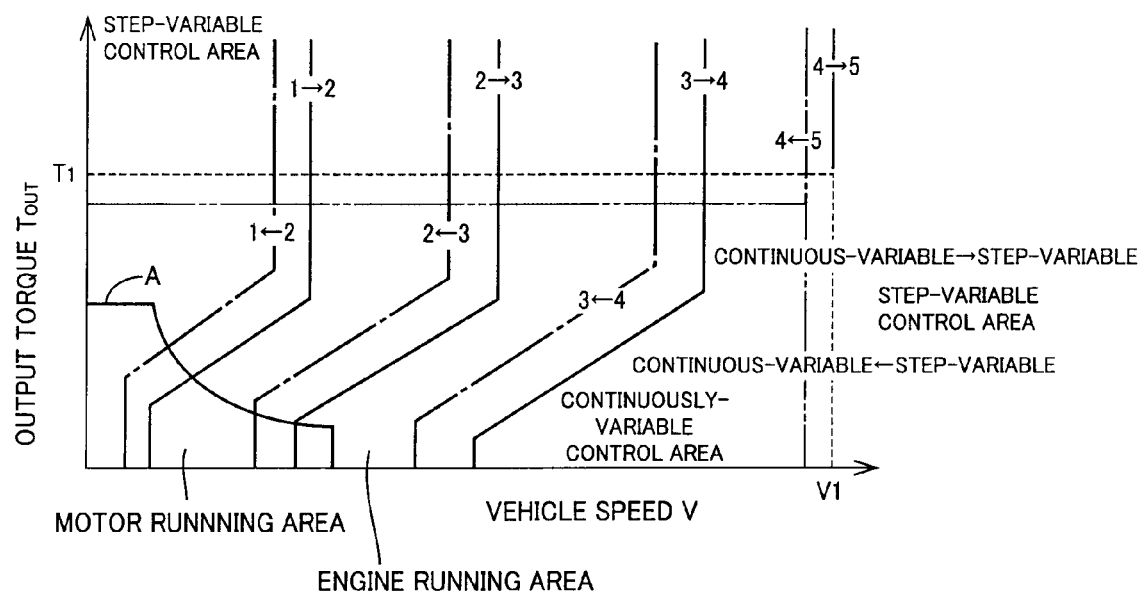
FIG. 6 is a view representing one example of a preliminarily stored shifting diagram based on which a determination on the gear shifting is executed in the automatic transmission, one example of a preliminarily stored shifting diagram based on which a determination on the switching of a shifting state is executed in a shifting mechanism, and one example of a preliminarily stored drive force source switching diagram having a boundary line between an engine running area and a motor running area for an engine running mode and a motor running mode to be switched. They are plotted on a two-dimensional coordinate in terms of as the same parameters as the vehicle speed and output torque, while representing respective relations.
Figure 7:
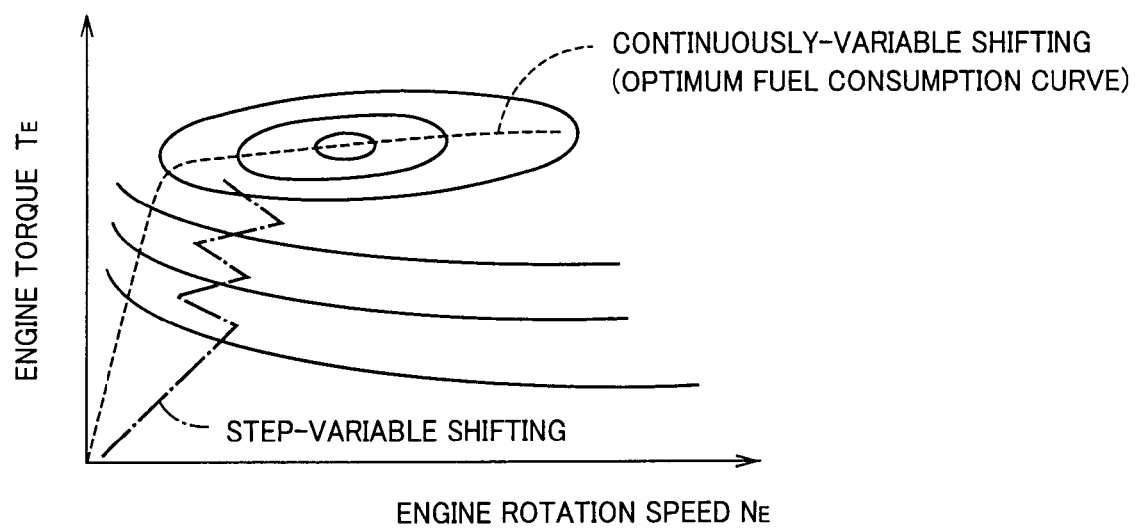
FIG. 7 shows in a broken line an optimum fuel consumption rate curve of the engine 8 which is one sample of the fuel consumption map, and also explains difference between the engine operation in the continuously variable transmission (broken line) and the engine operation in the step variable transmission (single dot line).

FIG. 5 is a functional block diagram for illustrating an essential part of a control function to be performed with the electronic control device 40. In FIG. 5, the step-variable shifting control means (step variable shifting control portion) 54 functions as shifting control means for performing the gear shifting in the automatic transmission portion 20. For instance, the step-variable shifting control means 54 discriminates whether to perform the gear shifting in the automatic transmission portion 20 on the basis of the vehicle condition indicative of the vehicle speed V and the required output torque $T_{out}$ for the automatic transmission portion 20 by referring to a shifting diagram (relation and shifting map), preliminarily stored in the memory means 56, which are shown in FIG. 6 in solid lines and single dot lines.

That is, the step-variable shifting control means 54 discriminates a shifting position, for which the gear shifting is performed with the automatic transmission portion 20, to allow the automatic transmission portion 20 to perform the gear shifting so as to obtain the discriminated shifting position. When this takes place, the step-variable shifting control means 54 outputs a hydraulic command (shifting output command) to a hydraulic control circuit 42 for engaging and/or releasing the hydraulically operated frictional engaging device, excepting the switching clutch C0 and the switching brake B0, so as to achieve a desired shifting position in accordance with, for instance, the operation Table shown in FIG. 2.

That is, the step-variable shifting control means 54 output command to the hydraulic engaging device 42 to execute clutch-to-clutch shifting by disengagement of the disengage side engaging device and engagement of the engage side engaging device. The hydraulic control circuit 42, based on the command, actuates its solenoid-operated valve to actuate the hydraulic actuator of the hydraulic friction engaging device that relates to the shifting operation. Thus, the hydraulic friction engaging device on the release side and the hydraulic friction engaging device on the engaging side both related to the shifting operation, respectively released and engaged, thereby executing the shifting operation of the automatic transmission portion 20.

Hybrid control means (hybrid control portion) 52, functioning as the continuously variable control means, renders the engine 8 operative in an operating region at high efficiency under the continuously variable shifting state of the shifting mechanism 10, that is, the differential state of the differential portion 11. Meanwhile, the hybrid control means 52 allows the rates of drive force being distributed to the engine 8 and the second electric motor M2 and a reactive force of the first electric motor M1 due to the operation thereof for generating electric power to be varied to optimum values, thereby controlling a gear ratio γ0 of the differential portion 11 placed as an electrically controlled continuously variable transmission. For instance, the hybrid control means 52 calculates a target (demanded) output of the vehicle by referring to the accelerator opened magnitude $A_{CC}$ indicative of the amount of output required by a vehicle driver of an accelerator pedal and the vehicle speed V at the current running speed of the vehicle.

Then, the hybrid control means 52 calculates a demanded total target output based on the target output of the vehicle and a charging request value. In order to obtain the total target output, the hybrid control means 52 calculates a target engine output with taking account of the transmitting loss, loads on auxiliary units, the assisting torque of the second electric motor M2, etc. Then, the hybrid control means 52 controls the engine 8 so as to provide the engine rotation speed $N_E$ and the engine torque $T_E$ such that the target engine output is obtained, while controlling the amount of electric power being generated by the first electric motor M1.

The hybrid control means 52 performs hybrid control with taking account of the gear position of the automatic transmission portion 20 to obtain drive power performance while improving fuel consumption. Such hybrid control allows the differential portion 11 to function as the electrically controlled continuously variable transmission so as to allow the engine rotation speed $N_E$, determined for the engine 8 to operate at a high efficiency, to match the transmitting member rotation speed $N_{18}$ determined based on the vehicle speed V and the selected gear position of the automatic transmission portion 20. To this end, the hybrid control means 52 preliminarily stores therein an optimum fuel economy curve (including the fuel economy map and the relations) preliminarily determined on an experimental basis. This allows a compromise to be obtained, during the vehicle running under the continuously variable shifting state, between drivability of the vehicle and fuel economy performance of the engine 8 on the two-dimensional coordinate with the parameters including, for instance, the engine rotation speed $N_E$ and the engine torque $T_E$.

Thus, the hybrid control means 52 determines a target value of the total gear ratio γT of the shifting mechanism 10 to obtain the engine torque $T_E$, causing the engine to generate an output required for satisfying, for instance, the target output (total target output and required drive force), and the engine rotation speed $N_E$. This enables the engine 8 to operate on the optimum fuel economy curve. Then, the hybrid control means 52 controls the gear ratio γ0 of the differential portion 11 to achieve the target value, which allows the total gear ratio γT to be controlled within a variable shifting range, for instance, from 13 to 0.5.

During such hybrid control, the hybrid control means 52 allows electric energy generated by the first electric motor M1 to be supplied to an electric-energy storage device 60 and the second electric motor M2 through an inverter 58. This allows a major portion of the drive force of the engine 8 to be mechanically transmitted to the transmitting member 18. When this takes place, a portion of the drive force of the engine is consumed with the first electric motor M1 for generating electric power to be converted to electric energy. The electric energy is supplied through the inverter 58 to the second electric motor M2, which in turn is driven to transfer the drive force from the second electric motor M2 to the transmitting member 18. Equipment, related to the operations from a phase of generating the electric energy to a phase in which the electric energy is consumed with the second electric motor M2, constitutes an electric path in which the portion of the drive force of the engine 8 is converted to the electric energy which in turn is converted to the mechanical energy.

Furthermore, the hybrid control means 52 allows the differential portion 11 to perform the electrical CVT function to control the rotation speed $N_{M1}$ of the first electric motor M1 and/or the rotation speed $N_{M2}$ of the second electric motor M2. This causes the engine rotation speed $N_E$ to be maintained at an arbitrary level of the rotation speeds, regardless of the vehicle remained under the halted or in running state. In other words, the hybrid control means 52, while controlling the engine rotation speed $N_E$ in a substantially constant level or an arbitrary level, controls the rotation speed $N_{M1}$ of first electric motor M1 and/or the rotation speed $N_{M2}$ of the second electric motor M2 in the arbitrary rotation speed.

As will be apparent from the collinear chart shown in FIG. 3, during the running of the vehicle where the engine rotation speed $N_E$ is raised, the hybrid control means 52 executes the operation to raise, for instance, the first-electric-motor rotational speed $N_{M1}$ while maintaining the second-electric-motor rotational speed $N_{M2}$, bound with the vehicle speed V (of the drive wheels 38), at a nearly constant level. Further, during the shifting of the automatic transmission portion 20 where the engine rotation speed $N_E$ is maintained at the nearly constant level, the hybrid control means 52 varies the first-electric-motor rotational speed $N_{M1}$ in a direction opposite to that in which the second-electric-motor rotational speed $N_{M2}$ is varied with the shifting of the automatic transmission portion 20 while maintaining the engine rotation speed $N_E$ at a nearly constant level.

The hybrid control means 52 functionally includes engine output control means or an engine output control portion. The engine output control means allows a throttle actuator 97 to perform throttle control so as to open or close an electronic throttle valve 96. In addition, the engine output control means allows a fuel injection device 98 to control a fuel injection quantity and fuel injection timing for performing fuel injection control. Further, the engine output control means outputs commands to the engine output control device 43 independently or in combination. This allows the engine 8 to perform output control so as to fundamentally provide the required engine output. For instance, the hybrid control means 52 drives the throttle actuator 60 in response to an accelerator opened magnitude $A_{CC}$ by referring to the preliminarily stored relation, which is not shown, such that the greater the accelerator opened magnitude Acc, the greater will be the throttle valve opened magnitude $θ_{TH}$.

Also, this engine output control device 43, according to the command by the hybrid control means 52, controls a throttle actuator 97 to open/close an electronic throttle valve 96 for the throttle control. It further controls a fuel injection by a fuel injection device 98 for the fuel injection control, and controls an ignition timing by an ignition device 99 for the ignition timing control. All these controls are related to control of the engine torque.

The hybrid control means 52, irrespective of stopped condition or the idling condition of the engine 8, cause the vehicle to run in the motor running mode by the electric CVT function (differential function) of the differential portion 11. For example, a solid line A, shown in FIG. 6, represents a boundary line between the engine running area and the motor running area for the drive power source of the vehicle for starting up/running (hereinafter referred to as "for running") thereof to be switched to the engine 8 and the electric motor, that is, for instance, the second electric motor M2. In other words, the boundary line is used for switching the so-called engine running area, in which the engine 8 is caused to act as a running drive power source for starting up/running (hereinafter referred to as "running") the vehicle, and the so-called motor running area in which the second electric motor M2 is caused to act as a drive power source for running the vehicle.

The preliminarily stored relation, having the boundary line (in the solid line A) shown in FIG. 6 for switching the engine running area and the motor running area, represents one example of the drive force source switching diagram (drive power source map), formed in a two-dimensional coordinate, which takes the vehicle speed V and the output torque $T_{OUT}$, indicative of the drive-force related value, as parameters. Memory means 56 preliminarily stores the drive force source switching diagram together with, for instance, the solid line and the shifting diagram (shifting map) designated by the single dot line which are shown in FIG. 6.

The hybrid control means 52 determines based on the vehicle condition, represented by the vehicle speed V and the required torque output $T_{OUT}$ by referring to, for instance, the drive force source switching diagram shown in FIG. 6 to find whether the motor running area or the engine running area is present, thereby effectuating the motor running area or the engine running area. As will be apparent from FIG. 6, the hybrid control means 52 executes the motor running area at the relatively low output torque $T_{OUT}$, that is, the low engine torque $T_E$ in which the engine efficiency is generally lower than that in the high torque region, or the relatively low vehicle speed area in the vehicle speed V, that is, the low load region.

Accordingly, upon the vehicle starting, the motor starting is normally executed. However, depending on the vehicle state when the accelerator pedal is so deeply depressed that, in the drive force source switch diagram shown in FIG. 6, the required output torque $T_{OUT}$ exceeds the motor running area that is the required engine torque $T_E$, the engine starting is normally executed.

In order to suppress a drag of the engine 8 in a halted i.e., stopped state thereof for improving the fuel economy, the hybrid control means 52 renders the differential portion 11 operative to perform an electrical CVT function (differential function) during the motor running area. This enables the rotation speed $N_{M1}$ of the first electric motor M1 to be controlled in a negative rotation speed, for instance, an idling state. This causes the engine rotation speed $N_E$ to be maintained at a zeroed or nearly zeroed value.

Further, even under the engine running area, the hybrid control means 52 may allow the electric path to be established. In this moment, the electric energies resulting from the first electric motor M1 and/or the electric-storage device 60 are supplied to the second electric motor M2. Thus, the second electric motor M2 is driven to make it possible to perform torque-assisting for the drive force of the engine 8. Thus, in the illustrated embodiment, the engine running area may cover a phase including the engine running area and the motor running area in combination. The torque assist by the second electric motor M2 can be executed to increase the output thereof during the motor running.

Further, the hybrid control means 52 may cause the differential portion 11 to have the electrical CVT function through which the engine 8 can be maintained under the operating state regardless of the halted condition or the low speed condition of the vehicle. For instance, if a drop occurs in a state of charge SOC of the electric-storage device 60 during the halt of the vehicle, the first electric motor M1 needs to generate electric power. In this moment, the drive force of the engine 8 causes the first electric motor M1 to generate electric power while the rotation speed of the first electric motor M1 increases. Thus, even if the rotation speed $N_{M2}$ of the second electric motor M2, uniquely determined with the vehicle speed V, becomes zero (nearly zero) due to the halted condition of the vehicle, the power distributing mechanism 16 performs the differential action. This causes the engine rotation speed $N_E$ to be maintained at a level beyond a rotation speed for autonomous rotation.

The hybrid controlling means 52 cuts off the drive current supplied from the electrical-energy storage device 60 to the first electric motor M1 via the inverter 58 to bring the first electric motor M1 into an unloaded state. When brought into the unloaded state, the first electric motor M1 is allowed to freely rotate, that is, idly rotated. Therefore, the differential portion 11 is brought into the state that cannot transmit torque, that is, in a state similar to the state that disconnects the power transmitting path in the differential portion 11, and is thus brought into the state not to generate the output therefrom. In other words, the hybrid controlling means 52 brings the first electric motor M1 into the unloaded state to bring the differential portion 11 into a disengagement state (neutral state) where the power transmitting path is electrically disconnected.

Further, during the speed reduction running of the vehicle with the accelerator being released or during a brake condition, the hybrid control means 52 functions as regeneration brake control means or regeneration brake controller rendering the second electric motor M2 operative to be drivably driven as an electric power generator due to kinetic energy of a vehicle, i.e., reverse drive power, transmitted from the drive wheels 38 to the engine. That is, a so-called regeneration brake is executed to allow the resulting electric energy, i.e., a second-electric-motor generation current $I_{M2G}$ to be charged to the battery 60 via an inverter 58.

Increasing-speed gear position judge means (increasing-speed gear position judge portion) 62 makes a determination on which one of the switching clutch C0 and the switching brake B0 is to be coupled for placing the shifting mechanism 10 in the step-variable shifting state. That is, the determination is made based on the vehicle condition according to, for instance, the shifting diagram, shown in FIG. 6, which is preliminarily stored in the memory means 56, to find whether or not the gear position to be shifted in the shifting mechanism 10 lies in an increasing-speed gear position, for instance, a 5th-speed gear position.

For example, during the vehicle speed reduction running with the accelerator turned off, occurrence of the pumping loss caused by drag (rotational resistance) of the engine held in the halt state is suppressed to suppress the brake force (speed reduction magnitude) accordingly. In addition, the fuel consumption is improved by increasing the regeneration amount by the second electric motor M2. For this purpose, the hybrid control means 52 shuts a fuel supply to the engine 8 to thereby stop operation of the engine 8, and causes the first electric motor M1 to idly rotate. Thus, the differential operation of the differential portion 11 maintains the engine rotation speed $N_E$ in zero or substantially zero.

Switching control means (switching control portion) 50 switches the engaging state and/releasing state of the engaging device (switching clutch C0 and switching brake B0) depending on the vehicle condition. This allows the continuously variable shifting state and the step-variable shifting state, that is, the differential state and the locked state to be selectively switched. For instance, the switching control means 50 determines whether to switch the shifting state of the shifting mechanism 10 (differential portion 11) based on the vehicle condition represented with the vehicle speed V and the required output torque $T_{OUT}$. This determination is made by referring to the switching diagram (switching map and relation), preliminarily stored in the memory means 56, which are shown in the dotted line and the double dot line in FIG. 6.

That is, the switching control means 50 determines whether the shifting mechanism 10 lies in the continuously variable shifting control region for the continuously variable shifting state, or the step-variable shifting control region for the step-variable shifting state. Thus, the determination is made on the shifting state to be switched by the shifting mechanism 10. Then, the switching control means 50 effectuates the switching of the shifting state for selectively placing the shifting mechanism in any one of the continuously variable shifting state and the step-variable shifting state.

More particularly, if the determination is made that the shifting mechanism 10 lies in the step-variable shifting control region, then, the switching control means 50 outputs a command to the hybrid control means 52 disenabling or interrupting the hybrid control or continuously variable shifting control, while permitting the step-variable shifting control means 54 to perform the shifting for the predetermined step-variable shifting operation. When this takes place, the step-variable shifting control means 54 allows the automatic transmission portion 20 to perform the automatic shifting in accordance with, for instance, the shifting diagram, shown in FIG. 6, which is preliminarily stored in the memory means 56.

For instance, FIG. 2 shows the operation Table, preliminarily stored in the memory means 56, which represents combinations in operation of the hydraulically operated frictional engaging devices, that is, the clutches C0, C1 and C2, and the brakes B0, B1, B2 and B3 to be selected in the shifting control. That is, the shifting mechanism 10, that is, the differential portion 11 and the automatic transmission portion 20, functions as a whole to be the so-called step-variable automatic transmission, thereby establishing the gear positions according to the operation Table shown in FIG. 2.

If the increasing-speed gear position judge means 62 determines the 5th-gear position, the switching control means 50 outputs a command to the hydraulic control circuit 42 for releasing the switching clutch C0 and engaging the switching brake B0. This places the differential portion 11 to function as an auxiliary power transmission with a fixed gear ratio γ0, for instance, the gear ratio γ0 equal to "0.7". Thus, the shifting mechanism 10 can act as a whole to obtain an increasing-speed gear position, that is, a so-called overdrive-gear position with a gear ratio less than 1.0.

In contrast, if no 5th-gear position is determined by the increasing-speed gear position judge means 62, the switching control means 50 outputs a command to the hydraulic control circuit 42 for engaging the switching clutch C0 and releasing the switching brake B0. This places the differential portion 11 to function as the auxiliary power transmission with the fixed gear ratio γ0, for instance, the gear ratio γ0 equal to 1. Thus, the shifting mechanism 10 can act as a whole to obtain a decreasing-speed gear position with a gear ratio greater than 1.0.

Thus, the switching control means 50 switches the shifting mechanism 10 in the step-variable shifting state and selectively switches for the gear positions of two kinds in either one gear position under the step-variable shifting state. This causes the differential portion 11 to function as the auxiliary power transmission and the automatic transmission portion 20, connected to the differential portion 11 in series, is caused to function as the step-variable transmission. Thus, the shifting mechanism 10 is caused to function as the so-called step-variable automatic transmission as a whole.

On the contrary, if the determination is made that the shifting mechanism 10 lies in the step-variable shifting control region, the switching control means 50 outputs a command to the hydraulic control circuit 42 for releasing both the switching clutch C0 and the switching brake B0. Concurrently, the switching control means 50 outputs a command to the hybrid control means 52 for permitting the hybrid control. In addition, the switching control means 50 outputs a predetermined signal to the step-variable shifting control means 54. The predetermined signal is for fixing the shifting mechanism 10 in the gear position upon the predetermined continuously variable shifting state, or for permitting the automatic transmission portion 20 to perform automatic shifting according to, for instance, the shifting diagram, shown in FIG. 6, which are preliminarily stored in the memory means 56.

In such a case, the step-variable shifting control means 54 executes the operations as shown in the operation Table of FIG. 2 excepting the engaging operations of the switching clutch C0 and brake B0, thereby performing the automatic shifting. Thus, the switching control means 50 switches the differential portion 11 to be placed in the continuously variable shifting state to function as the continuously variable transmission. In addition, the automatic transmission portion 20, connected to the differential portion 11 in series, is caused to function as the step-variable transmission. This results in the occurrence of a drive force with a suitable magnitude.

Simultaneously, a continuously variable or stepless change occurs in the rotation speed inputted to the automatic transmission portion 20, that is, the transmitting member rotation speed $N_{18}$ applied to the automatic transmission portion 20 for each gear position of the 1st-gear, 2nd-gear, 3rd-gear and 4th-gear positions. Thus, the respective gear positions are established in gear ratios over a continuously variable shifting range. Accordingly, since the gear ratio is continuously variable across the adjacent gear positions, the shifting mechanism 10 can achieve the overall gear ratio γT in the continuously variable shifting state.

To explain about FIG. 6 in detail, FIG. 6 represents the shifting diagram (relation and shifting map) preliminarily stored in the memory means 56 for a determination to be made to perform the gear shifting in the automatic transmission portion 20. FIG. 6 shows one example of the shifting diagram plotted in a two-dimensional coordinate with parameters in terms of the vehicle speed V and the required output torque $T_{OUT}$ indicative of a drive-force related value. In FIG. 6, a solid line represents an up-shift line and a single dot line represents a downshift line.

Further, in FIG. 6, a broken line represents a determination vehicle speed V1 and a determination output torque T1 for the switching control means 50 to make a determination on the continuously variable control area and the step-variable control area. That is, the broken line in FIG. 6 represents two determination lines. One is a predetermined high vehicle speed determination line, which forms a series of the determination vehicle speed V1 representing a predetermined high-speed running determination line for determining that the hybrid vehicle lies in the high speed running region. Other is a predetermined high-output running determination line which forms a series of the determination output torque T1 representing a predetermined high-output running determination line for determining the drive-force related value relevant to the hybrid vehicle, that is, for instance, the high output running region for the output torque $T_{OUT}$ of the automatic transmission portion 20 to mark the high output.

Further, as sown in a double dot line in FIG. 6 in contrast to the broken line indicated therein, a hysteresis is provided for making a determination on the step-variable shifting control region and the continuously variable shifting control region. That is, FIG. 6 represents a preliminarily stored switching diagram (switching map and relation) for the switching control means 50 to make a regional determination on either the continuously variable control area or the step-variable control area, based on parameters with the vehicle speed V and the output torque $T_{OUT}$ covering the determination vehicle speed V1 and the determination output torque T1. In addition, the memory means 56 may preliminarily store the shifting map, inclusive of such a shifting diagram. Moreover, the shifting diagram may be of the type that includes at least one of the determination vehicle speed V1 and the determination output torque T1, and it may include a preliminarily stored shifting diagram with a parameter taking any of the vehicle speed V and the output torque $T_{OUT}$.

The above shifting diagram, the switching diagram or the drive force source switching diagram or the like may be stored not in the map but in a determination formula for making comparison between the current vehicle speed V and the determination vehicle speed V1, and a determination formula or the like for making comparison between the output torque $T_{OUT}$ and the determination output torque T1. In such a case, the switching control means 50 places the shifting mechanism 10 in the step-variable shifting state when the vehicle condition such as, for instance, the current vehicle speed exceeds the determination vehicle speed V1. In addition, the switching control means 50 places the shifting mechanism 10 in the step-variable shifting state when the vehicle condition such as, for instance, the output torque $T_{OUT}$ of the automatic transmission portion 20 exceeds the determination output torque T1.

Further, sometimes there is a vehicle condition with a defective function due to a failure or a low temperature in control equipment of an electrical system such as an electric motor or the like for rendering the differential portion 11 operative to act as an electrically controlled continuously variable shifting transmission. This includes a defective function caused in equipment associated with an electrical path starting from, for instance, the operation of the first electric motor to generate electric energy to a phase of converting resulting electric energy to mechanical energy. That is, this includes failures or defective functions involved in the first electric motor M1, the second electric motor M2, the inverter 58, the battery 60 and a transmitting path interconnecting these component parts. In such cases, even in the presence of a continuously variable control area, the switch control means 50 may operate with top priority to place the shifting mechanism 10 in a step-variable shifting state for the purpose of ensuring the running of the vehicle. For instance, the switch control means 50 determines whether or not the failure or the defective function occurs in control equipment of the electrical system such as the electric motor or the like for rendering the differential portion 11 operative to act as the continuously variable transmission. When the determination is made to be positive, the shifting mechanism 10 is placed in a step-variable shifting state.

The above drive-force related value is a parameter corresponding to the drive force of the vehicle in one-to-one relation, which may be the drive torque or the drive force at the drive wheel 38. In addition, it may be an output torque $T_{OUT}$, an engine output torque $T_E$, a vehicle acceleration value G of the automatic transmission portion 20; an actual value such as the engine output torque $T_E$ calculated based on the accelerator opened magnitude $A_{CC}$ or the throttle valve opened magnitude $\theta_{TH}$ (or intake air quantity, air/fuel ratio or fuel injection amount) and the engine rotation speed $N_E$; or an estimated value such as the required (target) engine torque $T_E$ calculated based on the accelerator opened magnitude Acc or the throttle valve opened magnitude $\theta_{TH}$, the required (target) output torque or the required drive torque. The vehicle drive torque may be calculated based on not only the output torque $T_{OUT}$, etc., but also the ratio of a differential gear device of and the radius of the drive wheels 38, or may be directly detected by a torque sensor or the like. This is true for each of torques mentioned above.

The above determination vehicle speed V1 is so set that the shifting mechanism 10 is placed in the step variable shifting state at the high speed running, to suppress deterioration of the mileage occurred if the shifting mechanism 10 is placed in the continuously variable shifting state at this high speed running. That is, in the high speed running, the shifting mechanism 10 not including the electric path can be used as the planetary gear type step variable transmission of high efficiency.

Also, the determination torque T1 is set corresponding to the characteristic of the first electric motor M1 in which the maximum output of the electric energy therefrom is made small. This is because for example in the high speed running of the vehicle, the first electric motor M1 is made small by not corresponding the reaction force thereof to the high output area of the engine 8. Alternately, the determining torque T1 is set so that the shifting mechanism 10 is placed in the step variable shifting state. Such setting is based on the view point that requirement for the shifting feeling in which the engine rotation speed varies associating with the shifting is preferred to the requirement for fuel consumption by the driver. That is, in the high speed running, by functioning the shifting mechanism 10 as the continuously variable transmission, the vehicle functions as the step variable transmission which changes the shifting ratio stepwise.

Figure 8:
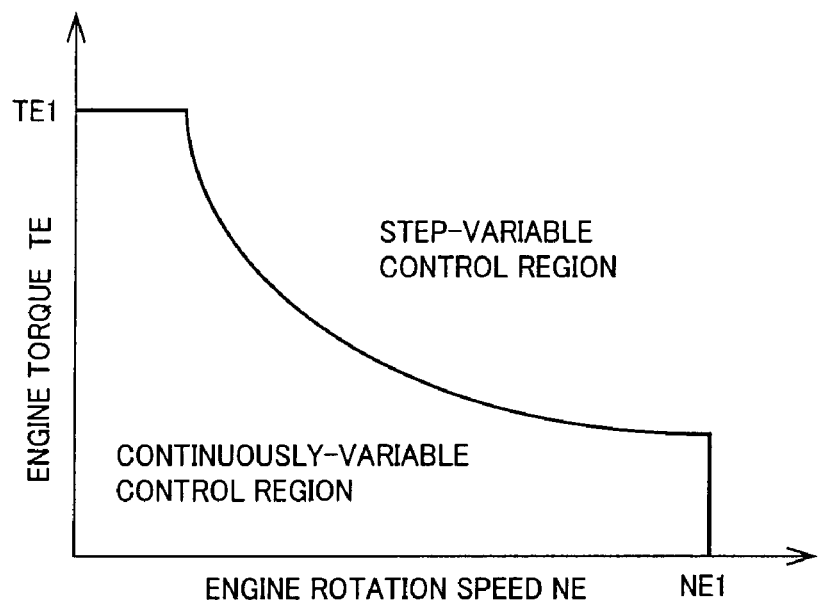
FIG. 8 is a conceptual view showing a preliminarily stored relation having a boundary line between a continuously variable control area and a step variable control area for mapping the boundary line between the continuously variable control area and the step-variable control area shown in broken lines in FIG. 6.

FIG. 8 represents a switching diagram (switching map and relation), preliminarily stored in the memory means 56. It has an engine output line in the form of a boundary line to allow the switching control means 50 to execute the regional determination on which of the step-variable control area and the continuously variable control area is to be selected in terms of the parameters including the engine rotation speed $N_E$ and the engine torque $T_E$. The switching control means 50 may execute the operation based on the engine rotation speed $N_E$ and the engine torque $T_E$ by referring to the switching diagram shown in FIG. 8 in place of referring to the switching diagram shown in FIG. 6. That is, the switching control means 50 may determine whether the vehicle condition, represented with the engine rotation speed $N_E$ and the engine torque $T_E$, is placed in the step-variable control area or the continuously variable control area. Here, FIG. 8 is a conceptual view for the broken line to be plotted as shown in FIG. 6. In other words, the broken line in FIG. 6 also represents switching lines rewritten on the two-dimensional coordinate in terms of the parameters including the vehicle speed V and the output torque $T_{OUT}$ based on the relational diagram (map) shown in FIG. 8.

As indicated on the relation shown in FIG. 6, the step-variable control area is set to lie in the high torque region where the output torque $T_{OUT}$ is greater than the predetermined determination output torque T1, or the high vehicle speed region where the vehicle speed V is greater than the predetermined determination vehicle speed V1. Therefore, a step-variable shift running is effectuated in a high drive torque region, where the engine 8 operates at a relatively high torque, or a relatively high vehicle speed region of the vehicle speed. Further, a continuously variable shift running is effectuated in a low drive torque region where the engine 8 operates at a relatively low torque, or a relatively low vehicle speed region of the vehicle speed, that is, during a normal output region of the engine 8.

In the relation shown in FIG. 8, similarly, the step-variable shifting control region is set to lie in a high-torque region where the engine torque $T_E$ is greater than a predetermined given value TE1, a high-speed rotating region where the engine rotation speed $N_E$ is greater than a predetermined given value NE1, or a high-output region where the engine output, calculated based on the engine torque $T_E$ and the engine rotation speed $N_E$, is greater than a given value. Therefore, the step-variable shift running area is effectuated at a relatively high torque, a relatively high rotation speed or a relatively high-output of the engine 8.

The continuously variable shift running area is effectuated at a relatively low torque, a relatively low rotation speed or a relatively low-output of the engine 8, that is, in the normal output region of the engine 8. The boundary line in FIG. 8 between the step-variable control area and the continuously variable control area corresponds to a high vehicle-speed determination line which forms a series of high vehicle-speed determination values and a high-output running determination line which forms a series of high-output running determination values.

With such a boundary line, the shifting mechanism 10 is placed in the continuously variable shifting state to ensure the vehicle to have fuel economy performance during the running of the vehicle at, for instance, a low/medium speed and low/medium output. In the high speed running region where an actual vehicle speed V exceeds the determination vehicle speed V1, the shifting mechanism 10 is placed in the step-variable shifting state operative to act as a step-variable transmission. Here, the output of the engine 8 is transferred to the drive wheels 38 mainly through a mechanical power transmitting path. This suppresses a loss in conversion between drive power and electric energy, generated when the shifting mechanism 10 is caused to act as an electrically controlled continuously variable transmission, providing improved fuel consumption.

Further, during the running of the vehicle at the high output of the engine where the drive-force related value such as the output torque $T_{OUT}$ or the like exceeds the determination torque T1, the shifting mechanism 10 is placed in the step-variable shifting state acting as the step-variable transmission. Here, the output of the engine 8 is transferred to the drive wheels 38 mainly through the mechanical power transmitting path. Therefore, the electrically controlled continuously variable transmission is caused to operate in the low/medium speed running region and the low/medium output running region of the vehicle. This results in a reduction in the maximum value of the electric energy being generated by the first electric motor M1, that is, the electric energy being transmitted by the same. Thus, a further miniaturization can be achieved in the first electric motor M1 per se or the vehicle drive apparatus including such a component.

In short, when the predetermined value TE1 is preset as the switching determination value for the engine torque $T_E$ where the first electric motor M1 can bear the reaction force, in the high output running where the engine torque TE exceeds the predetermined value TE1, the differential portion 11 is placed in the step-variable shifting state. The first electric motor M1 is not required to bear the reaction force against the engine torque $T_E$, unlike the case the differential portion 11 being placed in the continuously variable shifting state. Thus, the first electric motor M1 is suppressed in deterioration of durability thereof, while being prevented from large-sized.

In other words, in the first electric motor M1 of the first embodiment, the maximum output thereof is selected smaller than the reaction force capacity required for the maximum value of the engine torque $T_E$, that is the maximum output does not correspond to the reaction force capacity against the engine torque $T_E$ exceeding the predetermined value TE1. Thus, miniaturization of the first electric motor M1 is realized.

The maximum output of the first electric motor M1 is a rated value thereof which is experimentally calculated in advance to be permitted as the using environment thereof and is set. The switching determination value of the engine torque $T_E$ corresponds to the maximum value of the engine torque which can be born by the first electric motor M1 or than value smaller than it by the predetermined amount. It is experimentally calculated in advance so that deterioration of durability of the first electric motor M1 is suppressed.

There may be another viewpoint to take account of the requirement of the driving force by the driver than the requirement about the mileage. From such viewpoint, the shifting mechanism 10 is switched to the step-variable shifting state (fixed shifting state) rather than the continuously variable shifting state. This allows a driver to enjoy a change in the engine rotation speed $N_E$ resulting from the up-shifting in the step-variable automatic shift running region as shown in, for instance FIG. 9, that is, a rhythmical change in the rotation speed $N_E$ of the engine.

In the illustrated embodiment, here, when a need arises to have a greater vehicle drive force or a drive force source brake than those needed for a given vehicle running state (hereinafter referred to as "given running state"), the operation is executed to set a total speed ratio γT to a lower vehicle speed gear side (for a low gear side) than that required for the given running state. This allows a gear ratio to be maintained in the lower vehicle speed gear than that required the given running state until a high vehicle-speed gear side.

It is supposed that the given vehicle running includes a vehicle running involved in a predetermined running condition range. For instance, a reference acceleration $G_K$ for an on-even-road running is preset as a parameter in terms of the throttle valve opening $\theta_{TH}$, the vehicle speed V and the engine rotation speed $N_E$. The reference acceleration $G_K$ is compared to an actual vehicle acceleration G and the actual vehicle acceleration G is adjusted to fall in a given range within the predetermined reference acceleration $G_K$ for the vehicle to be regarded to run on the even road.

One example of a need arising to have a greater vehicle drive force than the needed for the given running state supposedly includes the vehicle running on an ascending road in which the actual vehicle acceleration G is less than a given range of the reference acceleration $G_K$. One example of a need arising to have the drive force source brake supposedly includes the vehicle running on a descending road in which the actual vehicle acceleration G becomes greater than a given range of the reference acceleration $G_K$. During the given running state, the automatic transmission portion 20 performs the shifting on the shifting lines shown in FIG. 6. In addition, during the running of the vehicle on the ascending and descending road, the automatic transmission portion 20 performs the shifting on the shifting lines shown in FIG. 10. In the shifting lines shown in FIG. 10, respective shifting lines are altered to higher vehicle speed gears such that the total speed ratio γT is set to the lower vehicle speed gear than that appearing in the shifting lines shown in FIG. 6.

Figure 10:
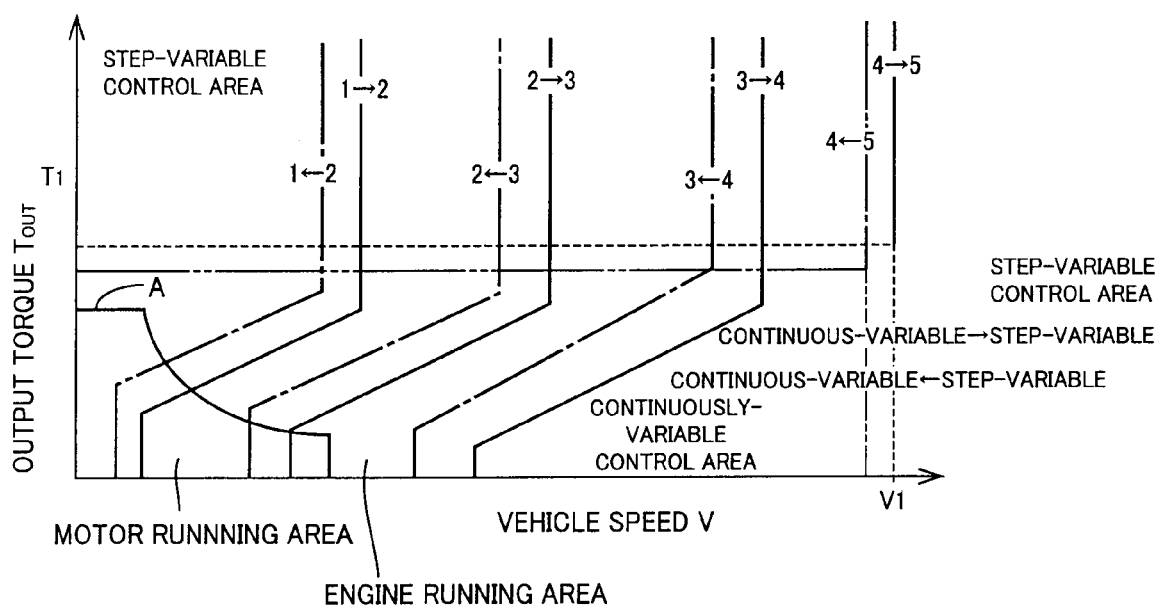
FIG. 10 is a representation of shifting lines, with the respective shifting lines being altered to higher vehicle speed gear ratios for use in an ascending and descending running than those of shifting lines for use in a given running condition shown in FIG. 6.

Therefore, by using the shifting lines shown in FIG. 10 during the running of the vehicle on the ascending and descending road, the vehicular drive apparatus can obtain a greater drive force side during the running of the vehicle on the ascending road than that obtained during the given running state in a range up to the high vehicle speed gear side. Further, using the shifting lines shown in FIG. 10 allows the upshift to be suppressed in a range up to the higher vehicle speed gear side than that achieved in using the shifting lines shown in FIG. 6, thereby precluding the occurrence of a busy shift.

Turning back to FIG. 5, more particularly, ascending/descending road determination means (ascending/descending road determination portion) 80 determines whether a road, on which the vehicle is running, is ascending or descending. For instance, the ascending/descending road determination means 80 presets the reference acceleration $G_K$ for the even road running condition as parameters of the throttle valve opening $\theta_{TH}$, the vehicle speed V and the engine rotation speed $N_E$. In comparing the reference acceleration $G_K$ to the actual vehicle acceleration G, if the actual vehicle acceleration G is less than the reference acceleration $G_K$ by a value less than a given time interval being preset, it is determined that the vehicle is running on the ascending road.

In contrast, if the actual vehicle acceleration G is greater than the reference acceleration $G_K$ by the value greater than the given time interval being preset, it is determined that the vehicle is running on the descending road. The ascending/descending road determination means 80 determines whether or not the ascending or descending road is terminated. For instance, during the running of the vehicle on the ascending and descending road, the ascending/descending road determination means 80 makes comparison between the reference acceleration $G_K$ and the actual vehicle acceleration G. In this case, if the actual vehicle acceleration G belongs to a given range of the reference acceleration $G_K$ for more than a given time interval being preset, then it is determined that the ascending or descending road is terminated.

With the ascending/descending road determination means 80 determined that the ascending or descending road is present, the shifting control means 82 sets the shifting lines for the vehicle running on the ascending/descending road as shown in FIG. 10 such that the total speed ratio γT is set to the lower vehicle speed gear side than that appearing during the given running state. In addition, with the ascending/descending road determination means 80 determined that the ascending or descending road is not present, or with the ascending/descending road determination means 80 determined that the ascending or descending road is terminated, the shifting control means 82 sets the shifting lines for the given running state as shown in FIG. 6.

The step-variable shifting control means 54 determines whether to perform the shifting in the shifting mechanism 10 based on either the shifting lines for the ascending or descending road shown in FIG. 10 being set by the shifting control means 82 or the shifting lines for the given running state shown in FIG. 6. This determination depends on the vehicle condition represented by the vehicle speed and demanded output torque $T_{OUT}$ of the automatic transmission portion 20 by referring to the shifting lines for the given running state shown in FIG. 6. For instance, the step-variable shifting control means 54 determines a shifting gear ratio to be shifted in the automatic transmission portion 20 to cause the automatic transmission portion 20 to execute an automatic shift control so as to obtain the determined shifting gear ratio.

With the differential portion 11 placed in the continuously variable shifting state, the hybrid control means 52 determines a target value of the total speed ratio γT of the shifting mechanism 10. The target value is determined so as to achieve engine torque $T_E$ and engine rotation speed $N_E$ for generating an engine output that satisfies the target output (a total target output and a demanded drive force F*) calculated based on the accel opening Acc and the vehicle speed V. The gear ratio γ0 of the differential portion 11 is controlled in consideration of the gear ratio of the automatic transmission portion 20 for controlling the total speed ratio γT in a variable range for the shifting to be possibly executed, thereby obtaining the target value.

With the differential portion 11 placed in the non-continuously variable shifting state (step-variable shifting state), the hybrid control means 52 controls the engine 8 in consideration of the gear ratio of the shifting mechanism 10. This control is executed so as to achieve engine torque $T_E$ and engine rotation speed $N_E$ for generating the engine output that satisfies the target output (the total target output and the demanded drive force F*) calculated based on the accel opening Acc and the vehicle speed V.

Figure 11:
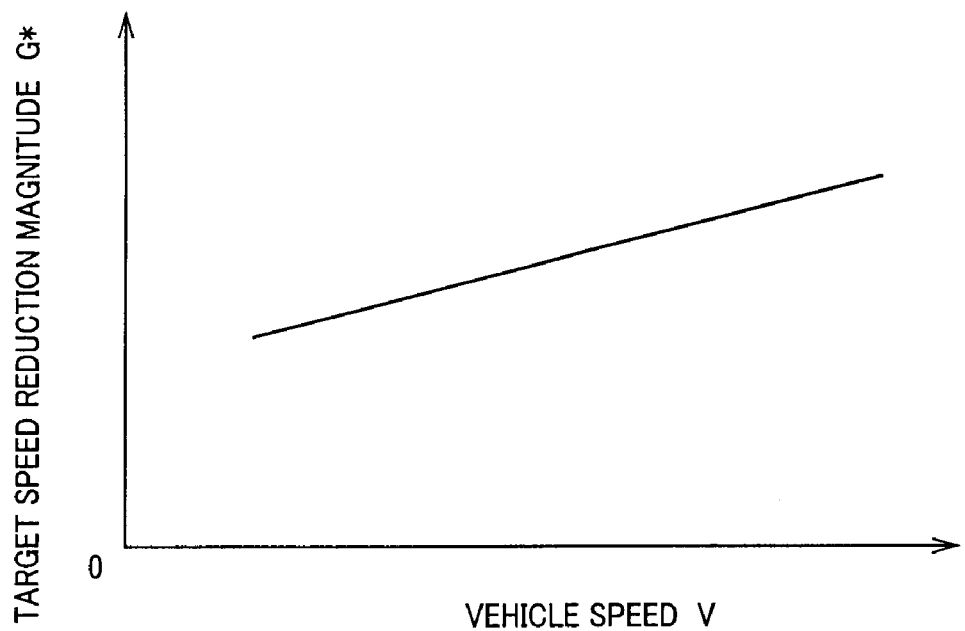
FIG. 11 is a representation of one example of a data map when setting a target speed reduction magnitude as a parameter of a vehicle speed.
Figure 12:
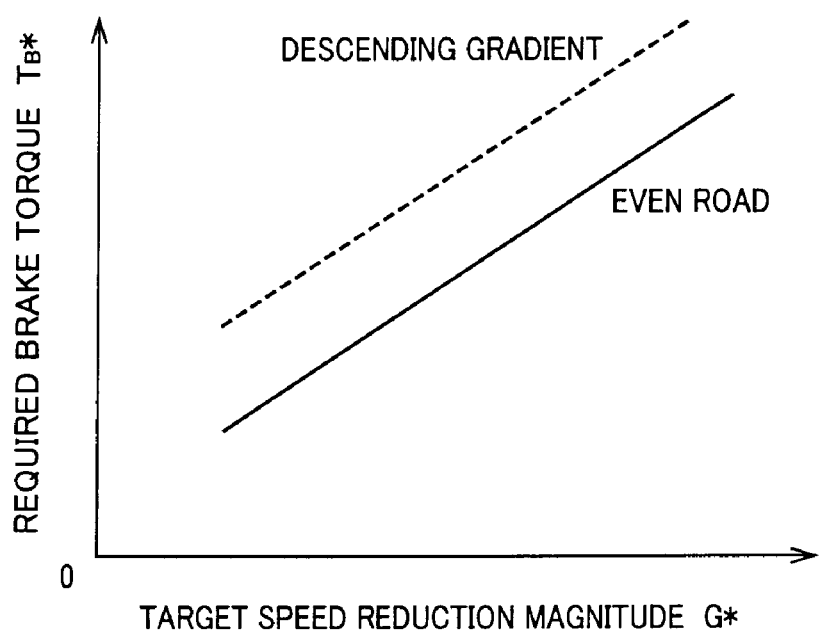
FIG. 12 is a representation of one example of the relationship between a target speed reduction magnitude and required brake torque for calculating required brake torque for achieving the target speed reduction magnitude.

The hybrid control means 52 calculates a target speed reduction magnitude G* for the speed reduction running based on the actual vehicle speed by referring to the relationship, preliminarily and experimentally obtained as shown, for instance, by a solid line in FIG. 11, between the vehicle speed and a target speed reduction magnitude G*. Further, the hybrid control means 52 calculates demanded brake torque $T_B$* for establishing the target speed reduction magnitude G* by referring to, for instance, the relationship, preliminarily and experimentally obtained as shown in FIG. 12, between the vehicle speed and the target speed reduction magnitude G*.

With the differential portion 11 placed in the continuously variable shifting state, the hybrid control means 52 executes the operation in perspective of obtaining brake torque $T_B$ with regeneration torque with top priority in consideration of, for instance, energy efficiency. On that basis, the regeneration is executed at a regeneration amount achieving predetermined regeneration torque using the second electric motor so as to obtain demanded brake torque $T_B$*. This suppresses the occurrence of a pumping loss resulting from the drag (rotational resistance) of the engine 8 such that the drive force source brake (speed reduction magnitude) is suppressed by that extent to increase the regeneration amount. Accordingly, the hybrid control means 52 executes the fuel cut-off operation to stop the operation of the engine 8, causing the first electric motor M1 to idle.

Thus, the hybrid control means 52 maintains the engine rotation speed $N_E$ at a zeroed or nearly zeroed level with no binding from the vehicle speed V due to the differential action of the differential mechanism 11. As used herein, the expression "with no binding from the vehicle speed" refers to the meaning in that the engine rotation speed $N_E$ is free from the rotating-member rotational speed $N_{18}$ uniquely determined based on the rotational speed $N_{OUT}$ of the output shaft 22 of the automatic transmission portion 20 and the gear ratio γ.

With the differential portion 11 placed in the non-continuously variable shifting state (step-variable shifting state), further, the engine rotation speed $N_E$ is bound with the vehicle speed V for causing the engine 8 to be forcibly rotated, thereby obtaining the speed reduction magnitude due to engine brake torque. Accordingly, the vehicular drive apparatus can have brake torque $T_B$ obtained with engine brake torque in addition to regeneration torque. Thus, in obtaining demanded brake torque $T_B$*, the hybrid control means 52 allows torque component in shortage with only regeneration torque or a whole of demanded brake torque $T_B$* to be covered with engine brake torque.

Thus, in the illustrated embodiment, the shifting mechanism 10 (differential portion 11, power transmitting mechanism 16) is possible to be selectively switched in the continuously variable shifting state (differential state) and the non-continuously variable shifting state (non-differential state). The switching control means 50 determines the shifting state to be switched in the differential portion 11, causing the differential portion 11 to be selectively switched to either one of the continuously variable shifting state and the non-continuously variable shifting state. Then, the required drive force and the drive force source brake can be obtained depending on the continuously variable shifting state and the non-continuously variable shifting state of the differential portion 11.

Meanwhile, with the differential portion 11 placed in the continuously variable shifting state, the first electric motor M1 is caused to bear reaction torque depending on engine torque $T_E$, thereby appropriately executing the control. On the contrary, with the differential portion 11 placed in the non-continuously variable shifting state, no need arises for the first electric motor M1 to bear reaction torque, for instance, reaction torque generated against engine torque $T_E$ exceeding the given value $T_{E1}$. This allows the maximum output of the first electric motor M1 to be reduced, thereby achieving the miniaturization.

Then, under a situation where with the differential portion 11 placed in the continuously variable shifting state, the vehicle runs under a high engine load like a status during the running of the vehicle on the ascending road, it is likely that the first electric motor M1 becomes hard to bear reaction torque for engine torque $T_E$. Likewise, with engine torque $T_E$ caused to bear reaction torque for engine torque $T_E$, depending on a performance (rating) of the first electric motor M1, load torque of the first electric motor M1 has likelihood of exceeding the relevant allowable range.

From another standpoint of view, the first electric motor M1 needs to grow in size so as to avoid a shortage in drive force during the running of the vehicle on the ascending road or precluding load torque of the first electric motor M1 from exceeding the relevant allowable range. However, growing the first electric motor M1 in size just for only the running of the vehicle on the ascending road results in deviation from the object (aim) of miniaturizing the first electric motor M1.

In the illustrated embodiment, further, switching the differential portion 11 in the step-variable shifting state minimizes the maximum value of electric energy being transmitted through the electric path. Furthermore, since the automatic transmission portion 20 is incorporated in the power transmitting path from the second electric motor M2 to the drive wheels 38, the second electric motor M2 can also be miniaturized.

Then, under a situation where with the differential portion 11 placed in the continuously variable shifting state, the vehicle performs the speed reduction running like a status during the running of the vehicle on the descending road, brake torque $T_B$ is generated only based on regeneration torque of the second electric motor M2. Therefore, demanded brake torque $T_B*$ for the vehicle to run on a down grade, as shown by a dotted line in FIG. 12, becomes larger than that appearing for the vehicle to run on the even road as shown by a solid line in FIG. 12. Thus, depending on performance (rating) of the second electric motor M2, there is likelihood that a shortage occurs in drive force source brake.

Likewise, regeneration torque is caused to occur based on the rotational speed $N_{M2}$ of the second electric motor M2 uniquely determined with the gear position γ of the automatic transmission portion 20, in which the upshift is suppressed, and the vehicle speed V. This results in likelihood that depending on performance (rating) of the second electric motor M2, relevant load torque exceeds the allowable range. From another point of view, a need arises for the second electric motor M2 to be increased in size just only for the vehicle to run on the descending road so as to avoid drive force source brake during the running of the vehicle on the descending road or not to cause load torque of the second electric motor M2 to exceed the allowable range. Aside from this, depending on a state of charge SOC such as the full charging of the battery 60, there is likelihood that the regeneration amount is suppressed with a resultant shortage in drive force source brake.

Under a circumstance where demanded brake torque $T_B*$ or drive force source brake (brake torque $T_B*$) is unavailable even if the shifting control means 82 sets the total speed ratio γT to the lower speed gear side than that for the given running state or under a circumstance where load torques of the first electric motor M1 or the second electric motor M2 do not fall in the allowable range, the differential portion 11 is switched from the continuously variable shifting state to the non-continuously variable shifting state. This is because such a switching enables demanded vehicle drive force F* or drive force source brake (brake torque $T_B*$) to be obtained under a status where load torques of the first electric motor M1 or the second electric motor M2 do not exceed the allowable range. Hereunder, such a control operation will be described below.

More particularly, locked state determination means (locked state determination section) 84 determines whether or not the differential portion 11 is placed in the non-continuously variable shifting state. For instance, the locked state determination means 84 makes determination based on the vehicle condition, represented by the shifting lines shown in, for instance, FIG. 6, i.e., the vehicle speed V and output torque $T_{OUT}$. The switching control means 50 makes determination as to whether the shifting mechanism 10 remains in the step-variable control for the shifting mechanism 10 to be controllably switched to step-variable shifting state or whether the shifting mechanism 10 remains in the continuously variable control region to be controllably switched to the continuously variable shifting state. With the shifting mechanism 10 remained in the step-variable control region, the determination is made that the differential portion 11 is placed in the non-continuously variable shifting state.

Next, description is made of a case in which the ascending/descending road determination means 80 determines that the vehicle is on the ascending/descending road and the locked state determination means 84 determines that the differential portion 11 is placed in the continuously variable shifting state. Drive force/drive force source brake determination means (drive force/drive force source brake determination section) 86 determines whether or not the demanded vehicle drive force F* or drive force source brake (brake torque $T_B*$) is obtained, i.e., whether or not the demanded vehicle drive force F* for the vehicle to run on the ascending road or the drive force source brake (brake torque $T_B*$) is adequate.

For instance, upon making comparison between a reference acceleration $G_T$ preset for the accel opening Acc for the vehicle to run on the ascending road and the actual acceleration G, the drive force/drive force source brake determination means 86 determines that if the actual vehicle acceleration G is less than the reference acceleration $G_T$, no demanded vehicle drive force F* is obtained. Further, upon making comparison between the target speed reduction magnitude G* for the vehicle to run on the descending road calculated by the hybrid control means 52, and the actual vehicle speed reduction magnitude G, the drive force/drive force source brake determination means 86 determines that if the actual vehicle speed reduction magnitude G is less than the target speed reduction magnitude G*, no demanded drive force source brake (brake torque $T_B*$) is obtained.

Now, description is made of a case in which the ascending/descending road determination means 80 determines that the vehicle is on the ascending/descending road and the locked state determination means 84 determines that the differential portion 11 is placed in the continuously variable shifting state. Electric motor load determination means (electric motor load determination section) 88 determines whether or not load torques of the first electric motor M1 or the second electric motor M2 remain in the allowable range.

For instance, due to a reason for the differential portion 11 to be placed in the continuously variable shifting state during the running of the vehicle on the ascending road, sometimes there is likelihood that the rating of the first electric motor M1 is unavailable to cover reaction torque $T_{M1}$ (=$T_E$·ρ1/(1+ρ1)) to be born with the first electric motor M1. In such a case, the electric motor load determination means 88 determines that the first electric motor M1 has load torque that does not fall in the allowable range. During the running of the vehicle on the descending road, further, sometimes a rating value of the second electric motor M2 does not cover regeneration torque generated based on the second electric motor rotational speed $N_{M2}$ uniquely determined with the gear ratio γ of the automatic transmission portion 20 and the vehicle speed V. In this case, the electric motor load determination means 88 determines that load torque of the second electric motor M2 is out of the allowable range.

Description is made of a situation under which the ascending/descending road determination means 80 determines that the vehicle runs on the ascending/descending road, the shifting control means 82 sets the shifting lines for the ascending/descending road running state as shown in FIG. 10, and the locked state determination means 84 determines that the differential portion is placed in the continuously variable shifting state. If the drive force/drive force source brake determination means 86 determines that the demanded vehicle drive force F* or the drive force source brake (brake torque $T_B*$) is not available, the switching control means 50 operates as follows. That is, the switching control means 50 outputs a command to the hydraulically operated control circuit 42 for coupling the switching clutch C0 or the switching brake B0 so as to switch the differential portion 11 from the continuously variable shifting state to the non-continuously variable shifting state. This similarly applies to a case where the electric motor load determination means 88 determines that load torques of the first electric motor M1 or the second electric motor M2 deviate from the allowable range.

Thus, the switching control means 50 switches the differential portion 11 to the step-variable shifting state and the continuously variable shifting state based on factors involving: a variation in vehicle speed by referring to, for instance, the shifting lines shown in FIG. 6; a case where the vehicle drive force F* required for the vehicle to run on the ascending/descending road or the drive force source brake (brake torque $T_B{}^*$) is not available; or a case where load torques of the first electric motor M1 or the second electric motor M2 deviate from the allowable ranges. In addition, a man-induced operation may be performed to switch the differential portion 11 to the step-variable shifting state and the continuously variable shifting state. Hereunder, such a control operation will be described.

Figure 13:
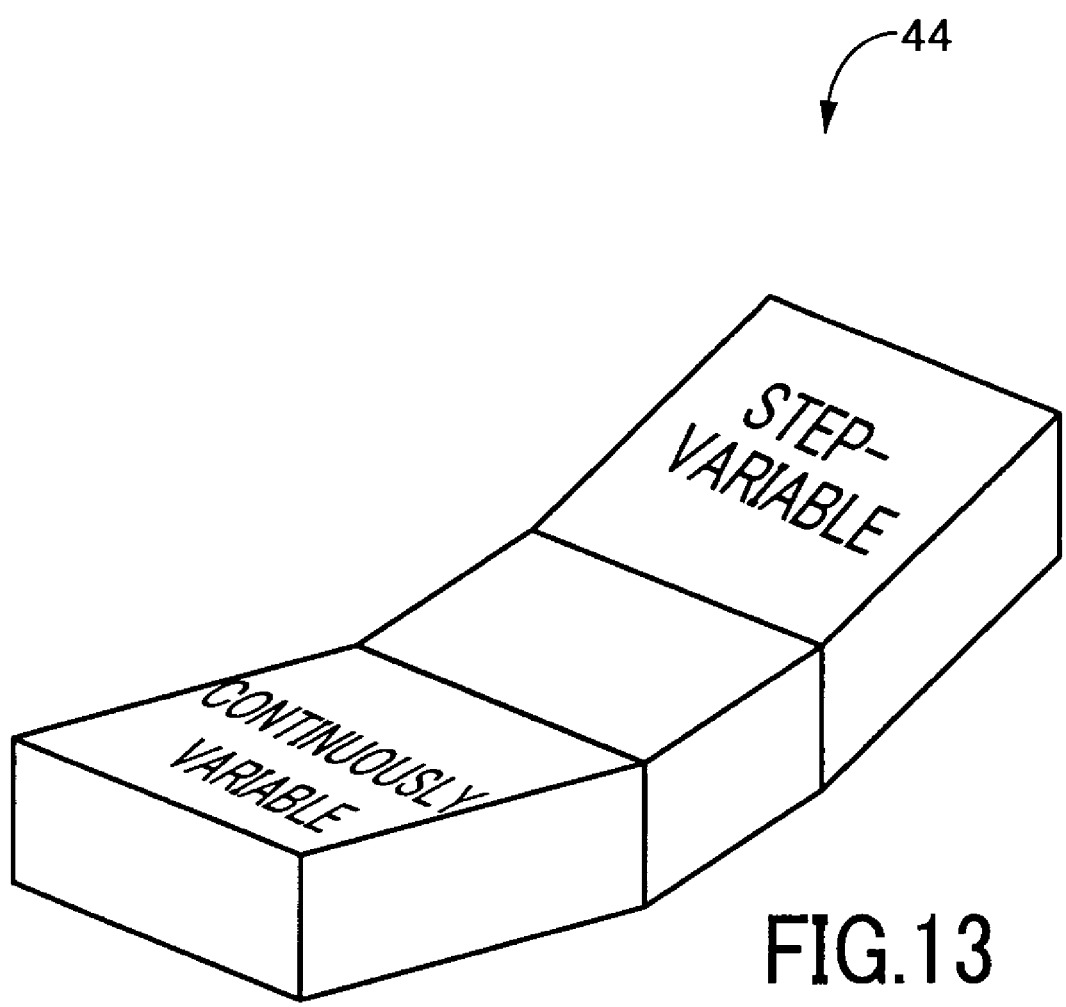
FIG. 13 shows one example of a manual shifting state selection device including a seesaw type switch serving as a switching device to be manipulated by a vehicle driver for selecting a shifting state.

FIG. 13 shows an example a seesaw type switch 44 (hereinafter referred to as a "switch 44"), acting as a shifting-state manual selection device, which is installed on a vehicle for a vehicle driver to manually operate. The switch 44 allows manual operation to cause the power distributing mechanism 16 to be selectively placed in the differential state and the non-differential state (locked state), that is, the continuously variable shifting state and the step-variable shifting state. The switch 44 allows the vehicle to run in a shifting state desired by the vehicle driver. The switch 44 has a continuously variable shift running command button with a display "CONTINUOUSLY VARIABLE", representing a continuously variable shift running mode, and a step-variable shift running command button with a display "STEP-VARIABLE" representing a step-variable shift running mode. Upon depression of the vehicle driver on one of these buttons, the shifting mechanism 10 can be selectively placed in the continuously variable shifting state, operative as the electrically controlled continuously variable transmission, or the step-variable shifting state operative as the step-variable transmission.

For instance, if the user wishes for the vehicle to run to be available to have a feeling of the continuously variable transmission and a fuel saving effect, the user performs a manual operation to render the automatic transmission portion 20 to be operative in the continuously variable shifting state. In contrast, if the user wishes for the vehicle to have improved feeling due to a rhythmical variation in engine rotation speed resulting from the shifting of the step-variable transmission, the user performs the manual operation to select the shifting mechanism 10 being placed in the step-variable shifting state.

The switching control means 50 determines whether a continuously variable shift running command button or a step-variable shift running command button of the switch 44 is selectively depressed, upon which if the step-variable shift running command button is depressed, the switching control means 50 switches the shifting mechanism 10 to the step-variable shifting state with top priority.

If the continuously variable shift running command button of the button 44 is depressed, the switching control means 50 perform the operation in consideration of a case in which the first electric motor M1 is hard to bear reaction torque for engine torque $T_E$ to switch the shifting mechanism 10 in a shifting state depending on the variation in vehicle condition upon referring to, for instance, the relational diagram shown in FIG. 6.

Further, sometimes the switch 44 is provided with a neutral position placed in a status under which none of the continuously variable shift running and the step-variable shift running is selected. Such a condition appears when the switch 44 is placed in the neutral position wherein the user selects no desired shifting state or a desired shifting state is automatically switched. For instance, an automatic switching control operation may be executed for the automatic transmission portion 20 to perform the shifting based on the variation in vehicle speed by referring to the relational diagram shown in FIG. 6.

Figure 14:
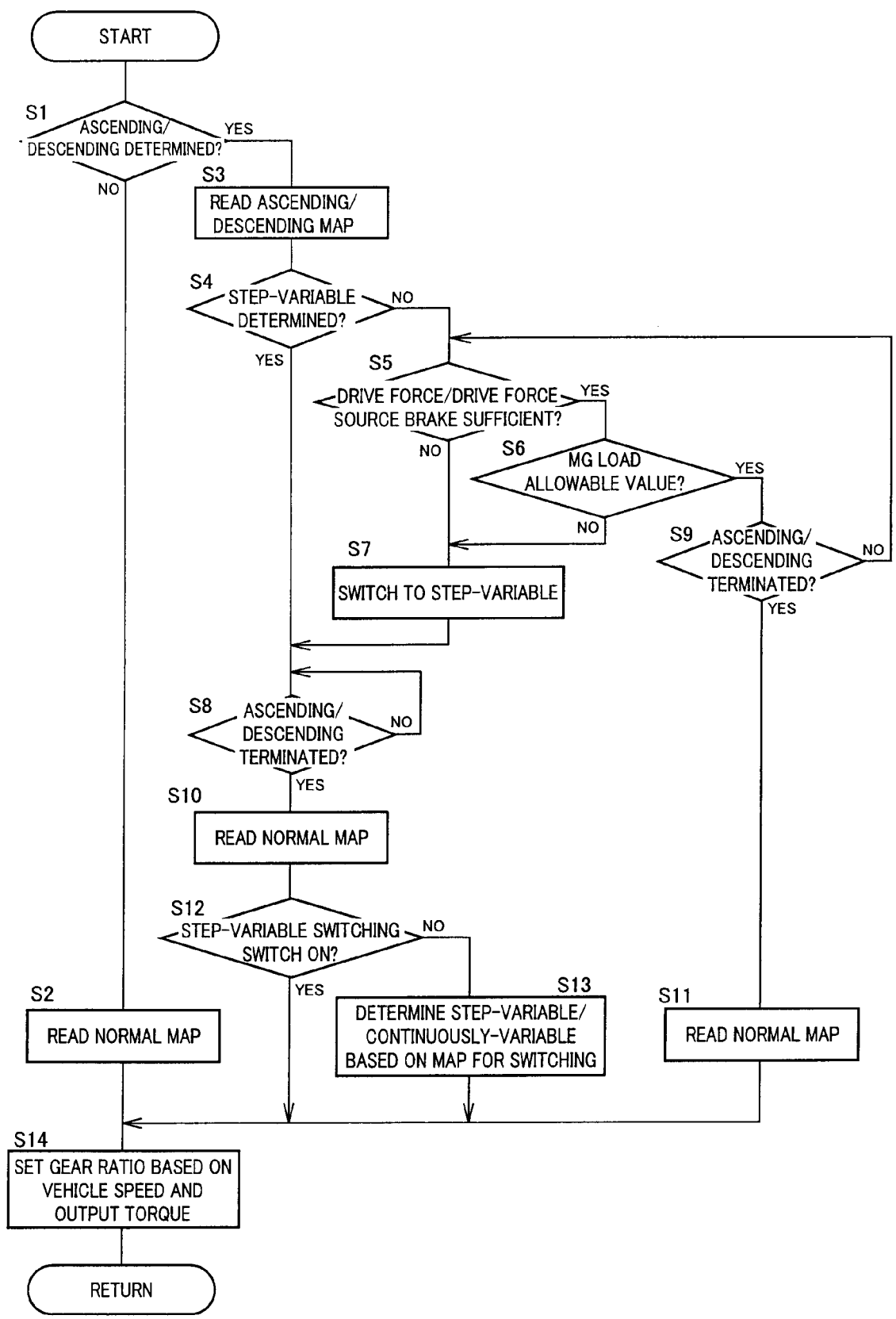
FIG. 14 is a flowchart explaining a control operation of the electronic control device, that is the control operation upon switching the shifting map depending on weather the vehicle is running on the even road or the ascending/descending road.

FIG. 14 is a flowchart illustrating an essence of a control operation to be executed with the electronic control device 40, i.e., a control operation for switching the shifting lines depending on whether the vehicle is running on the even road or on the ascending/descending road. This sequence is repeatedly executed on an extremely short cycle time in the order of several milliseconds or several tens milliseconds.

In step (hereinafter the term "step" is omitted) S1 corresponding to the ascending/descending road determination means 80, the determination is made whether or not the vehicle runs on the ascending/descending road. For instance, a comparison is made between the reference acceleration $G_K$ for the running of the vehicle on the even road, preset as the parameters in terms of, for instance, the throttle valve opening $\theta_{TH}$, the vehicle speed V and the engine rotation speed $N_E$, and the actual vehicle acceleration G. If the actual vehicle acceleration G is less than the reference acceleration $G_K$ by a given range for more than the given time interval, it is determined that the vehicle is running on the ascending road. If the actual vehicle acceleration G is greater than the reference acceleration $G_K$ by the given range for more than the given time interval, it is determined that the vehicle is running on the descending road.

If the determination in S1 is made negative, in S2 corresponding to the shifting control means 82, i.e., a shifting control step, the shifting lines are set as shown in, for instance, FIG. 6.

If the determination in S1 is made positive, then, in S3 corresponding to the shifting control means 82, i.e., the shifting control step, the shifting lines are set for the ascending/descending road running state as shown in FIG. 10 to cause the total speed ratio γT to be set to the lower speed side gear ratio than that appearing for the given running state.

In S4 corresponding to the locked state determination means 84, i.e., a locked state determination step, the determination is made whether or not the differential portion 11 is placed in the non-continuously variable shifting state.

If the determination in S4 is made negative, in S5 corresponding to the drive force/drive force source brake determination means 86, i.e., a drive force/drive force source brake determination step, the determination is made whether or not the vehicle drive force F* or the drive force source brake (brake torque $T_B{}^*$) is available. That is, the determination is made whether or not the vehicle drive force F* or the drive force source brake (brake torque $T_B{}^*$) for the ascending road is sufficient.

If the determination in S5 is made positive, then, in S6 corresponding to the electric motor load determination means 88, i.e., an electric motor load determination step, the determination is made whether or not load torques of the first electric motor M1 or the second electric motor M2 remain in the allowable range.

If the determination in S5 is made negative or the determination in S6 is made negative, then, in S7 corresponding to the shifting switch means 50, i.e., a shifting switch step, a command is output to the hydraulically operated control circuit 42 for coupling the switching clutch C0 or the switching brake B0 such that the differential portion 11 is switched from the continuously variable shifting state to the non-continuously variable shifting state.

If the determination in S4 is made positive or in S8, subsequent to S7, which corresponds to the ascending/descending road determination means 80, i.e., an ascending/descending step, the determination is made whether or not the ascending/descending road is terminated or completed. For instance, during the running of the vehicle on the ascending/descending road, the comparison is made between the reference acceleration $G_K$ and the actual vehicle acceleration G. In this case, if the actual vehicle acceleration G belongs to a given range of the reference acceleration $G_K$ by a given range for more than the given time interval, the determination is made that the ascending/descending road is terminated. The determination in S8 is repeatedly executed until such a determination is made positive. Further, in S7, if, for instance, the differential portion 11 is switched from the continuously variable shifting state to the non-continuously variable shifting state, the switching to the continuously variable shifting state is inhibited until the determination in S8 is made positive.

If the determination in S6 is made positive, then, in S9 corresponding to the ascending/descending road determination means 80, i.e., the ascending/descending road determination step, the determination is made whether or not the ascending/descending road is terminated. If the determination in S9 is made negative, then, the operation in S5 is executed.

If the determination in S8 is made positive, then, in S10 corresponding to the shifting control means 82, i.e., the shifting switch step, for instance, the shifting lines are set for the given running state as shown in FIG. 6.

If the determination in S9 is made positive, then, in S11 corresponding to the shifting control means 82, i.e., the shifting switch step, the shifting liens are set as shown in, for instance, FIG. 6 for the given running state.

In S12, subsequent to S10, which corresponds to the switching control means 50, i.e., the switching control step, the operation is executed to determine the selective operation whether to depress the continuously variable shifting command button or to depress the step-variable shifting command button of the switch 44. For instance, if the depression of the step-variable shifting command button is determined, then, the shifting mechanism 10 is switched to the step-variable shifting state with top priority.

If the determination in S12 is made negative, then, in S13 corresponding to the switching control means 50, i.e., the switching control step, the switching of the shifting state of the automatic transmission portion 20 is executed based on the variation in vehicle condition by referring to, for instance, the shifting lines shown in FIG. 6.

If the determination in S12, subsequent to S2 and S11, is made positive or in S14 corresponding to the step-variable shifting control means 54 and the hybrid control means 52 subsequent to S13, i.e., the step-variable shifting switch step and the hybrid control step, the operation is executed in a manner described below. The determination is made whether or not the shifting mechanism 10 performs the shifting based on the vehicle condition represented with the vehicle speed V and demanded output torque $T_{OUT}$ of the automatic transmission portion 20 by referring to, for instance, the shifting lines for the given running state shown in FIG. 6. For instance, the operation is executed to determine the gear position to be shifted in the automatic transmission portion 20, causing the automatic shift control to be executed to obtain the determined gear position.

With the differential portion 11 placed in the continuously variable shifting state, the target value of the total speed ratio $\gamma T$ of the shifting mechanism 10 is determined so as to establish required engine torque $T_E$ and engine rotation speed $N_E$ for satisfying the demanded drive force F* calculated based on the accel opening Acc and the vehicle speed V. The gear ratio $\gamma 0$ of the differential portion 11 is controlled in consideration of the gear position of the automatic transmission portion 20 so as to obtain the target value, causing the total speed ratio $\gamma T$ to be controlled within a variable shifting range. Meanwhile, with the differential portion 11 placed in the non-continuously variable shifting state, the engine 8 is controlled in consideration of the total speed ratio $\gamma T$ of the shifting mechanism 10 so as to establish required engine torque $T_E$ for satisfying the demanded drive force F*.

In the illustrated embodiment, as set forth above, the switching clutch C0 or the switching brake B0 render, for instance, the differential portion 11 operative to be switched to the continuously variable shifting state or the non-continuously variable shifting state. This results in a drive apparatus with combined advantages of a fuel saving effect of the transmission, in which the gear ratio is electrically changed, and a high transmitting efficiency of the gear-type transmitting device in which drive power is mechanically transferred.

For instance, in the normal output region of the engine where the vehicle runs at the low/medium speed and the low/intermediate output, placing the differential portion 11 in the continuously variable shifting state ensures the vehicle to have increased fuel saving effect. Further, during the running of the vehicle at the high speed with the differential portion 11 placed in the continuously variable shifting state, the output of the engine 8 is transmitted mainly through the mechanical power transmitting path to the drive wheels 38. This suppresses a loss in conversion between drive power and electricity occurring when the differential portion 11 is rendered operative as the transmission in which the gear ratio is electrically changed, resulting in improved fuel saving effect.

For instance, with the differential portion 11 placed in the non-continuously variable shifting state in the high output region of the engine, the differential portion 11 is rendered operative as the transmission, in which the gear ratio is electrically changed for the low/medium speed running and the low/medium output running of the vehicle. This minimizes the maximum value of electric energy to be generated by the first electric motor M1, i.e., electric energy to be transmitted, further miniaturizing the second electric motor M2 and the shifting mechanism 10 including such electric motors.

Further, during the running of the vehicle on, for instance, the ascending road or the descending road with a need arising for a larger vehicle drive force or drive force source brake than those required for the given running state, the drive apparatus operates in a manner as described below. The shifting control means 82 sets the total speed ratio $\gamma T$ to a lower vehicle speed gear ratio than that set for the given running state. Under a circumstance where the required vehicle drive force F* or the drive force source brake (brake torque $T_B$*) is unavailable at the lower vehicle speed gear ratio, or when load torques of the first electric motor M1 or the second electric motor M2 deviate from the allowable range, the shifting switch means 50 switches the differential portion 11 from the continuously variable shifting state to the non-continuously variable shifting state.

Then, no need arises for the first electric motor M1 to bear reaction torque depending on engine torque $T_E$. This allows large engine torque $T_E$ to be generated regardless of the torque capacity of the first electric motor M1, thereby obtaining the required drive force F*. Further, with the engine rotation speed $N_E$ bound with the vehicle speed V, engine brake torque is generated depending on the vehicle speed V and the total speed ratio γT, thereby obtaining the drive force source brake (brake torque $T_B$*) without causing an increase in regeneration torque of the second electric motor M2. That is, the vehicular drive apparatus can obtain the larger vehicle drive force or drive force source brake than that for required the given running state without causing load torques of the first electric motor M1 or the second electric motor M2 from deviating from the relevant allowable ranges.

Next, other embodiments of the present invention will be described below. In the following description, like or corresponding component parts common to several embodiments bear like reference characters throughout the several views with relevant description being omitted.

Embodiment 2

Figures 15, 16:
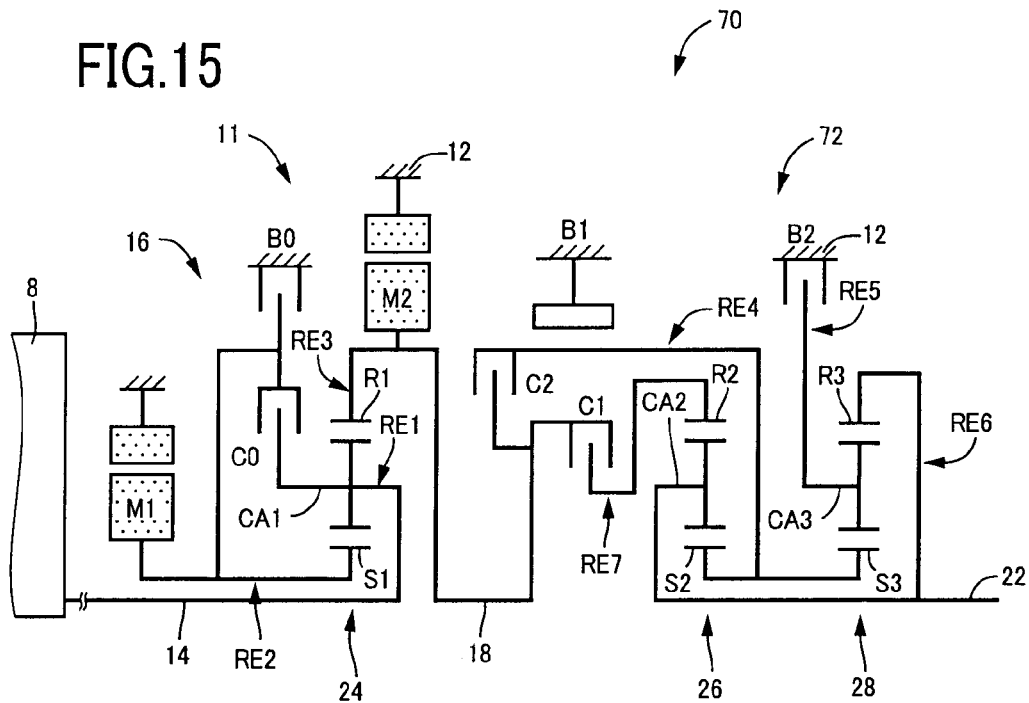
FIG. 15 is a skeleton view explaining a drive apparatus of a hybrid vehicle according to other embodiment of the present invention, corresponding to FIG. 1.
FIG. 16 is an operation Table explaining a relation between a shifting operation of the drive apparatus of the hybrid vehicle of the embodiment shown in FIG. 15 operable in a continuously variable shifting state or a step variable shifting state, and operation combinations of hydraulic-type frictionally engaging devices used therefore, corresponding to FIG. 2.
Figure 17:
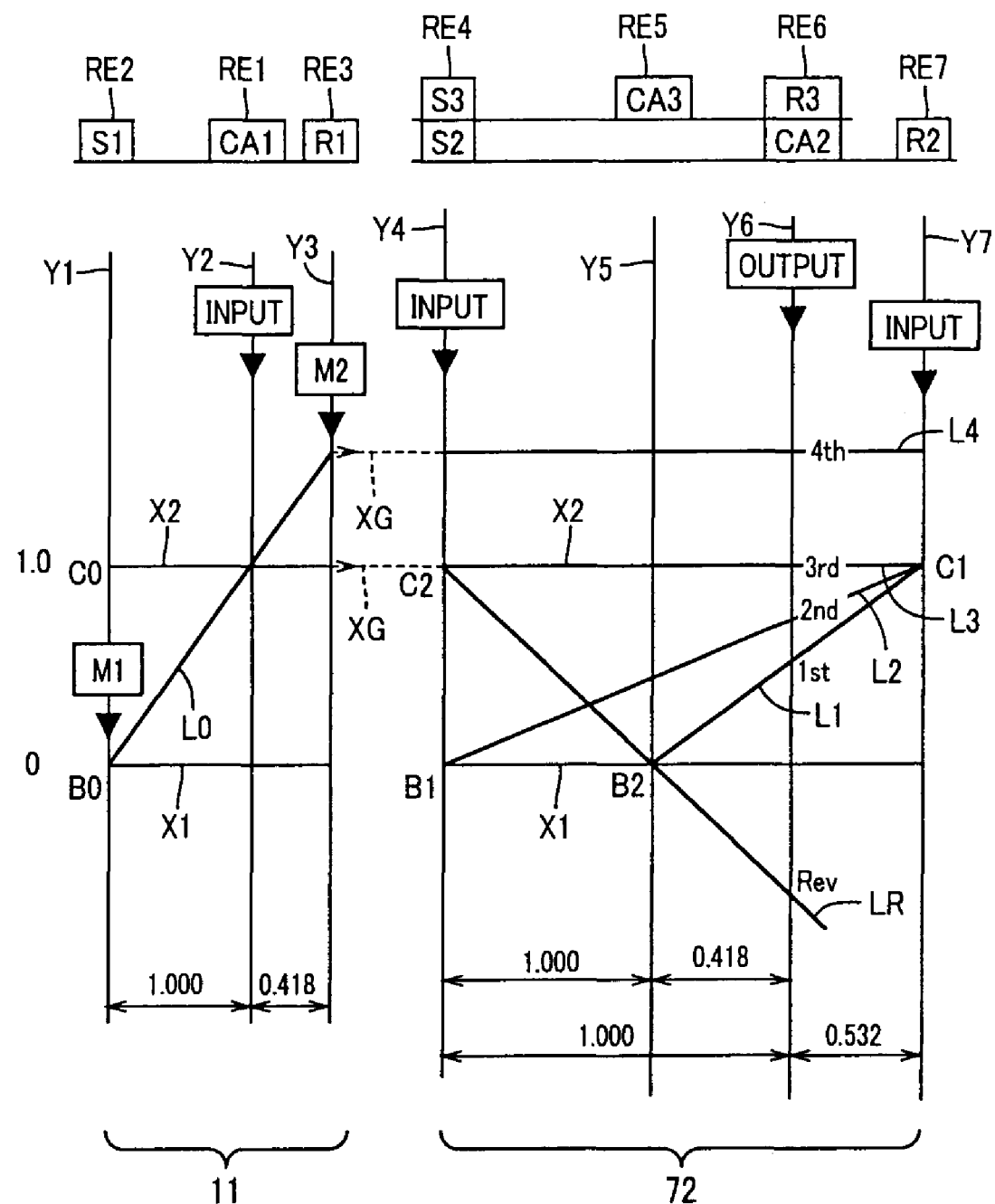
FIG. 17 is a collinear chart explaining relative rotation speeds of rotary elements in each of gear positions when the drive apparatus of the hybrid vehicle of the embodiment shown in FIG. 15 is operated in the step variable shifting mode, corresponding to FIG. 3.

FIG. 15 is a skeleton view explaining structure of a shifting mechanism 70 according to other embodiment of the present invention. FIG. 16 is an operation Table indicating a relation between a shifting position of the shifting mechanism 70, and operation combinations of hydraulic-type frictionally engaging devices used therefor. FIG. 17 is a collinear chart explaining a shifting operation of the shifting mechanism 70.

Like the illustrated embodiment described above, the shifting mechanism 70 comprises the differential portion 11 including the first electric motor M1, the power distributing mechanism 16 and the second electric motor M2, and an automatic transmission portion or the automatic shifting portion 72 with three forward-gear positions connected to the differential portion 11 and the output shaft 22 in series via the transmitting member 18. The power distributing mechanism 16 includes the first planetary gear unit 24 of the single pinion type having a given gear ratio ρ1 of, for instance about 0.418, the switching clutch C0 and the switching brake B0. The automatic transmission portion 72 includes the second planetary gear unit 26 of the single pinion type having a given gear ratio ρ2 of, for instance about 0.532, and the third planetary gear unit 28 of the single pinion type having a given gear ratio ρ3 of, for instance about 0.418.

The sun gear S2 of the second planetary gear unit 26 and the sun gear S3 of the third planetary gear unit 28 are integrally connected to each other. These sun gears S2 and S3 are selectively coupled to the transmitting member 18 via the second clutch C2 and also selectively coupled to the case 12 via the first brake B1. The second carrier CA2 of the second planetary gear unit 26 and the third ring gear R3 of the third planetary gear unit 28 integrally connected to each other are connected to the output shaft 22. The second ring gear R2 is selectively connected to the transmitting member 18 via the first clutch C1 and the third carrier CA3 is selectively coupled to the case 12 via the second brake B2.

With the shifting mechanism 70 thus constructed, the switching clutch C0, the first clutch C1, the second clutch C2, the switching brake B0, the first brake B1 and the second brake B2 are selectively coupled as shown by, for instance, the operation Table shown in FIG. 16. One of a 1st-gear position (1st-speed position) to a 4th-gear position (4th-speed position), a reverse-gear position (rear-drive position) or a neutral position is selectively established. In this moment, each gear position has a gear ratio γ (=input shaft speed $N_{IN}$/output shaft speed $N_{OUT}$) that substantially varies in equal ratio.

In particular, with the present embodiment, the power distributing mechanism 16 incorporates the switching clutch C0 and the switching brake B0. With either the switching clutch C0 or switching brake B0 being coupled, the differential portion 11 can be structured to assume the continuously variable shifting state operative as the continuously variable transmission and, in addition thereto, the fixed shifting state operative as a transmission with a fixed gear ratio. Accordingly, with either the switching clutch C0 or switching brake B0 brought into coupling engagement, the shifting mechanism 70 can take a structure for the step variable shifting state operative as the step variable transmission with the differential portion 11 placed in the fixed shifting state, and the automatic transmission portion 72.

With both the switching clutch C0 and switching brake B0 brought into releasing states, the shifting mechanism 70 can take the continuously variable shifting state operative as the electrically controlled continuously variable transmission with the differential portion 11 placed in the continuously variable shifting state, and the automatic transmission portion 72. In other words, the shifting mechanism 70 is switched to the step-variable shifting state upon engaging either the switching clutch C0 or the switching brake B0, and switched to the continuously variable shifting state upon releasing both the switching clutch C0 and switching brake B0.

For the shifting mechanism 70 to function as the step variable transmission, as shown for instance in FIG. 16, the switching clutch C0, the first clutch C1 and the second brake B2 are coupled or engaged, which establishes the 1st-gear position having the highest gear ratio γ1 of, for instance, about 2.804. With the switching clutch C0, the first clutch C1 and the first brake B1 being coupled, a 2nd-gear position is established with a gear ratio γ2 of, for instance, about 1.531 that is lower than that of the 1st-gear position. With the switching clutch C0, the first clutch C1 and the second clutch C2 being coupled, a 3rd-gear position is established with a gear ratio γ3 of, for instance, about 1.000 that is lower than that of the 2nd-gear position.

With the first clutch C1, the second clutch C2 and the switching brake B0 being coupled, a 4th-gear position is established with a gear ratio γ4 of, for instance, about 0.705 that is lower than that of the 3rd-gear position. Further, with the second clutch C2 and the second brake B2 being coupled, a reverse-gear position is established with a gear ratio γR of, for instance, about 2.393 that is intermediate between those of the 1st-gear and 2nd-gear positions. In addition, for the neutral "N" state to be established, for instance, only the switching clutch C0 is coupled.

In contrast, for the shifting mechanism 70 to function as the continuously variable transmission, both the switching clutch C0 and the switching brake B0 are uncoupled or disengaged as indicated in the operation Table shown in FIG. 16. This allows the differential portion 11 to function as the continuously variable transmission, and the automatic transmission portion 72 connected to the differential portion 11 in series to function as the step variable transmission. When this takes place, the rotation speed input to the automatic transmission portion 72 for the gear positions placed in the 1st-gear, 2nd-gear and 3rd-gear positions, respectively, that is, the rotation speed of the transmitting member 18, is caused to continuously vary. This allows the respective gear positions to have gear ratios in continuously variable ranges. Accordingly, the automatic transmission portion 72 has a gear ratio that is continuously variable across the adjacent gear positions, causing the shifting mechanism 70 to have the overall gear ratio γT variable in a continuous fashion as a whole.

FIG. 17 shows a collinear chart representing relative relations on the rotation speeds of the rotary elements coupled in differing states for the intended gear positions in the shifting mechanism 70, respectively. The shifting mechanism 70 is structured with the differential portion 11 functioning as the continuously variable shifting portion or first shifting portion, and the automatic transmission portion 72 functioning as the shifting portion (step-variable shifting portion) or a second shifting portion. For the switching clutch C0 and the switching brake B0 to be uncoupled i.e., disengaged, and for the switching clutch C0 or the switching brake B0 to be coupled i.e., engaged, the rotary elements of the power distributing mechanism 16 rotate at the same speeds as those stated above.

In FIG. 17, the automatic transmission portion 72 operates on four vertical lines Y4, Y5, Y6 and Y7 corresponding to fourth to seventh rotary element s RE4 to RE7 in order from the left, respectively. The fourth rotary element (fourth element) RE4 represents that the second and third sun gears S2 and S3 are connected to each other. The fifth rotary element (fifth element) RE5 corresponds to the third carrier CA3. The sixth rotary element (sixth element) RE6 represents that the second carrier CA2 and the third ring gear R3 are connected to each other.

The seventh rotary element (seventh element) RE7 corresponds to the second ring gear R2. Further, in the automatic transmission portion 72, the fourth rotary element RE4 is selectively connected to the transmitting member 18 via the second clutch C2 and selectively connected to the case 12 via the first brake B1. The fifth rotary element RE5 is selectively connected to the case 12 via the second brake B2. The sixth rotary element RE6 is connected to the output shaft 22 of the automatic transmission portion 72. The seventh rotary element RE7 is selectively connected to the transmitting member 18 via the first clutch C1.

The automatic transmission portion 72 operates in a manner as shown in FIG. 17. That is, with both the first clutch C1 and the second brake B2 being coupled, an intersection point between an inclined linear line L1 and the vertical line Y6 represents the rotation speed of the output shaft 22 in the 1st-speed position. The inclined linear line L1 passes across an intersection point between the vertical line Y7 indicative of the rotation speed of the seventh rotary element (seventh element) RE7 (R2), and an intersection point between the vertical line Y5 indicative of the rotation speed of the fifth rotary element RE5 (CA3), and a horizontal line X1. The vertical line Y6 represents the rotation speed of the sixth rotary element (sixth element) RE6 (CA2, R3) connected to the output shaft 22.

Likewise, an intersection point between an inclined linear line L2 determined with both the first clutch C1 and the first brake B1 being coupled, and the vertical line Y6 indicative of the rotation speed of the sixth rotary element RE6 connected to the output shaft 22, represents the rotation speed of the output shaft 22 in the 2nd-speed position. An intersection point between a horizontal linear line L3 determined with both the first clutch C1 and the second clutch C2 being coupled, and the vertical line Y6 indicative of the rotation speed of the sixth rotary element RE6 connected to the output shaft 22, represents the rotation speed of the output shaft 22 in the 3rd-speed position.

For the 1st-speed to the 3rd-speed positions, as a result of the switching clutch C0 being coupled, the differential portion 11 inputs drive power to the seventh rotary element RE7 at the same rotation speed as the engine rotation speed $N_E$. However, as the switching brake B0 is coupled in place of the switching clutch C0, the differential portion 11 inputs drive power to the seventh rotary element RE7 at a rotation speed higher than the engine rotation speed $N_E$. Thus, an intersection point between a horizontal linear line L4 determined with the first clutch C1, the second clutch C2 and the switching brake B0 being coupled, and the vertical line Y6 indicative of the rotation speed of the sixth rotary element RE6 connected to the output shaft 22, represents the rotation speed of the output shaft 22 in the 4th-speed position.

Even with the present embodiment, the shifting mechanism 70 includes the differential portion 11 functioning as the continuously variable transmission or the first shifting portion, and the automatic transmission portion 72 functioning as the shifting portion (step-variable transmission portion) or the second shifting portion. This allows the shifting mechanism 70 to have the same advantageous effects as those of the embodiment described above.

Embodiment 3

Figure 18:
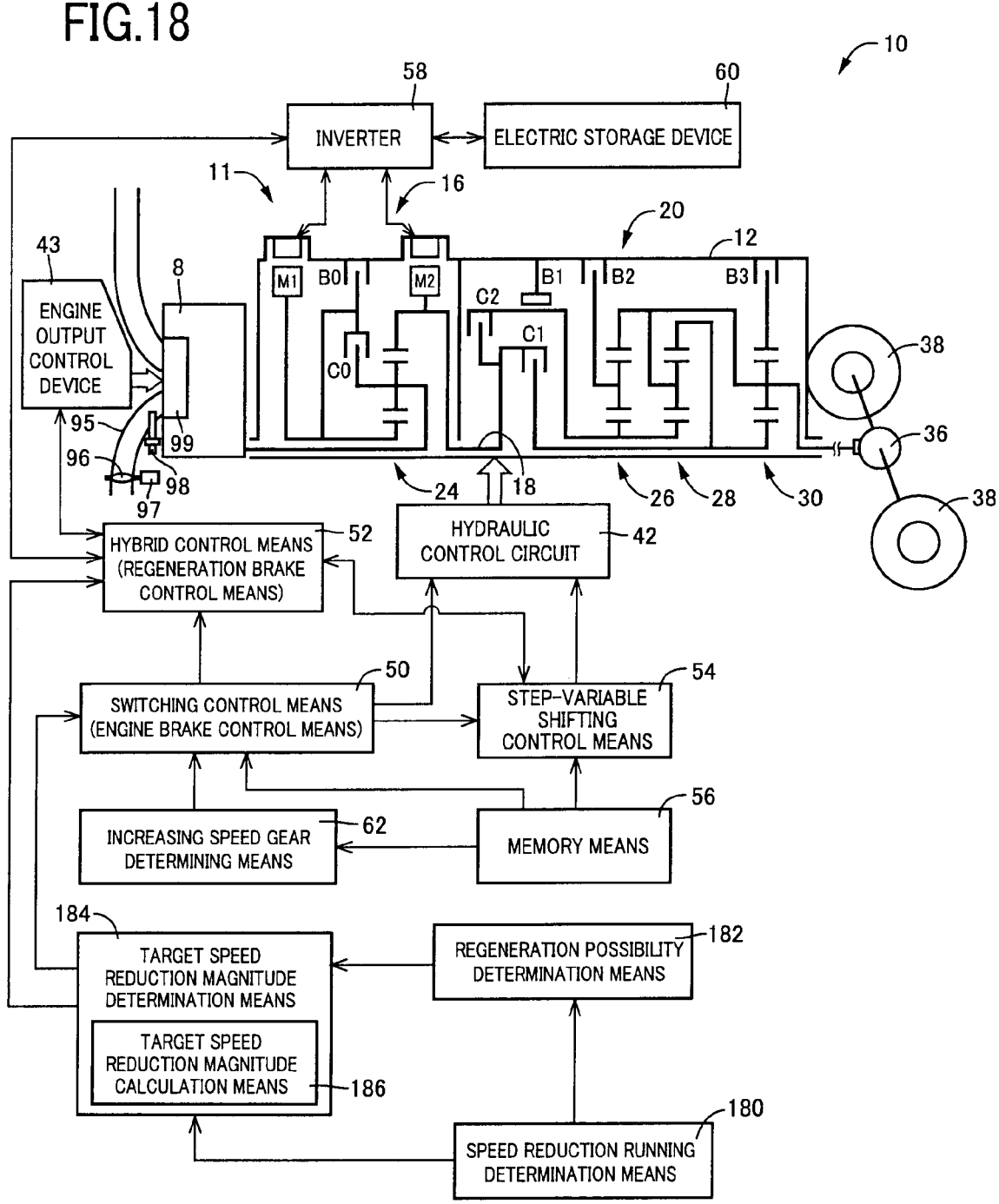
FIG. 18 is a functional block diagram illustrating the other example of an essence of a control function to be executed by an electronic control device shown in FIG. 4.

FIG. 18 is a functional block diagram illustrating an essence of another example of a control function to be executed by the electronic control device 40. In the illustrated embodiment shown in FIG. 18, the target speed reduction magnitude G* is set for the speed reduction running of the vehicle and brake torque is generated so as to achieve the target speed reduction magnitude G*. Although this brake torque is obtained on, for instance, the regeneration, engine brake and wheel brake or the like, the brake on the regeneration is effectuated with top priority in light of the energy efficiency. As will be apparent from the shifting lines of FIG. 6, the differential portion 11 is switched to the continuously variable shifting state during the speed reduction running with the accelerator pedal being released. In achieving the target speed reduction magnitude G* with the regeneration, the hybrid control means 52 initiates the fuel cutoff operation for stopping the operation of the engine 8 while causing the idling of the first electric motor M1.

This allows the differential portion 11 to perform the differential action, maintaining the engine rotation speed $N_E$ at the zeroed or nearly zeroed level with no binding with the vehicle speed V, i.e., regardless of the transmitting member rotational speed $N_{18}$ uniquely determined based on the rotational speed $N_{OUT}$ of the output shaft 22 of the automatic transmission portion 20 and the gear ratio γ. Therefore, this suppresses the occurrence of the pumping loss due to the drag (rotational resistance) of the engine 8, resulting in the suppression of the brake force (speed reduction magnitude) with an increase in the regeneration amount.

However, there is likelihood that depending on the target speed reduction magnitude G* being set, the regeneration amount is hard to be achieved only with the regeneration and the regeneration amount is suppressed depending on the state of charge SOC of the battery 60.

In the illustrated embodiment, if the target speed reduction magnitude G* is hard to be achieved with only the regeneration, brake torque is obtained with engine brake during the speed reduction running. For instance, if the engine rotation speed $N_E$ is maintained at the zeroed level with the differential portion 11 placed in the continuously variable shifting state, no engine brake force (torque) is generated. The differential portion 11 is placed in the non-continuously variable shifting state with the engine rotation speed $N_E$ bound with the vehicle speed V. This causes the engine 8 to be forcibly rotated, thereby obtaining the speed reduction magnitude due to engine brake torque. This enables the vehicle to have brake torque due to, in addition to regeneration torque, engine brake torque, thereby increasing a range of the achievable speed reduction magnitude G with improved performance controllability for the target speed reduction magnitude G*.

With the differential portion 11 placed in the non-continuously variable shifting state, the engine rotation speed $N_E$ is determined on one-to-one for the vehicle speed V and resulting engine brake torque is determined on one-to-one for the vehicle speed V. It is conceived that if engine brake torque can be varied upon varying the engine rotation speed $N_E$ relative to the vehicle speed V, performance controllability for the target speed reduction magnitude G* is further improved.

During the speed reduction running, the switching clutch C0 or the switching brake B0 is completely coupled to place the differential portion 11 in the non-continuously variable shifting state. In addition to such operation, placing the switching clutch C0 or the switching brake B0 in a half-coupled (slipping) state allows the differential portion 11 to lie in a shifting state between the continuously variable shifting state and the non-continuously variable shifting state, thereby forcibly rotating the engine 8.

With the switching clutch C0 or the switching brake B0 placed in the half-coupled (slipping) state, the first electric motor M1 and the switching clutch C0 or the switching brake B0 bear reaction torque for engine torque $T_E$. When this takes place, varying the coupling hydraulic pressure of the switching clutch C0 or the switching brake B0 allows the relevant torque capacity to vary. This enables the engine rotation speed $N_E$ to vary from zero within a range of the rotational speed bound with the vehicle speed V in the non-continuously variable shifting state. That is, the switching clutch C0 or the switching brake B0 is placed in the half-coupled state when limiting the differential action of the differential portion 11 to vary the limiting amount for limiting the differential action.

In FIG. 18, more particularly, speed reduction running determination means (speed reduction running determination portion) or on-speed reduction running determination means 180 makes the determination based on the accel opening Acc whether or not the vehicle is under the speed reduction running with the accelerator pedal being released, i.e., under a coast running. With the speed reduction running determination means 180 determined that the vehicle is under the speed reduction running, the hybrid control means 52 causes the fuel injection valve 92 to interrupt the supply of fuel to the engine 8 for improving fuel consumption.

Upon determination of the speed reduction running determination means 180 that the vehicle is under the speed reduction running, regeneration possibility determination means (regeneration possibility determination portion) 182 determines whether or not the hybrid control means 52 is available to initiate the regeneration. The regeneration possibility determination means 182 determines that no regeneration is available under situations described below. For instance, such a situation arises when the state of charge SOC of the battery 60 satisfies a predetermined upper limit value $SOC_{MAX}$, for instance, a state of charge $SOC_{80\%}$ in the order of approximately 80% of a full charging with no need arises for the battery 60 to be charged. Besides, another situation exists wherein a failure or a defective function occurs in the first electric motor M1, the second electric motor M2, the inverter 58, the battery 60 and the transmitting path interconnecting these component parts with the occurrence of a drop in a power generation capacity.

Target speed reduction magnitude determination means (target speed reduction magnitude determination portion) 184 includes target speed reduction magnitude calculation means (target speed reduction magnitude calculation section) 186 for calculating the target speed reduction magnitude G* for the speed reduction running, thereby generating brake torque for the vehicle so as to achieve the target speed reduction magnitude G*.

Figure 9:
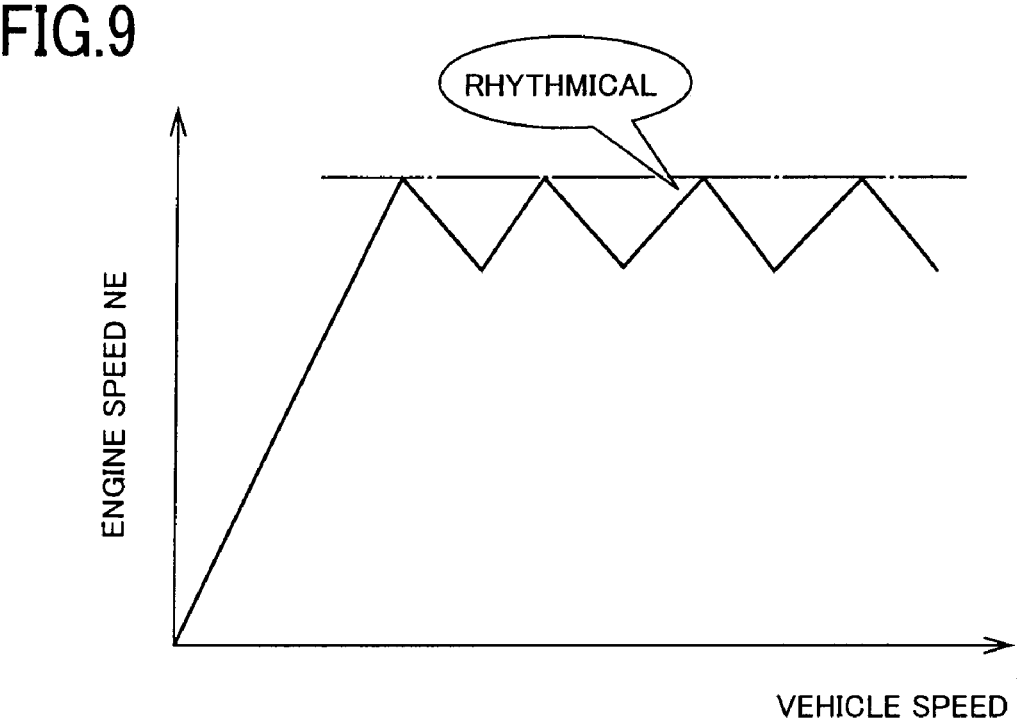
FIG. 9 is a representation of one example of a variation in engine rotation speed caused by an up-shift in a step-variable transmission.
Figure 19:
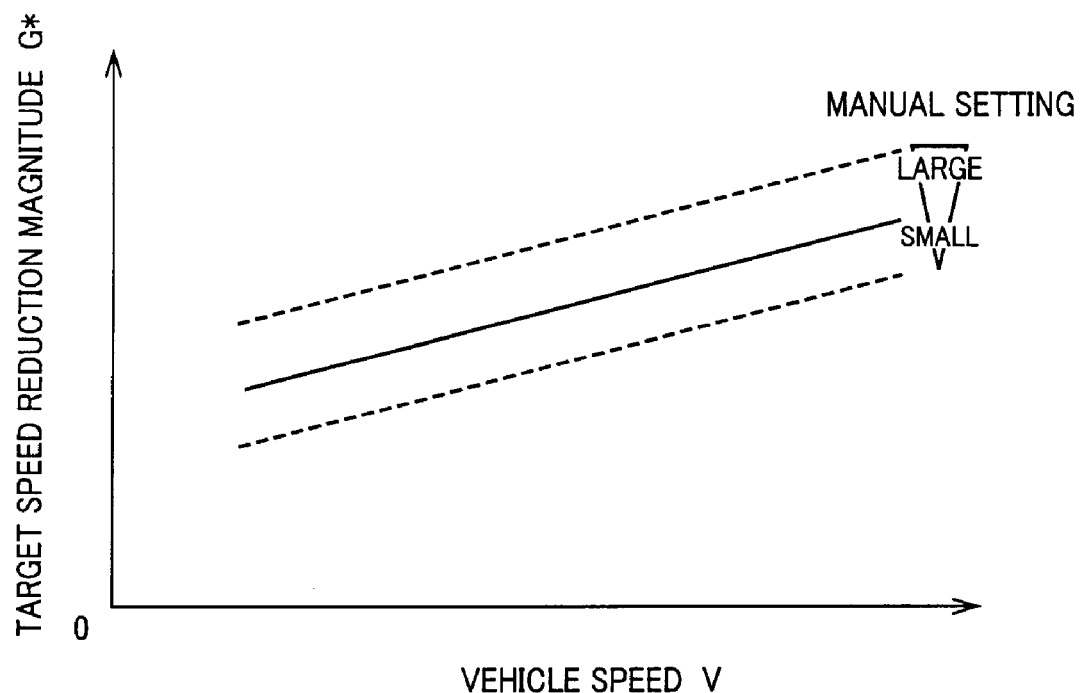
FIG. 19 is a view representing one example of a data map when setting a target speed reduction magnitude as a parameter of a vehicle speed.
Figure 20:
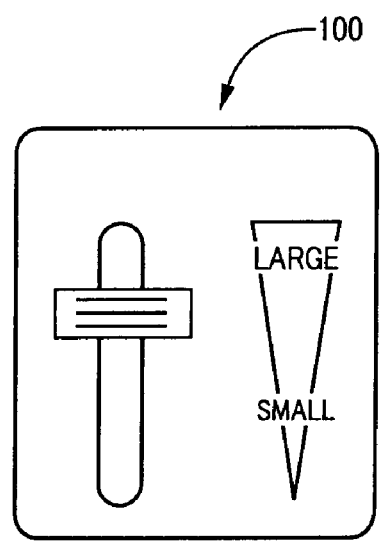
FIG. 20 is a sliding-type reduction speed setting device available to be operated when a user sets a reduction amount.

The target speed reduction magnitude calculation means 186 calculates the target speed reduction magnitude G* for the speed reduction running depending on the actual vehicle speed V based on the relationship between the vehicle speed V and the target speed reduction magnitude $G_M$ preliminarily and experimentally obtained as shown by, for instance, a solid line in FIG. 9. Further, a sliding type speed reduction magnitude setting device 100 may be provided as shown in FIG. 20 for permitting the user to operate so as to increase or decrease the target speed reduction magnitude G*. The target speed reduction magnitude calculation means 186 changes the target speed reduction magnitude G* within a range indicated by dotted lines with reference to a solid line in FIG. 19 in response to the operation of the speed reduction magnitude setting device 100.

Figure 21:
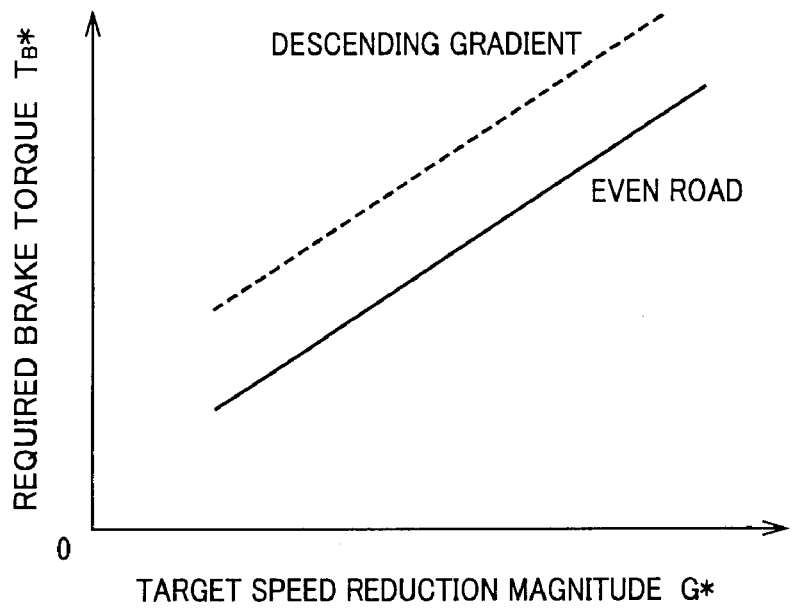
FIG. 21 is a view representing one example of the relationship between the target speed reduction magnitude and required brake torque for calculating required brake torque for achieving the target speed reduction magnitude.

The target speed reduction magnitude control means 184 calculates the allocation between demanded brake torque $T_B^*$ for achieving the target speed reduction magnitude G* and regeneration torque and engine brake torque for obtaining demanded brake torque $T_B^*$, calculated by the target speed reduction magnitude calculation means 186 based on, for instance, the relationship between the target speed reduction magnitude G* and demanded brake torque $T_B^*$ preliminarily and experimentally obtained as shown in FIG. 21. A solid line in FIG. 21 represents demanded brake torque $T_B^*$ for achieving the target speed reduction magnitude G* for the running on the even road, and a broken line represents the target speed reduction magnitude G* for the running on the down grade.

That is, the target speed reduction magnitude control means 184 determines engine brake torque so as to achieve the target speed reduction magnitude G* for the speed reduction running depending on whether or not the regeneration is available with the hybrid control means 52 based on the determination of the regeneration possibility determination means 182.

For instance, from the standpoint in that brake torque is obtained with regeneration torque in view of energy efficiency, the regeneration possibility determination means 182 determines that the hybrid control means 52 is available to initiate the regeneration. In this case, the target speed reduction magnitude control means 184 outputs a command to the hybrid control means 52 so as to allow demanded brake torque $T_B^*$ to be obtained with regeneration torque. The hybrid control means 52 initiates the regeneration at the regeneration amount in response to the command for establishing the predetermined regeneration torque so as to obtain demanded brake torque $T_B^*$. Thus, upon determination of the regeneration possibility determination means 182 that the regeneration has a possibility to be initiated, the target speed reduction magnitude control means 184 compels the hybrid control means 52 to perform a regeneration precedence operation.

If no demanded brake torque $T_B^*$ is available with only the regeneration precedence operation effectuated by the hybrid control means 52, or if the regeneration possibility determination means 182 determines that the hybrid control means 52 is unavailable to initiate the regeneration, then, the target speed reduction magnitude control means 184 operates in a manner described below. In obtaining demanded brake torque $T_B^*$, the target speed reduction magnitude control means 184 outputs a command to the switching control means 50 so as to obtain the torque component in shortage only with regeneration torque or a whole of demanded brake torque $T_B^*$ with engine brake torque.

The switching control means 50 functions as engine brake control means for controlling the differential action of the differential portion 11 so as to obtain required engine brake torque in response to the command delivered from the target speed reduction magnitude control means 184. More particularly, the switching control means 50 calculates the coupling i.e., engaging hydraulic pressure $P_{EB}$ of the switching clutch C0 so as to obtain required engine brake torque based on the relationship between the coupling hydraulic pressure of the switching clutch C0 and engine brake torque preliminarily and experimentally obtained as shown by, for instance, a solid line in FIG. 22. Then, the switching control means 50 outputs the command to the hydraulically operated control circuit 42 for rendering the switching clutch C0 operative to be placed in a half-coupled state or completely coupled state at such a hydraulic pressure value $P_{EB}$.

Figure 22:
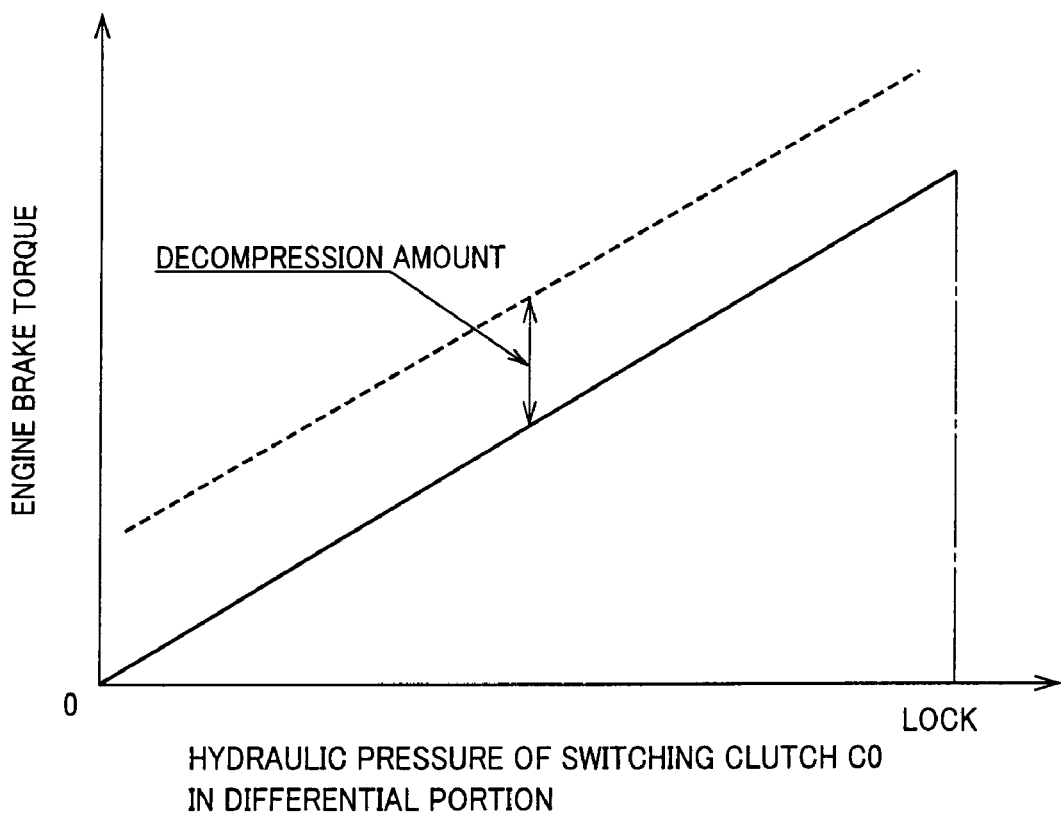
FIG. 22 is a view representing one example of the relationship between an engaging hydraulic pressure and engine brake torque for calculating the coupling hydraulic pressure of a switching clutch for required engine brake torque to be obtained.

With the differential portion 11 placed in the continuously variable shifting state in which the coupling hydraulic pressure $P_{EB}$ of the switching clutch C0 is zeroed, as indicated by the solid line in FIG. 22, if the engine rotation speed $N_E$ is zeroed, no engine brake torque (engine brake force) is generated. However, upon raising the coupling hydraulic pressure $P_{EB}$ of the switching clutch C0 to cause the engine rotation speed $N_E$ to be forcibly raised, the drag occurs thereby generating engine brake torque. Regulating the coupling hydraulic pressure $P_{EB}$ of the switching clutch C0 allows required engine brake torque to be obtained.

In addition, with the differential portion 11 switched between the continuously variable shifting state and the non-continuously variable shifting state, i.e., with the switching clutch C0 switched between the uncoupling and the coupling, engine brake torque is switched stepwise. Moreover, compelling the switching clutch C0 to be switched to the half-coupled (slipping) state allows engine brake torque to be continuously switched. Here, although engine brake torque is adjusted using the switching clutch C0, like the control shown in FIG. 22, of course, the switching brake B0 may be half-coupled or completely coupled for adjusting engine brake.

Figure 23:
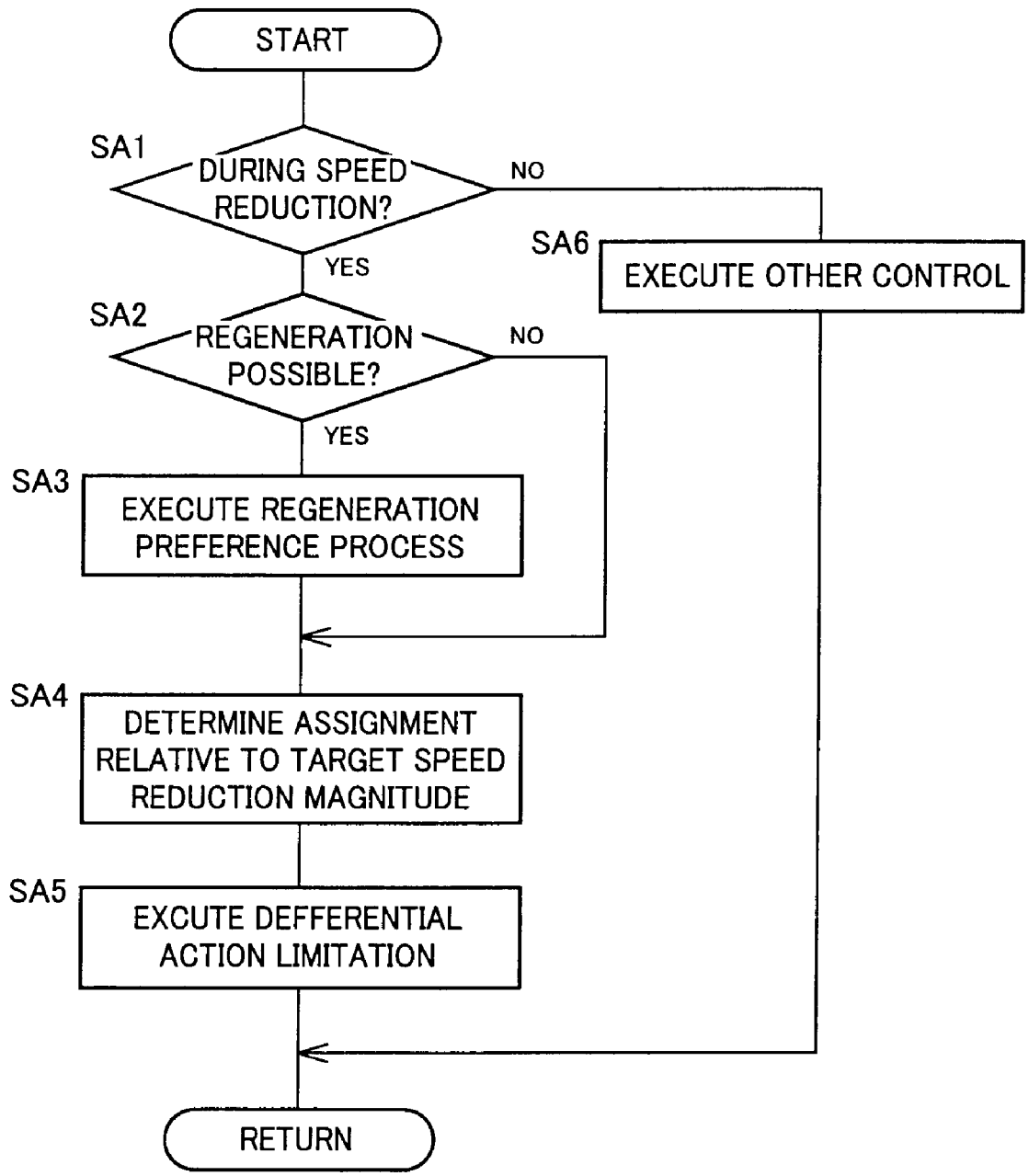
FIG. 23 is a flowchart illustrating a brake operation of an electronic control device of an embodiment shown in FIG. 18, i.e., a brake operation for controlling a speed reduction magnitude during a speed reduction running.

FIG. 23 is a flowchart illustrating an essence of a control operation to be executed by the electronic control device 40, i.e., the control operation for controlling the speed reduction magnitude for the speed reduction running. This sequence is repeatedly executed for an extremely short cycle time in the order of several milliseconds or several tens milliseconds.

Figure 24:
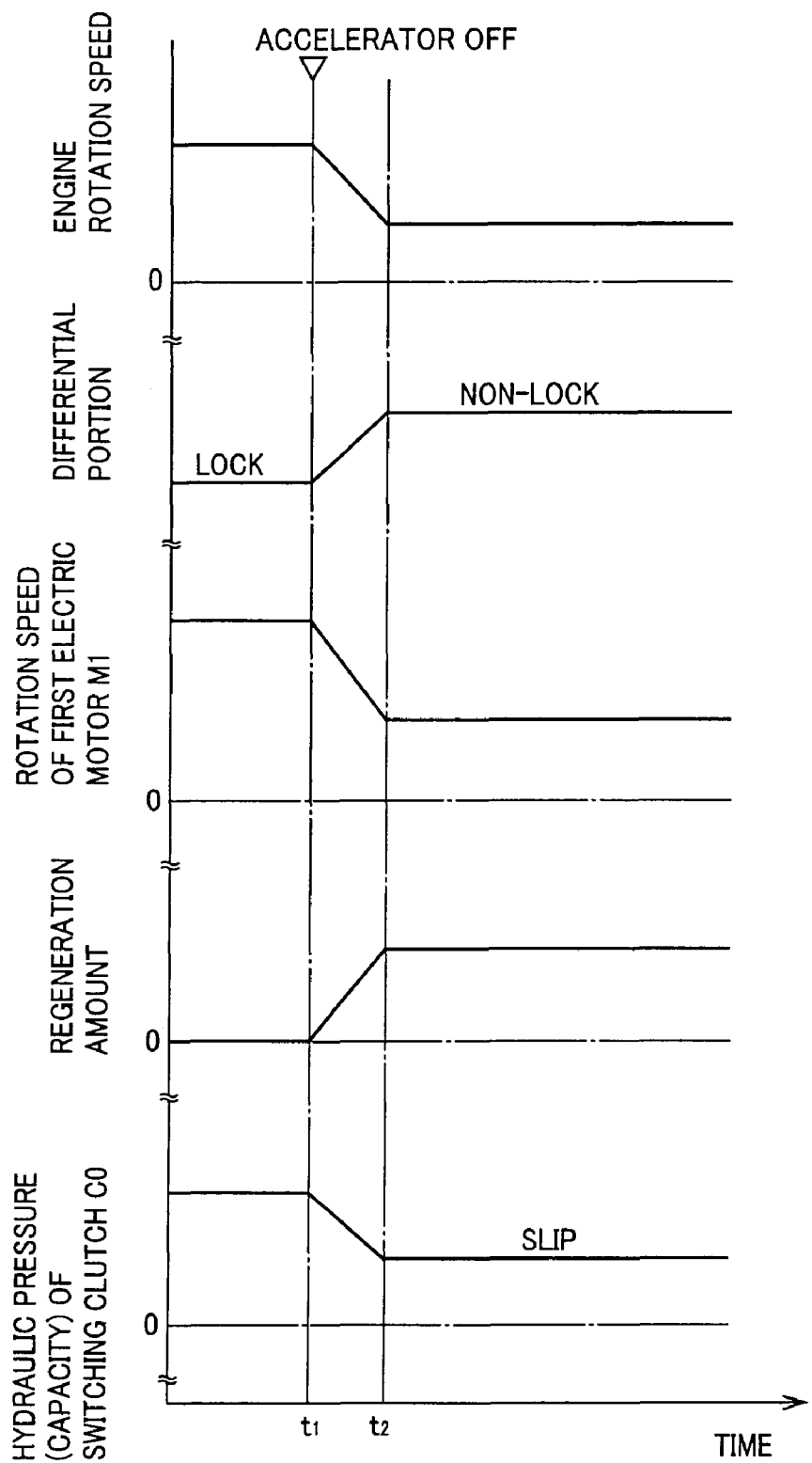
FIG. 24 is a timing chart illustrating a control operation, indicated in the flowchart shown in FIG. 23, and represents a control operation to be executed in a case where in addition to regeneration torque, engine brake torque is generated, to achieve a target speed reduction magnitude.

Further, FIG. 24 is a timing chart illustrating the control operation shown in the flowchart of FIG. 23 and represents a case wherein in addition to the regeneration torque, engine brake torque is generated to achieve the target speed reduction magnitude G*.

First, in step (hereinafter the term "step" is omitted) SA1 corresponding to the speed reduction running determination means 180, i.e., speed reduction running determination step, the determination is made based on the accel opening Acc whether or not the vehicle remains under the speed reduction running, i.e., coast running with the accelerator pedal being released. A time instant $t_1$ in FIG. 24 indicates that the speed reduction running is determined with the accelerator pedal being released.

In the determination in SA1 is made positive, then, in SA2 corresponding to the regeneration possibility determination means 182, i.e., regeneration possibility determination step, the determination is made whether or not the regeneration is available. Under a situation described below, the determination is made that the regeneration is unavailable. Such a situation arises in a case, for instance, when the state of charge SOC of the battery 60 satisfies the predetermined upper limit value $SOC_{MAX}$, i.e., for instance, the state of charge $SOC_{80\%}$ in the order of approximately 80% of the full charging with no need arising for the battery 60 to be charged. Besides, another situation exists wherein failures or defective functions occur in the first electric motor M1, the second electric motor M2, the inverter 58, the battery 60 and the transmitting path interconnecting these component parts with the occurrence of a drop in a power generation capacity.

If the determination in SA2 is made positive, then, in SA3 corresponding to the target speed reduction magnitude control means 184, i.e., target speed reduction magnitude control step, the target speed reduction magnitude G* for the speed reduction running is calculated based on the actual vehicle speed V by referring to the relationship between the vehicle speed V and the target speed reduction magnitude $G_M$. Besides, the target speed reduction magnitude G* may be altered within the range indicated by the broken lines with reference to the solid line in FIG. 19 depending on the operation of the sliding type speed reduction magnitude setting device 100 effectuated by the user.

From the standpoint of obtaining brake torque with regeneration torque with top priority in view of energy efficiency with demanded brake torque $T_B^*$ for achieving the target speed reduction magnitude G*, the target speed reduction magnitude control means 184 outputs the command to the hybrid control means 52 so as to allow demanded brake torque $T_B^*$ to be obtained with regeneration torque for achieving the target speed reduction magnitude G*. Then, the hybrid control means 52 releases the differential portion 11 from the non-continuously variable shifting (locked) state. In order for the hybrid control means 52 to obtain demanded brake torque $T_B^*$ in accordance with such a command, the regeneration is executed at the regeneration amount for achieving predetermined regeneration torque. That is, the hybrid control means 52 executes the regeneration with priority.

If the determination SA2 subsequent to SA3 is made negative, then, the operation proceeds to SA4 corresponding to the target speed reduction magnitude control means 184, i.e., target speed reduction magnitude control step. In SA4, the command is output to the switching control means 50 so as to obtain the torque component in shortage only with regeneration torque or a whole of demanded brake torque $T_B^*$ with engine brake torque.

In SA5 corresponding to the switching control means 50, i.e., switching control step subsequent to SA4, the differential action of the differential portion 11 is limited so as to obtain required engine brake torque in accordance with the command in SA4. For instance, the operation is executed to calculate the coupling hydraulic pressure $P_{EB}$ of the switching clutch C0 or the switching brake B0 for required engine brake torque to be obtained based on the relationship between the coupling hydraulic pressure of the switching clutch C0 or the switching brake B0 and engine brake torque preliminarily and experimentally obtained. Then, a command is outputted to the hydraulically operated control circuit 42 for rendering the switching clutch C0 or the switching brake B0 operative to be placed in the half-coupled state or completely coupled state at such a hydraulic pressure value $P_{EB}$.

A time instant $t_1$ in FIG. 24 indicates that the differential portion 11 is placed in the non-continuously variable shifting state (locked state) for the regeneration, determined to be available, to be executed with top priority. In the illustrated embodiment, demanded brake torque $T_B^*$ is unavailable by merely using the regeneration. Therefore, non-continuously variable shifting state (locked state) of the differential portion 11 is released but no continuously variable shifting state is placed. In order to compensate the torque component in shortage merely with regeneration torque, the switching clutch C0 is placed in the half-coupled (slipping) state so as to obtain required engine brake torque.

A time period from $t_1$ to $t_2$ represents that a drop occurs in the engine rotation speed $N_E$ in response to the non-continuously variable shifting state (locked state) being released. Moreover, this presents that as the regeneration is commenced, the coupling hydraulic pressure (torque capacity) of the switching clutch C0 is lowered such that the switching clutch C0 is placed in the half-coupled (slipping) state so as to obtain required engine brake torque.

A time period subsequent to time instant $t_2$ represents that regeneration torque and engine brake torque are generated so as to obtain demanded brake torque $T_B^*$. Placing the switching clutch C0 in the half-coupled state causes the engine 8 to be forcibly rotated with a resultant drag, thereby generating engine brake torque.

If the determination in SA1 is made negative, then, in SA6, the various control means of the control device 40 executes the control operation in the absence of the speed reduction running or the current routine is terminated.

In the illustrated embodiment, as set forth above, the switching clutch C0 or the switching brake B0 render, for instance, the differential portion 11 operative to be switched to the continuously variable shifting state or the non-continuously variable shifting state. This results in a drive apparatus with combined advantages of a fuel saving effect of the transmission, in which the gear ratio is electrically changed, and a high transmitting efficiency of the gear-type transmitting device in which drive power is mechanically transferred.

For instance, in the normal output region of the engine where the vehicle runs at the low/medium speed and the low/intermediate output, placing the differential portion 11 in the continuously variable shifting state ensures the vehicle to have increased fuel saving effect. Further, during the running of the vehicle at the high speed with the differential portion 11 placed in the continuously variable shifting state, the output of the engine 8 is transmitted mainly through the mechanical power transmitting path to the drive wheels. This suppresses a loss in conversion between drive power and electricity occurring when the differential portion 11 is rendered operative as the transmission in which the gear ratio is electrically changed, resulting in improved fuel saving effect.

For instance, with the differential portion 11 placed in the non-continuously variable shifting state in the high output region of the engine, the differential portion 11 is rendered operative as the transmission, in which the gear ratio is electrically changed for the low/medium speed running and the low/medium output running of the vehicle. This minimizes the maximum value of electric energy to be generated by the first electric motor M1, i.e., electric energy to be transmitted, further miniaturizing the second electric motor M2 and the shifting mechanism 10 including such electric motors.

In order to obtain brake torque with engine brake, further, during the speed reduction running, the switching control means 50 limits the operation of the differential portion 11 as the electrically controlled continuously variable transmission, i.e., the differential action, thereby causing brake torque to be increased. This results in an increase in the range for the speed reduction magnitude G to be controlled, thereby improving performance controllability of the speed reduction magnitude G in the speed reduction running. For instance, using engine brake torque in addition to regeneration torque of the second electric motor M2 allows the vehicle to obtain brake torque. This results in an increase in the range for the speed reduction magnitude G to be controlled, thereby improving performance controllability of the speed reduction magnitude G in the speed reduction running. From another point of view, regeneration torque and engine brake torque enable brake torque to be adjusted, thereby improving performance controllability of the speed reduction magnitude G in the speed reduction running.

In the illustrated embodiment, further, the switching control means 50 is placed in the non-continuously variable shifting state during the speed reduction running. This enables engine brake torque to be rapidly obtained in stepwise variation. For instance, using engine brake torque in combination with regeneration torque allows a great speed reduction magnitude G to be rapidly obtained.

In the illustrated embodiment, furthermore, the switching control means 50 renders the switching clutch C0 operative in the half-coupled (slipping) state during the speed reduction running. This allows engine brake torque to be adjusted, resulting in further improvement in performance controllability of the speed reduction magnitude G in the speed reduction running.

In the illustrated embodiment, moreover, during the speed reduction running, the target speed reduction magnitude control means 184 determines engine brake torque depending on whether or not the hybrid control means 52 is available to initiate the regeneration so as to achieve the target speed reduction magnitude $G^*$. The switching control means 50 limits the differential action of the differential portion 11 so as to obtain determined engine brake torque.

Accordingly, a top priority is given to perform the brake based on the regeneration in consideration of energy efficiency. In addition, if the target speed reduction magnitude $G^*$ is hard to be achieved merely with the regeneration or the regeneration amount is suppressed with a difficulty arising in achieving the target speed reduction magnitude $G^*$, engine brake torque is enabled. This results in improvement in performance controllability of the speed reduction magnitude in the speed reduction running.

Embodiment 4

In the illustrated mentioned above, the switching control means 50, functioning as the engine brake control means, renders the switching clutch C0 or the switching brake B0 operative in the half-coupled state or completely coupled state for adjusting engine brake torque. In addition thereto, the present embodiment contemplates to vary rotational resistance of the engine 8, making it possible to adjust engine brake torque. This enables engine brake torque to be adjusted even if the switching clutch C0 or the switching brake B0 has an identical coupling hydraulic pressure, in other words, even if the engine 8, forcibly rotated, lies at the same engine rotation speed $N_E$.

Hereunder, description is made of a control operation for rotational resistance of the engine 8 to be varied.

Figure 25:
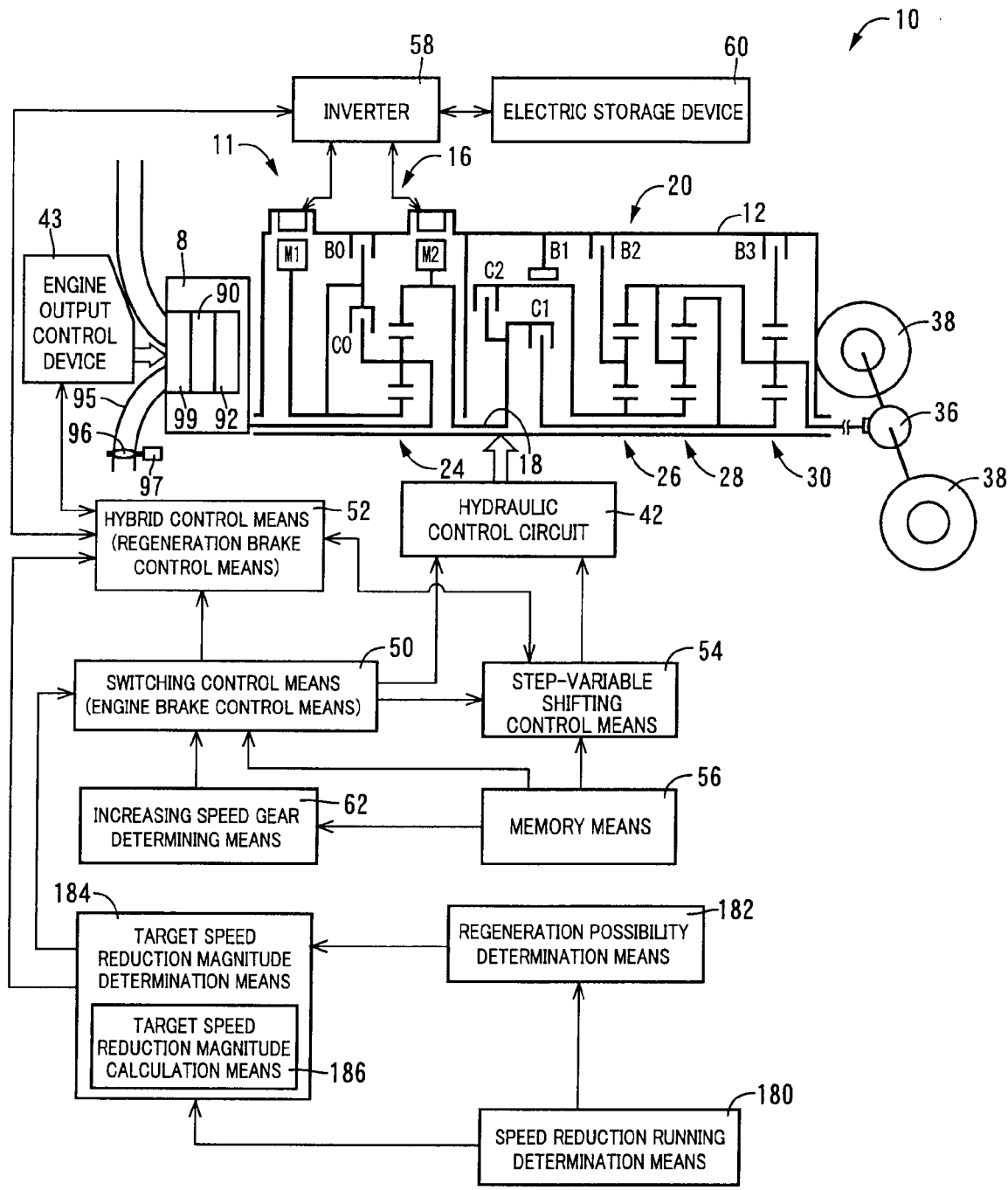
FIG. 25 is a functional block diagram, illustrating another example of an essence of a control function to be executed with the electronic control device shown in FIG. 4, which corresponds that of FIG. 5.

FIG. 25 is a functional block diagram, corresponding to FIGS. 5 and 18, which illustrates an essence of a control function to be executed by the electronic control device 40.

As shown in FIG. 25, the engine 8 includes a variable valve timing mechanism 90, operative to alter a timing at which an intake and exhaust valves are actuated, and a fuel injection valve 92 operative to supply fuel or interrupt the supply of fuel. A part of or a whole of cylinders are placed in a decompression state, i.e., an in-cylinder pressure variation suppression state, and the fuel supply is interrupted for rendering the relevant cylinders halted. This causes an aerodynamic volume displacement to be substantially varied depending on a load state of the engine 8 for decreasing the fuel supply. That is, the engine 8 is an in-cylinder pressure variation suppression cylinder-number variable engine.

Thus, the engine 8 is structured to make it possible to perform the in-cylinder pressure variation suppression operation so as to alter an in-cylinder pressure variation suppression cylinder number in a sequence or at one time. As used herein, the term "in-cylinder pressure variation suppression state" refers to a status wherein a pressure variation in the cylinder is suppressed in at least one stroke of each cycle of a four-cycle engine for thereby suppressing rotational resistance of the engine, in other words, a pumping loss.

Accordingly, during the in-cylinder pressure variation suppression operation (cylinder cut-off operation or cylinder rest operation) in which a part of the cylinders or all the cylinders of the engine 8 are placed in in-cylinder pressure variation suppression state, a part of the cylinders or all the cylinders are placed in, for instance, the decompression state. This allows the loss in pump, i.e., a so-called pumping loss to be decreased depending on an in-cylinder pressure variation suppression cylinder number with no intention to merely interrupt the fuel supply to the cylinder.

For instance, each cylinder is placed in the compression state with the engine 8 placed in an operation halt state, i.e., in an inoperative state, wherein the so-called fuel cut-off operation is merely executed for interrupting the fuel supply to the all the cylinders of the engine 8. With the engine 8 remaining under the rotating state, a drag (engine rotational resistance) occurs with the resultant occurrence of a pumping loss.

As used herein, the term "compression state" refers to a status wherein during a compression stroke of the four-cycle engine, the intake valve and the exhaust valve are actuated at the same timings as those at which the intake valve and the exhaust valve are actuated when the engine is operated whereby intake air is compressed. Further, the decompression state, i.e., a decompression state occurs when the intake valve or the exhaust valve is opened or when the timings of the intake valve or the exhaust valve are deviated during the compression stroke of the four-cycle engine. Intake air is compressed under an inadequate state to suppress the pressure variation (under pressure) in the cylinder, thereby reducing rotational resistance of a crankshaft. Under such a decompression state, the throttle valve or the EGR valve may be released to achieve a further reduction in rotational resistance of the crankshaft.

The switching control means 50 performs the function of the illustrated embodiment described above and, in addition thereto, limits the differential action of the differential portion 11 while varying an in-cylinder pressure variation suppression amount, i.e., a decompression amount of the engine 8. For instance, this is because the target speed reduction magnitude control means 184 enables required engine brake torque to be obtained in response to the command for obtaining demanded brake torque $T_B^*$ with engine brake torque. For instance, the decompression amount is caused to vary depending on the in-cylinder pressure variation suppression cylinder number of the engine 8 enabling the decompression state. At the same engine rotation speed $N_E$, the greater the in-cylinder pressure variation suppression cylinder number, the greater will be the decompression amount with a reduction in engine brake torque.

For instance, a solid line in FIG. 22 represents that the all the cylinders are placed in the decompression state with the decompression amount being maximized and a broken line in FIG. 22 represents that all the cylinders are not placed in the decompression state with a decrease in the decompression state. By varying the decompression state in such a way, engine brake torque can be adjusted within a range from the solid line to the broken line even at the same coupling hydraulic pressures of the switching clutch C0 or the switching brake B0.

More particularly, the switching control means 50 calculates the coupling hydraulic pressure $P_{EB}$ of the switching clutch C0 and the decompression amount, i.e., the in-cylinder pressure variation suppression cylinder number C0 so as to obtain engine brake torque. In this moment, the relationship between the coupling hydraulic pressure of the switching clutch C0 and engine brake torque is utilized as a parameter of the decompression amount preliminarily and experimentally obtained as shown in FIG. 22. The switching control means 50 outputs a command to the hydraulically operated control circuit 42 to render the switching clutch C0 operative to be half-coupled or completely coupled at such a coupling hydraulic pressure $P_{EB}$ resulting from the calculation.

At the same time, the switching control means 50 outputs a command to the hybrid control means 52 for executing the in-cylinder pressure variation suppression operation on the cylinder of the engine 8 by an in-cylinder pressure variation suppression cylinder number $C_D$. The hybrid control means 52 outputs a command to the engine output control device 43 in response to such a command. This is because the variable valve timing mechanism 90 executes the in-cylinder pressure variation suppression operation under the decompression state by the in-cylinder pressure variation suppression cylinder number $C_D$.

As set forth above, the illustrated embodiment has, in addition to the same advantageous effects as those mentioned above, advantageous effects as described below. During the speed reduction running, the switching control means 50 varies the decompression amount of the engine 8. This causes rotational resistance to be varied even at the same engine rotation speed $N_E$, enabling the variation in engine brake torque. This results in a further improvement of performance controllability of the reduction magnitude G in the speed reduction running.

Embodiment 5

Figure 26:
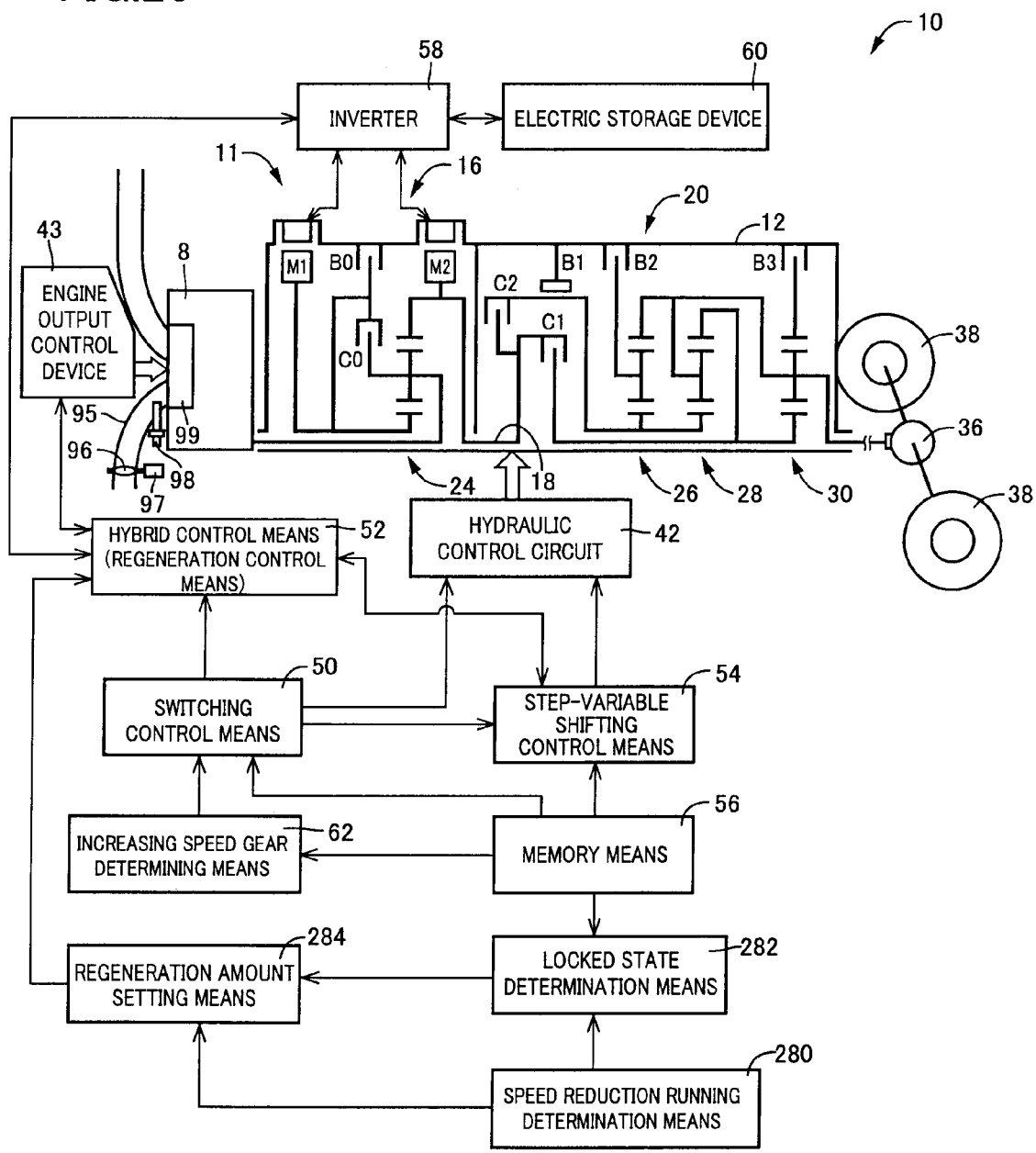
FIG. 26 is a functional block diagram illustrating another example of an essence of a control function to be executed with the electronic control device shown in FIG. 4.

FIG. 26 is a functional block diagram illustrating an essence of another control function of the electronic control device 40.

Figure 27:
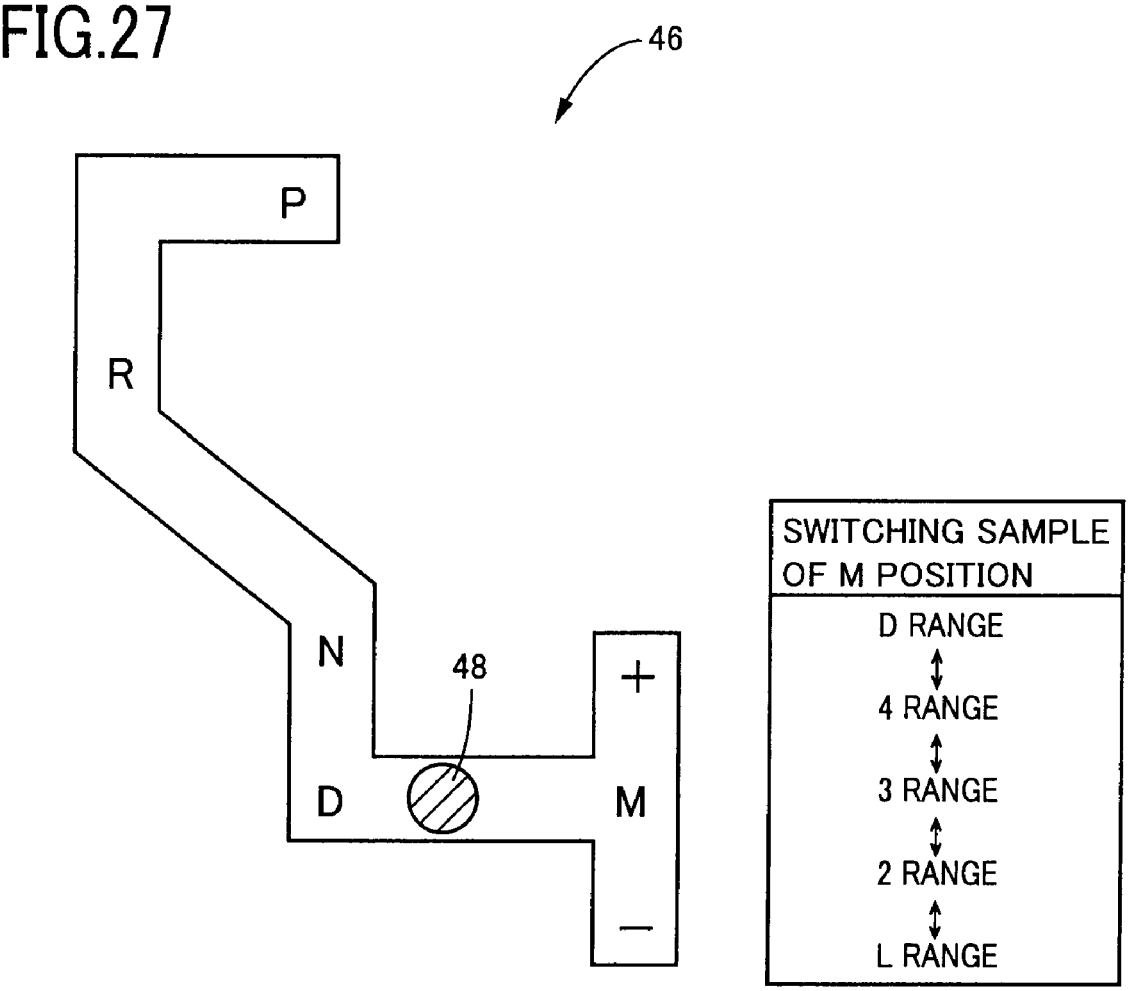
FIG. 27 shows one example of a shift operation device provided with a shift lever and is operated to select one of a plurality of shifting positions.

FIG. 27 shows on example of a switch device 46 to be switched by manual operation to one of plural kinds of shift positions. This switch device 46 includes a shift lever 48 disposed for example at lateral side of the driver's seat and manually operated to select one of plural kinds of shifting positions.

This switch device 46 is selectively shifted to one of a parking position "P (parking)", rearward running position "R (reverse)" for rearward running, neutral position "N (neutral)", forward automatically shifted running drive position "D (drive)", and forward manually shifted running drive position "M (manual)" as shown in FIG. 2. In the "P (parking)", none of the engaging device such as the first clutch C1 and the second clutch C2 are not engaged to set the interrupt state of the power transmitting path in the shifting mechanism 10 i.e., the automatic transmission portion 20, and to lock rotation of the output shaft 22. In the "N (neutral)", the power transmitting path in the shifting mechanism 10 is interrupted.

For example, in conjunction with manual operations of the shift lever 48 to the respective shift positions, manual valves in the hydraulically operated control circuit 42 mechanically connected thereto are switched. The hydraulically operated control circuit 42 is thereby mechanically switched so that the reverse-gear position "R," the neutral position "N," or the forward-gear position "D," etc., shown in the engagement operation Table of FIG. 2, is established. The respective gear positions from the first to fifth gear positions in the "D" or "M" position, shown in the engagement operation table of FIG. 2, are established by electrical switching of the solenoid-operated valves in the hydraulically operated control circuit 42.

Among the respective shifting positions "P" to "M," at each of the non-running positions such as "P" and "N," for example, both the first clutch C1 and the second clutch C2 are released as shown in the engagement operation Table of FIG. 2. These are non-drive positions for selecting a state in which the power transmitting path in the automatic transmission portion 20 is cut off to disable the vehicle drive. That is, this is a non-drive state in which the path of power transmission is cut off or interrupted by the first clutch C1 and the second clutch C2.

Also, at each of the running positions "R", "D" and "M" for example, at least one of the first clutch C1 and the second clutch C2 is engaged as shown in the engagement operation table of FIG. 2. These are drive positions for selecting a state in which the power transmitting path in the automatic transmission portion 20 is connected to enable the vehicle drive. That is, these are the drive position for selecting a transmitting state of the power transmitting path by both or one of the first clutch C1 and the second clutch C2.

Specifically, the second clutch C2 is engaged by manual operation of the shift lever 48 from the "P" position or the "N" position to the "R" position, so that the power transmitting path in the automatic transmission portion 20 is switched from a power transmission cutoff state to a power transmissible state. At least the first clutch C1 is engaged by manual operation of the switch lever 48 from the "N" position to the "D" position, so that the power transmitting path in the automatic transmission portion 20 is switched from a power transmission cutoff state to a power transmissible state. Also, the "D" position is the running position at the maximum speed, and the "4" range to "L" range in the "M" position are engine brake ranges for obtaining an engine brake effect.

The "M" position is located at the same position as the "D" position in the longitudinal direction of the vehicle, and is adjacent thereto in the lateral direction of the same. The shift lever 48 is operated to the "M" position, for manually selecting one of the above-indicated "D" through "L" positions. Described in detail, at the "M" position, a shift-up position "+" and a shift-down position "−" spaced from each other in the longitudinal direction of the vehicle are disposed. Each movement of the shift lever 48 to the shift-up position "+" or the shift-down position "−", any one of "D" to "L" positions is selected.

For example, the five shifting ranges including the "D" range to the "L" range to be selected in the "M" position are plural kinds of shifting ranges of which total gear ratio at the high speed side are different from each other, in the changeable range of the total gear ratio $\gamma T$ enabling the automatic shifting control of the shifting mechanism 10. Also, they limit the changeable range of the shifting positions (gear positions) so that the maximum shifting positions where the automatic shifting portion 20 is shifted are different.

The shift lever 48 is urged by urging means such as a spring and the like to be automatically returned from its up-shift position "+" and the down-shift position "−" to its "M" position. Also, the switch device 46 is provided with a shift position sensor 49 for detecting each of the shift positions of the shift lever 48, to output a signal representing a shift position $P_{SH}$ and the number of operations at the "M" position to the electronic control device 40.

For example, in the case where the "D" position is selected by operation of the shift lever 48, the switching controlling means 50 executes an automatic switching control for the shift state of the shifting mechanism 10 based on the shifting map or the switching map, as shown in FIG. 6, that is previously stored. In addition to this, the hybrid controlling means 52 executes the continuously variable shifting control of the power distributing mechanism 16, and the step variable shifting controlling means 54 executes the automatic shifting control of the automatic transmission portion 20. For example, in the step variable shifting running in which the shifting mechanism 10 is switched into the step variable shifting state, the shifting mechanism 10 is subjected to the automatic shifting control in the range from the first to fifth speed gear stages, as shown in FIG. 2.

Alternatively, in the continuously variable shifting operation in which the shifting mechanism 10 is switched into the continuously variable shifting state, the shifting mechanism 10 is subjected to the automatic shifting control in the changeable range of the total shifting ratio $\gamma T$. The total shifting ratio $\gamma T$ can be changed and obtained by the continuously variable gear ratio width of the power distributing mechanism 16, and the gear positions under the automatic shifting control in the ranges of the first to fourth speed gear positions of the automatic transmission portion 20. This "D" position also corresponds to a shift position that selects an automatic shifting running mode (automatic mode) that is a control mode to execute the automatic shifting control of the shifting mechanism 10.

When the "M" position is selected by operation of the shift lever 48, the automatic shifting control is executed in the range of the total shifting ratio $\gamma T$ that can be varied by the shifting ranges of the shifting mechanism 10 so as not to exceed the maximum high speed gear ratio or gear ratio of the shifting range, by the switching controlling means 50, the hybrid controlling means 52, and the step variable shifting controlling means 54. For example, in the step variable shifting operation in which the shifting mechanism 10 is switched into the step variable shifting state, the automatic shifting control of the shifting mechanism 10 is executed in the range of the total shifting ratio $\gamma T$ that can be varied by the shifting ranges.

In the continuously variable shifting running in which the shifting mechanism 10 is switched into the continuously variable shifting state, the shifting mechanism 10 is subjected to the automatic shifting control in the variation range of the total shifting ratio $\gamma T$ that can be varied in the shifting ranges and obtained by the continuously variable gear ratio width of the power distributing mechanism 16, and the gear stages under automatic shifting control in the ranges of the automatic transmission portion 20 that can be varied depending on the shifting ranges. This "M" position also corresponds to a shift position that selects a manual shifting running mode (manual mode) that is a control mode in which the shifting mechanism 10 is subjected to the manual shifting control.

Thus, in the illustrated embodiment, the shifting mechanism 10 (differential portion 11, power distributing mechanism 16) is selectively switchable between the continuously variable shifting state and the non-continuously variable shifting state, for instance, step-variable shifting state (locked state). With differential portion 11 placed in the continuously variable shifting state, the engine rotation speed $N_E$ can be freely set regardless of the transmitting member rotational speed $N_{18}$ without being bounded from the vehicle speed V. That is, the transmitting member rotational speed $N_{18}$ is uniquely determined based on the rotational speed NOUT of the output shaft 22 of the automatic transmission portion 20 and the gear ratio γ. In contrast, with differential portion 11 placed in the non-continuously variable shifting state, the engine rotation speed $N_E$ becomes a rotational speed that is bound with the vehicle speed V.

Then, it is conceived that during the speed reduction running with the accelerator pedal being released, the engine rotation speed $N_E$ is different depending on the continuously variable shifting state and the non-continuously variable shifting state of the differential portion 11 even at the same vehicle speed V.

Now, a description is made with reference to FIG. 28 in which, for instance, a status of the differential portion 11 for the speed reduction running is plotted on a collinear diagram in a manner as shown in FIG. 3.

FIG. 28(a) is a representation in which the switching clutch C0 is coupled (locked) with the differential portion 11 placed in the continuously variable shifting state, and FIG. 28(b) is a representation in which with the differential portion 11 placed in the continuously variable shifting state, the fuel cut-off is initiated to stop the operation of the engine 8 and the first electric motor M1 is caused to idle.

With the differential portion 11 placed in the non-continuously variable shifting state, the rotation of the engine 8 is not stopped during the speed reduction running as shown in FIG. 28(a). Accordingly, in contrast to a situation under which the differential portion 11 is placed in the continuously variable shifting state with the halted rotation of the engine 8 during the speed reduction running, there is likelihood that drag torque of the engine 8 increases as shown in FIG. 28(b).

When this takes place, if the regeneration amount is uniquely set for the speed reduction running to allow the electric motor to perform the regeneration to suit the non-continuously variable shifting state of the differential portion 11 wherein the engine 8 lies in an engine state with a further increase in drag torque, in other words, where the regeneration amount of the electric motor decreases, an issue arises as described below. Even if the differential portion 11 is placed in the continuously variable shifting state involved under the engine state available to obtain the increased regeneration amount, the regeneration amount is obtained up to the set value with a resultant difficulty in increasing the regeneration amount, causing a deterioration in fuel consumption.

With the present embodiment, during the speed reduction running, the regeneration amount is caused to increase with an improvement in fuel consumption, in contrast to a case in which the regeneration amount is uniquely or uniformly set in conformity to the non-differential state with a probability of an increase in drag torque of the engine 8. Accordingly, the regeneration amount of the electric motor is varied depending on whether or not the differential portion 11 is placed in the continuously variable shifting state (differential state), i.e., the regeneration amount is set depending on drag torque of the engine 8.

Turning back to FIG. 26, more particularly, speed reduction running determination means (speed reduction running determination portion) or on-speed reduction running determination means 280 determines based on the accel opening Acc whether or not the vehicle remains under the speed reduction running, i.e., under a free-wheeling running (coast running). Upon determination of the speed reduction running determination means 280 that the vehicle remains under the speed reduction running, for instance, the hybrid control means 52 renders the fuel injection valve 92 inoperative to shut off the fuel supply to the engine 8 for improving the fuel consumption.

More particularly, locked state determination means (locked state determination portion) 282 determines whether or not the power distribution mechanism 16 is placed in the non-differential state (locked state), that is the differential portion 11 is placed in the non-continuously variable shifting state, when the speed reduction running determination means 280 determines that the vehicle is under the speed reduction running, or the vehicle is in the mode of the reduction speed running.

For instance, the locked state determination means 84 makes determination based on the vehicle condition, represented by the shifting lines shown in, for instance, FIG. 6, i.e., the vehicle speed V and output torque $T_{OUT}$. The switching control means 50 makes determination as to whether the shifting mechanism 10 remains in the step-variable control for the shifting mechanism 10 to be controllably switched to step-variable shifting state or whether the shifting mechanism 10 remains in the continuously variable control region to be controllably switched to the continuously variable shifting state. With the shifting mechanism 10 remained in the step-variable control region, the determination is made that the differential portion 11 is placed in the non-continuously variable shifting state.

With the speed reduction running determination means 280 determined that the vehicle remains under the speed reduction running, regeneration amount setting means (regeneration amount setting section) 284 allows the hybrid control means 52 to set the regeneration amount of the electric motor, i.e., the second electric motor M2 for the regeneration. This setting is executed depending on whether or not the locked state determination means 282 causes the differential portion 11 to be placed in the non-continuously variable shifting state.

Figure 29:
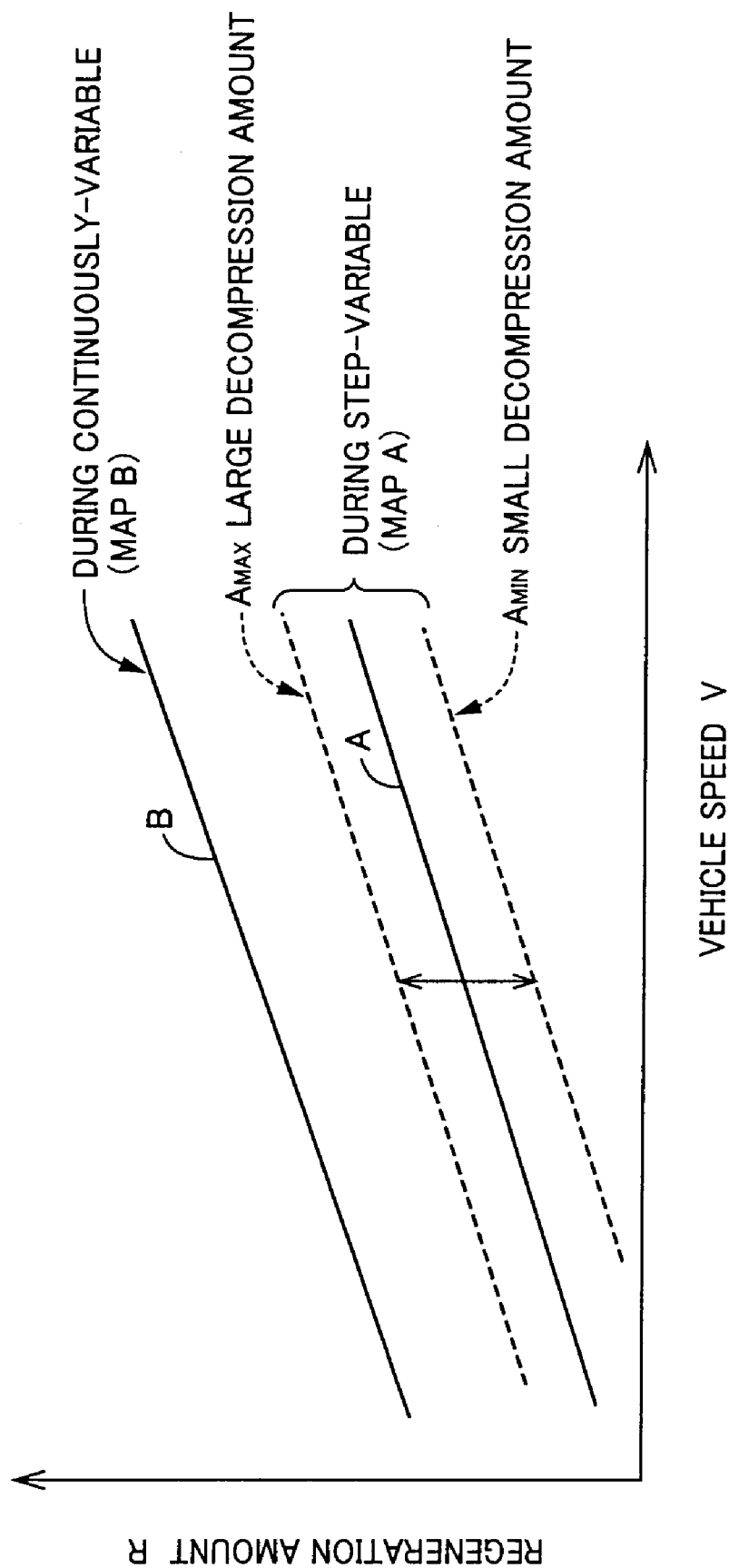
FIG. 29 is a representation of one example showing the relationship (map) between a predetermined vehicle speed and a regeneration amount. A solid line A represents the relationship, i.e., a step variable regeneration map A for use in setting a regeneration map with the differential portion placed in the non-continuously variable shifting state. Further, a solid line B represents the relationship, i.e., a continuously-variable-shifting regeneration map B for use in setting a regeneration amount R with the differential portion placed in the continuously variable shifting state.

FIG. 29 represents one example showing the relationship (map) between a preset vehicle speed V and the regeneration amount R. A solid line A indicates the relationship, i.e., a step-variable regeneration amount map A for use in setting the regeneration amount R for the differential portion 11 placed in the non-continuously variable (step variable) shifting state. Further, a solid line B indicates the relationship, i.e., a continuously variable regeneration amount map B for use in setting the regeneration amount R for the differential portion 11 placed in the continuously variable shifting state with the engine 8 halted in rotation (i.e., upon continuously variable).

As will be apparent from FIG. 29, with the differential portion 11 placed in the non-continuously variable shifting state (in step-variable), no rotation of the engine 8 is halted during the speed reduction running and drag torque occurs with a drop in the regeneration amount in contrast to the continuously variable shifting state being placed (in continuously variable). In consideration of such a drop, the regeneration amount R is set to a lower value than that for the continuously variable shifting at the same vehicle speed V. This leads to a consideration that under the non-continuously variable shifting state, the regeneration amount is reduced by an extent wherein engine brake occurs due to drag torque of the engine 8. In other words, the drive force source (engine 8, electric motor) brake in a total of the engine brake force and the regeneration brake force is nearly equaled even under the shifting state of the differential portion 11 placed in either the continuously variable shifting state or the non-continuously variable shifting state.

Further, the step-variable regeneration amount map A is different depending on the gear ratio γ of the automatic transmission portion 20. The greater the gear ratio γ (i.e., the lower the low speed gear position), the higher will be the engine rotation speed $N_E$ for the same vehicle speed V. Thus, the setting is made such that the greater the gear ratio γ, the smaller will be the regeneration amount for the same vehicle speed V. Besides, the step-variable regeneration amount map A is different depending on whether the step-variable shifting state is present with the switching clutch C0 being coupled (locked), or the step-variable shifting state is present with the switching brake B0 being coupled (locked). Since the engine rotation speed $N_E$ is low for the same vehicle speed V under a phase with the switching brake B0 being coupled (locked), the setting is made such that the regeneration amount R is large with the same vehicle speed V for the switching brake B0 being coupled (locked).

Furthermore, both the step-variable regeneration amount map A and the continuously variable regeneration amount map B represent exemplary cases in which the fuel cut-off for the engine 8 is executed. No drag state occurs in the engine 8 when no fuel cut-off is executed in the engine 8, i.e., when the engine 8 maintains an idling rotational speed $N_{IDL}$ in an autonomous rotation. Accordingly, the setting is made such that with the fuel cut-off being conducted in the engine 8, the regeneration amount is larger than that in which no fuel cut-off is conducted.

When the differential portion 11 is placed in the non-continuously variable shifting state during the speed reduction running, the regeneration amount setting means 284 sets the regeneration amount R for the regeneration control, executed with the hybrid control means 52, based on the actual vehicle speed V by referring to the step-variable regeneration amount map A shown in FIG. 29. In addition, when the differential portion 11 is placed in the continuously variable shifting state during the speed reduction running, the regeneration amount setting means 284 sets the regeneration amount R for the regeneration control, executed with the hybrid control means 52, based on the actual vehicle speed V by referring to the continuously variable regeneration amount map B shown in FIG. 29.

Upon determination of the speed reduction running determination means 280 that the vehicle remains under the speed reduction running, the hybrid control means 52 allows the electric motor to execute the regeneration control so as to obtain the regeneration amount of the electric motor, set by the regeneration amount setting means 284, i.e., the second electric motor M2. The regeneration control is executed based on a determined result as to whether or not the locked state determination means 282 causes the differential portion 11 to be placed in the non-continuously variable shifting state.

Thus, by using the regeneration amount R of the second electric motor M2 set by the regeneration amount setting means 284, the hybrid control means 52 functions as regeneration control means during the speed reduction running for altering the regeneration amount of the electric motor based on whether or not the differential portion 11 is placed in the continuously variable shifting state.

For instance, with the differential portion 11 placed in the continuously variable shifting state, the regeneration amount setting means 284 sets the regeneration amount R of the electric motor to be greater than that for the non-continuously variable shifting state being placed. Accordingly, the hybrid control means 52 renders the regeneration amount by the electric motor larger for the case the differential portion 11 being placed in the continuously variable shifting state (differential state) than for the case the differential portion 11 being placed in the non-continuously variable shifting state (non-differential state)

Thus, during the speed reduction running, the regeneration amount R is set depending on the continuously variable shifting state and the non-continuously variable shifting state of the differential portion 11. As a result, with the continuously variable shifting state being placed, the regeneration amount increases to improve the fuel consumption in comparison to a phase in which the regeneration amount R is uniquely set to suit the non-continuously variable shifting state with likelihood of a reduction in the regeneration amount due to an increase in drag torque of the engine.

Further, the regeneration amount setting means 284 may set the regeneration amount R for the regeneration control to be executed with the hybrid control means based on the actual vehicle speed V by referring to the step-variable regeneration amount map A or the continuously variable regeneration amount map B. The maps A or B is set depending on whether the fuel cut-off is executed in the engine 8 during the speed reduction running.

Upon determination of the speed reduction running determination means 280 that the vehicle remains under the speed reduction running, the hybrid control means 52 allows the electric motor to execute the regeneration control so as to obtain the regeneration amount of the electric motor.

Thus, during the speed reduction running, the hybrid control means 52 may execute the operation, in addition to the operation of altering the regeneration amount R of the electric motor, based on whether or not the differential portion 11 is placed in the continuously variable shifting state, for altering the regeneration amount R of the electric motor based on whether or not the fuel cut-off is executed in the engine 8.

For instance, when the differential portion 11 is placed in the continuously variable shifting state, the regeneration amount setting means 284 sets the regeneration amount R to be greater than that set for the differential portion 11 placed in the non-continuously variable shifting state. In addition thereto, when no fuel cut-off is executed in the engine 8, the regeneration amount setting means 284 sets the regeneration amount R to be greater than that set for the fuel cut-off being executed. Accordingly, when no fuel cut-off is executed in the engine 8, the hybrid control means 52 allows the regeneration of the electric motor to be greater than that set in the presence of the non-continuously variable shifting state (non-differential state).

Thus, the regeneration amount R is set depending on whether or not the fuel cut-off is executed in the engine 8. In this moment, under a circumstance where no fuel cut-off is executed in the engine 8, the regeneration amount increases to be greater with a resultant improvement in fuel consumption than that in which the regeneration amount R is uniquely set to suit a condition in which the fuel cut-off is executed in the engine 8. During the fuel cut-off operation, it is likely that drag torque occurs in the engine with a resultant reduction in regeneration amount.

Figure 30:
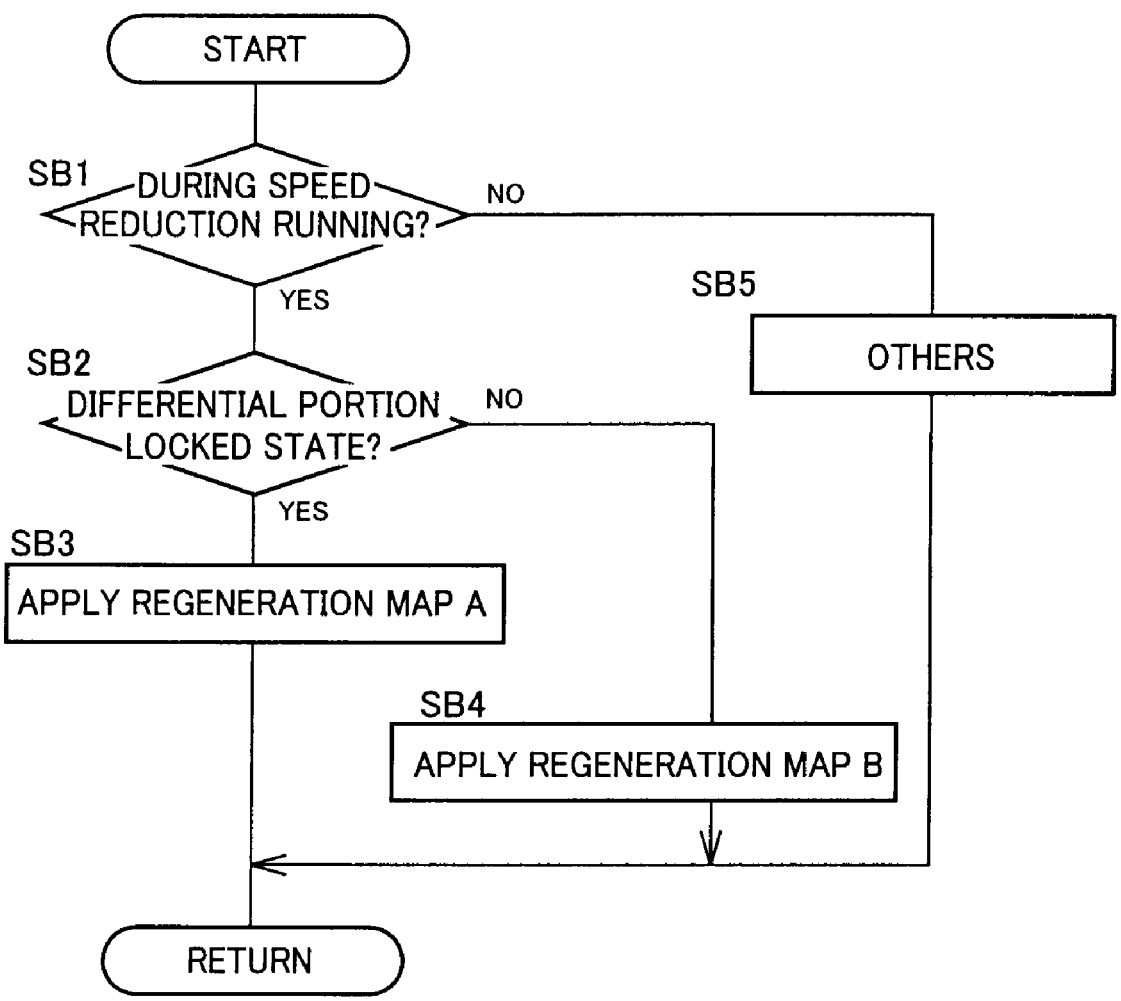
FIG. 30 is a flowchart illustrating a control operation to be executed with an electronic control device shown in FIG. 26, i.e., a control operation for setting the regeneration amount during the speed reduction running.

FIG. 30 is a flowchart illustrating an essence of a control operation to be executed by the electronic control device 40, i.e., a control operation for setting the regeneration amount for the speed reduction running. This sequence is repeatedly executed on an extremely short period of time in the order of several milliseconds to several tens milliseconds.

First in step (hereinafter the word "step" is omitted) SB1 corresponding to the speed reduction running determination means 280, i.e., an speed reduction running determination step, the determination is made whether or not the vehicle remains under the speed reduction running, i.e., under a coast running with the accelerator pedal being released.

If the determination in SB1 is made positive, then, in SB2 corresponding to the locked state determination means 282, i.e., a locked state determination step, the determination is made whether or not the power distributing mechanism 16 is placed in the locked state, i.e., whether or not the differential portion 11 is placed in the non-continuously variable shifting state. The determination is executed based on the vehicle condition by referring to, for instance, the shifting lines shown in FIG. 6 depending on whether or not the differential portion 11 is placed in the non-continuously variable shifting state based on whether or not the shifting mechanism 10 remains in the step-variable control area for the non-continuously variable shifting state to be placed.

If the determination in SB2 is made positive, then, in SB3 corresponding to the regeneration amount setting means 284 and the hybrid control means 52, i.e., a hybrid control step, the regeneration amount R of the electric motor, i.e., the second electric motor M2 is set for the regeneration control during the speed reduction running. The setting is executed based on the actual vehicle speed V by referring to, for instance, the step-variable shifting regeneration shown in FIG. 12. Then, the electric motor executes the regeneration control so as to obtain the regeneration amount R of the electric motor being set. In this moment, if no fuel cut-off is executed in the engine 8, the regeneration amount R may be increased.

If the determination in SB2 is made negative, then, in SB4 corresponding to the regeneration amount setting means 284 and the hybrid control means 52, i.e., a hybrid control step, the regeneration amount R of the electric motor, i.e., the second electric motor M2 is set for the regeneration control during the speed reduction running. The setting is executed based on the actual vehicle speed V by referring to, for instance, the continuously variable regeneration amount map B shown in FIG. 29. Then, the electric motor executes the regeneration control so as to obtain the regeneration amount R of the electric motor being set. In this moment, if no fuel cut-off is executed in the engine 8, the regeneration amount R may be increased.

As mentioned above, according to the illustrated embodiment, the switching clutch C0 and the switching brake B0 switch the differential portion 11 into the continuously variable shifting state and the non-continuously variable shifting state. Consequently, the drive apparatus can be provided, which has both the advantages of an improvement in fuel efficiency effected by a transmission electrically changing a shifting ratio, and high transmitting efficiency effected by a gear shifting transmission mechanically transmitting power.

For instance, in a normal output region of the engine with a vehicle running at a low/intermediate speed and low/intermediate output, placing the differential portion 11 in the continuously variable shifting state ensures a fuel saving performance of the vehicle. In addition, with the differential portion 11 placed in the non-continuously variable shifting state during the running of the vehicle at the high speed, the output of the engine is transferred mainly through a mechanical power transmitting path to the drive wheels. This minimizes a loss in conversion between the vehicle drive force, occurring when the continuously variable shifting portion is caused to operate as a transmission for the speed ratio to be electrically changed, and electrical energy, resulting in improvement in fuel consumption.

Moreover, with the differential portion 11 placed in the non-continuously variable shifting state during the running of the vehicle at the high output, the differential portion 11 is actuated as the transmission to electrically change the speed ratio in a region under which the vehicle runs at the low/intermediate speed and low/intermediate output. This enables a reduction in a maximal value of electric energy, for the first electric motor M1 to generate, i.e., electric energy for the first electric motor M1 to transfer, resulting in a further minimization of the first electric motor M1 and the second electric motor M2 to which electric energy is transmitted from the first electric motor M1 or the differential portion 11 incorporating such first and second electric motors M1 and M2.

During the speed reduction running, further, the hybrid control means 52 alters the regeneration amount based on whether or not the differential portion 11 is placed in the non-continuously variable shifting state. Thus, the regeneration is conducted at the regeneration amount depending on drag torque of the engine 8. That is, the regeneration is conducted at the regeneration amount R depending on the continuously variable shifting state, in which the engine rotation speed $N_E$ is nearly zeroed due to the differential action regardless of the vehicle speed V, and the non-continuously variable shifting state in which there is likelihood that the engine rotation speed $N_E$ is bound with the vehicle speed V to cause drag torque of the engine 8 to be greater than that in which the continuously variable shifting state is placed. As a result, the regeneration amount increases to be greater with a resultant improvement in fuel consumption than that wherein the regeneration is conducted at the regeneration amount R uniquely or uniformly set in conjunction with the non-continuously variable shifting state with likelihood of an increase in drag torque of the engine 8.

For instance, with the hybrid control means 52 operated to cause the differential portion 11 to be placed in the continuously variable shifting state, the regeneration amount is set to be greater than that set for the non-continuously variable shifting state being placed, causing a drop in engine rotation speed $N_E$. For the same vehicle speed V during the speed reduction running, the regeneration is conducted at a further increased regeneration amount, thereby improving the fuel consumption.

In the illustrated embodiment, further, the hybrid control means 52 alters the regeneration amount depending on whether or not the fuel cut-off is executed in the engine 8. That is, the regeneration is conducted at the regeneration amount R depending on: a state under which no fuel cut-off is executed with the engine 8 autonomously rotating with no occurrence of drug torque: and another state under which the fuel cut-off is executed with occurrence of drug torque caused in the engine 8. This results in an increase in the regeneration amount with a resultant improvement in fuel consumption in comparison to a phase in which the regeneration is conducted at the regeneration amount R uniquely set to suit the state in which the fuel cut-off is executed.

Embodiment 5

In the illustrated embodiment mentioned above, the regeneration amount setting means 284 sets the regeneration amount R for the hybrid control means 52 to perform the regeneration control using the step-variable regeneration amount map A or the continuously variable regeneration amount map B. The step-variable regeneration amount map A or the continuously variable regeneration amount map B represent the relationships, predetermined based on whether or not the differential portion 11 is placed in the continuously variable shifting state during the speed reduction running, which differs from each other depending on the gear ratio γ of the automatic transmission portion 20. Further, the maps A or B differ from each other depending on: which of the switching clutch C0 or the switching brake B0 are coupled (locked) to provide the step-variable shifting state; or whether or not the fuel cut-off is initiated in the engine 8.

In the illustrated embodiment, furthermore, with the differential portion 11 placed in the non-continuously variable shifting state with no rotation of the engine 8 being halted, varying rotational resistance of the engine 8 makes it possible to increase or decrease the regeneration amount even at the same vehicle speed V. As used herein, the term "the same vehicle speed" refers to a phase in which, in other words, the rotational speed $N_E$ of the engine 8, forcibly rotated with the drive wheels 38, lies at the same speed. Hereunder, description is made of the control operation for varying rotational resistance of the engine 8.

Figure 31:
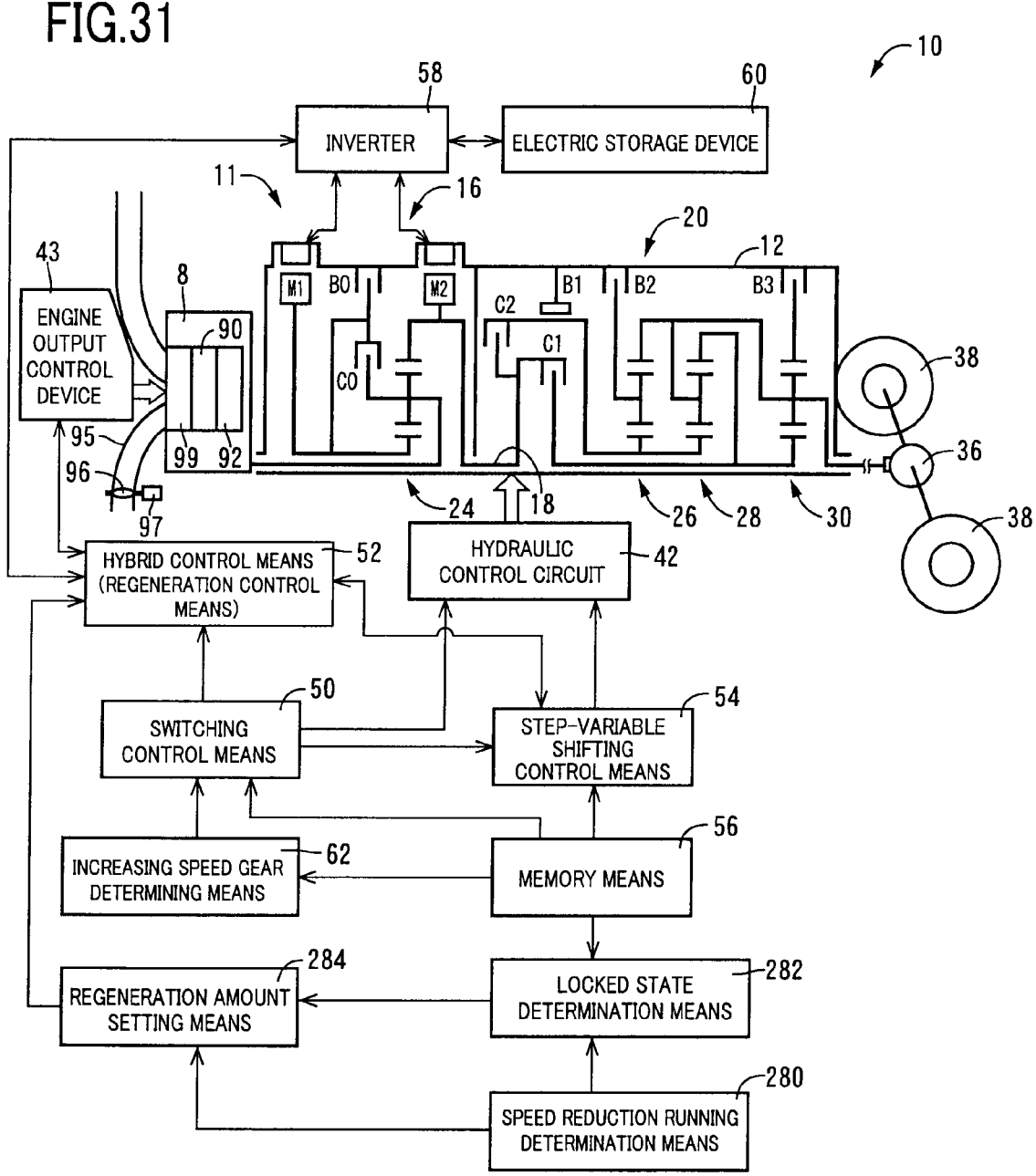
FIG. 31 is a functional block diagram illustrating another example of an essence of a control function to be executed with the electronic control device shown in FIG. 4, corresponding to FIG. 5, FIG. 26.

FIG. 31 is a functional block diagram, corresponding to FIGS. 5 and 18, which illustrates an essence of a control function to be executed by the electronic control device 40.

As shown in FIG. 31, the engine 8 includes a variable valve timing mechanism 90, operative to alter a timing at which an intake and exhaust valves are actuated, and a fuel injection valve 92 operative to supply fuel or interrupt the supply of fuel. A part of or a whole of cylinders are placed in a decompression state, i.e., an in-cylinder pressure variation suppression state and the fuel supply is interrupted for rendering the relevant cylinders halted. This causes an aerodynamic volume displacement to be substantially varied depending on a load state of the engine 8 for decreasing the fuel supply. That is, the engine 8 is an in-cylinder pressure variation suppression cylinder-number variable engine.

For instance, during the speed reduction running, the hybrid control means 52 outputs the command to the engine output control device 43 so as to obtain engine brake torque required for demanded brake torque $T_B^*$. This is because the variable valve timing mechanism 90 compels the decompression state to be obtained by a required in-cylinder pressure reduction control cylinder number $C_D$ for thereby executing an in-cylinder pressure reduction control. This causes a variation to take place in an in-cylinder pressure reduction control amount, i.e., a decompression amount of the engine 8. For instance, the decompression amount is caused to vary depending on the in-cylinder pressure reduction control cylinder number $C_D$ of the engine 8 that is placed in the decompression state. At the same engine rotation speed $N_E$, the greater the in-cylinder pressure reduction control cylinder number $C_D$, the greater will be the decompression amount with a resultant decrease in engine brake torque.

For instance, with the step-variable regeneration amount map A shown in FIG. 29, a broken line $A_{MAX}$ represents a case wherein all the cylinders are placed in the decompression state with the decompression amount being maximized and a broken line $A_{MIN}$ represents another case wherein none of all the cylinders are placed in the decompression state with the decompression amount being minimized. As will be apparent from the step-variable regeneration amount map A (inclusive of the broken line $A_{MAX}$ and the broken line $A_{MIN}$), the greater the decompression amount, the lower will be drag torque of the engine 8 with a resultant increase in the regeneration amount. Therefore, it is set such that the regeneration amount R increases at the same vehicle speed V. With the decompression amount varied in such a way, the regeneration amount is set in a range from the broken line $A_{MAX}$ and the broken line $A_{MIN}$.

With the continuously variable regeneration amount map B shown in FIG. 29, the engine 8 remains under the halted rotational state. This causes no variation in the regeneration amount based on the decompression amount during the in-cylinder pressure reduction control.

The regeneration amount setting means 284 sets the regeneration amount R for the hybrid control means 52 to perform the regeneration control. This setting is made based on the actual vehicle speed V by referring to the step-variable regeneration amount map A that is set based on the decompression amount for the engine 8 to perform the in-cylinder pressure reduction control during the speed reduction running.

Upon determination of the speed reduction running determination means 38 that the vehicle remains under the speed reduction running, the hybrid control means 52 allows the electric motor to perform the regeneration control so as to obtain the regeneration amount R of the electric motor set by the regeneration amount setting means 284 based on the decompression amount.

Thus, the hybrid control means 52 alters the regeneration amount R of the electric motor based on whether or not the differential portion 11 is placed in the differential state during the speed reduction running. In addition, with the engine 8 performing the in-cylinder pressure reduction control, the regeneration amount R of the electric motor is altered based on the decompression amount.

For instance, with the differential portion 11 placed in the continuously variable shifting state, the regeneration amount setting means 284 sets the regeneration amount R to be larger than that in which the continuously variable shifting state is placed. In addition, the regeneration amount R is set such that the greater the decompression amount when the engine 8 performs the in-cylinder pressure reduction control, the greater will be the regeneration amount R. Accordingly, as the decompression amount increases, the hybrid control means 52 increases the regeneration amount of the electric motor.

Thus, the regeneration amount is set depending on the decompression amount when the engine 8 performs the in-cylinder pressure reduction control during the speed reduction running. Accordingly, in contrast to a case where the engine 8 does not perform the in-cylinder pressure reduction control, the regeneration amount increases with an increase in the decompression amount to improve fuel consumption when the engine 8 performs the in-cylinder pressure reduction control. With no in-cylinder pressure reduction control performed by the engine 8, since drag torque of the engine 8 is liable to increase with a resultant decrease in the regeneration amount, the regeneration amount R is uniquely set.

For instance, SB3 in the flowchart, shown in FIG. 30, corresponds to the regeneration amount setting means 284 and the hybrid control means 52, i.e., a hybrid control step. In SB3, for instance, the regeneration amount R of the electric motor, i.e., the second electric motor M2 is set for the regeneration control during the speed reduction running based on the actual vehicle speed V by referring to the step-variable regeneration amount map A shown in FIG. 29. The electric motor performs the regeneration control so as to obtain the regeneration amount R of the electric motor at a preset value. In this moment, when the engine 8 performs the in-cylinder pressure reduction control, the regeneration amount R is caused to increase with the increase in the decompression amount.

Further, SB4 in the flowchart, shown in FIG. 30, corresponds to the regeneration amount setting means 284 and the hybrid control means 52, i.e., the hybrid control step. In SB4, since the engine 8 remains in the halted rotational state, no decompression amount for the in-cylinder pressure reduction control is considered.

As set forth above, the illustrated embodiment has the same advantages as those mentioned above. In addition to such effects, the hybrid control means 52 alters the regeneration amount based on the decompression amount when the engine 8 performs the in-cylinder pressure reduction control. Accordingly, even with the engine rotation speed $N_E$ remaining at the same level, the regeneration is performed at the regeneration amount R depending on the decompression amount for the in-cylinder pressure reduction control causing a variation in drag torque of the engine 8. As a result, the regeneration amount increases with resultant improvement in fuel consumption in comparison to a case wherein the regeneration is performed at the regeneration amount R uniquely set to suit the state with a reduction in decompression amount with likelihood of an increase in drag torque of the engine 8.

In the illustrated embodiment, sometimes the switch 44 is manually operated in place of automatic switching control operation being performed, causing a manually switching control to be performed on the shifting state of the automatic transmission portion 20. In this case, in step S2 of the flowchart shown in FIG. 13 for the illustrated embodiment described above, the determination is made whether or not the power distributing mechanism 16 is placed in the locked state, i.e., whether or not the differential portion 11 is placed in the non-continuously variable shifting state. Such a determination is made on a situation under which the switch 44 is manually operated to cause the power distributing mechanism 16 to be selected in the locked state, i.e., to cause the differential portion 11 to be selected in the non-continuously variable shifting state.

While the present invention has been described above in detail with reference to the illustrated embodiments shown in the drawings, the present invention may be applied in other modifications.

For instance, during the running of the vehicle on the ascending or descending road, the illustrated embodiment uses the shifting diagram shown in FIG. 10 with the respective shifting lines being altered to the high vehicle speed side gear position than that used for the given running state as shown in FIG. 6. However, likewise, during the running of the vehicle on the ascending or descending road, the shifting diagram, shown in FIG. 10, may be employed wherein the shifting lines for the step-variable shifting state and the continuously variable shifting state to be switched are altered to the low output torque side gear positions (i.e., to a lower opening degree side of an accelerator opening) than those used for the given running state, for instance, as shown in FIG. 6. Thus, the shifting lines are switched to the gear positions for the step-variable shifting state at the lower throttle opening degree than those in which the shifting lines are placed for the given running state, thereby suppressing load of the first electric motor M1. Moreover, the shifting diagram, shown in FIG. 10 for the ascending or descending road, may include a shifting diagram that inhibits the upshift to the maximum gear position. For instance, the upshift line 4→5, shown in FIG. 10, may be omitted.

In the illustrated embodiment described above, the locked state determination means 84 (step S4 in FIG. 14) determines whether or not the power distributing mechanism 16 is placed in the differential state depending on whether or not the continuously variable control area is present based on the vehicle condition by referring to, for instance, the shifting diagram shown in FIG. 6. However, the determination may be made whether or not the power distributing mechanism 16 is placed in the differential state based on the determination as to whether or not the switching control means 50 places the shifting mechanism 10 in the step-variable control area or the continuously variable control area.

For instance, in the illustrated embodiment, the shifting mechanism 10, 70 is structured, to enable the differential portion 11 (power distributing mechanism 16) to be switched in the differential state and the non-differential state, for the continuously variable shifting state functioning as the electrically continuously variable transmission and the step variable shifting state functioning as the step variable shifting transmission. However, the switching between the continuously variable shifting state and the step-variable shifting state is performed as one mode of placing the differential portion 11 in the differential state and the non-differential state. Even if, for instance, when placed in the differential state, the differential portion 11 may be arranged to function as a step-variable transmission with the shifting gear ratio thereof made variable, not in a continuous mode but in a stepwise mode.

In other words, the differential state/non-differential state and the continuously variable shifting state/step-variable shifting state of the shifting mechanism 10, 70 (differential portion 11, power distributing mechanism 16) do not necessarily fall in a one-on-one correspondence, and the shifting mechanism 10, 70 need not necessarily formed in a structure to enable the switching between the step variable shifting state and the continuously variable shifting state. The step variable shifting state means the power transmission via the mechanical transmitting path with no electric path.

In the above embodiment, as the coupling device for selectively switching the power transmitting path into the power transmissive state and the power interrupted state, the first clutch C1 and the second clutch C2 are employed, which constructs the part of the automatic transmission portion 20, 72 and are disposed between the automatic transmission portion 20, 72 and the differential portion 11. However, the coupling device is not necessarily the first clutch C1 and the second clutch C2, and at least one coupling device, enabling the power transmitting path into the power transmissive state and the power interrupted state, can be sufficiently employed. Such coupling device can be connected to for example the output shaft 22, or connected to the rotating member in the automatic transmission portion 20, 72. The coupling device does not necessarily construct the part of the automatic transmission portion 20, 72, and can be provided independent therefrom.

In the power distribution mechanisms 16 in the illustrated embodiments, the first carrier CA1 is fixed to the engine 8, and the first sun gear S1 is fixed to the first electric motor M1, and the first ring gear R1 is fixed to the transmitting member 18. However, such connecting arrangement is not essential, and the engine 8, first electric motor M1 and transmitting member 18 are fixed to respective ones of the three elements CA1, S1 and R1 of the first planetary gear set 24.

Although in the illustrated embodiments, the engine 8 is directly connected to the input shaft 14, it may be operatively connected via gears, belts or the like. The engine 8 and the input shaft 14 are not necessarily disposed coaxially.

In the illustrated embodiments, the first electric motor M1 and the second electric motor M2 are disposed coaxially with the drive apparatus input shaft 14, the first electric motor M1 is fixed to the first sun gear S1, and the second electric motor M2 is fixed to the transmitting member 18. However, such arrangement is not essential. For example, the first electric motor M1 may be fixed to the first sun gear S1 through gears, a belt or the like, and the second electric motor M2 may be fixed to the transmitting member 18.

A mode where the second electric motor M2 is connected to the transmitting member 18 or the output member 22 via the gear, belt and speed reducer is one mode for transmitting the power transmitting path from the transmitting member to the drive wheels.

Although the power distributing mechanism 16 is provided with both the switching clutch C0 and the switching brake B0, it need not be provided with both of them, and may be provided with only one of the switching clutch C0 and brake B0. Although the switching clutch C0 selectively connects the sun gear S1 and carrier CA1 to each other, it may selectively connect the sun gear S1 and ring gear R1 to each other, or the carrier CA1 and ring gear R1. In essence, the switching clutch C0 sufficiently connects any two of the three elements of the first planetary gear set 24.

The switching clutch C0 in the embodiment is engaged to establish the neutral position "N" in the shifting mechanism 10, 70, but the neutral position need not be established by engagement thereof.

The hydraulic-type frictionally engaging devices such as the switching clutch C0 and switching brake B0 may be an engaging device of a magnetic-powder type, an electromagnetic type or a mechanical type, such as a powder (magnetic powder) clutch, an electromagnetic clutch and a meshing type dog clutch.

In the illustrated embodiment, further, the automatic transmission portion 20, 72 is disposed in the power transmitting path between the transmitting member 18 serving as the output member of the differential portion 11, that is the power distributing mechanism 16 and the drive wheels 38. However, a power transmitting device of the other type such as a manual transmission of a well-known constantly meshed type including two parallel shafts, and being automatically switched the gear positions thereof by the select ring and the shift cylinder, can be employed.

In the illustrated embodiment, furthermore, while the automatic transmission portion 20, 72 is connected to the differential portion 11 in series via the transmitting member 18, a countershaft may be provided in parallel to the input shaft 14 to allow the automatic transmission portion 20, 72 to be coaxially disposed on an axis of the countershaft. In this case, the differential portion 11 and the automatic transmission portion 20, 72 are connected to each other in power transmitting capability via a set of transmitting members structured of, for instance, a counter-gear pair acting as the transmitting member, a sprocket and a chain.

The power distributing mechanism 16 in the illustrated embodiment can be comprised of for example a pinion driven and rotated by the engine, and a differential gear set having a pair of bevel gears meshed with the pinion being operatively connected to the first electric motor M1 and the second electric motor M2.

The power distributing mechanism 16 in the illustrated embodiment comprised of one paired planetary gear units, may be comprised of two or more pairs planetary gear units to function in the non-differential state (fixed speed state) as the transmission having three or more speed positions. The planetary gear unit is not limited to the single-pinion type, but can be the double-pinion type.

The switch 44 in the illustrated embodiment is of the see-saw type. However, switches capable of being selectively switched to one of the continuously variable shifting running (differential state) and the step variable shifting running (non-differential state) can be employed. That is, a pressing type switch; two pressing type switches which can hold the state selectively pressed; a lever type switch; and a sliding type switch, can be provided. In addition to the switch 44 having single neutral position, a switch having two shifting positions for making the selected state thereof valid and invalid can be provided, independent from the switch 44, can be employed. Instead of, or in addition to the switch 44, following devices can be employed. That is, the devices capable of being selectively switched to one of the continuously variable shifting running (differential state) and the step-variable shifting running (non-differential state), in response not to the manual manipulation but to the driver's voice, and the device switched by the manipulation by foot, can be employed.

In the illustrated embodiment, for instance, the target speed reduction magnitude control means 184 obtains the torque component, unavailable to be obtained with regeneration torque, with engine brake torque as a matter of high priority so as to obtain demanded brake torque $T_B^*$ for achieving the target speed reduction magnitude $G^*$. However, brake torque may be obtained using, in addition to engine brake torque, the other brake devices such as wheel brakes or the like provided in the drive wheels. However, the order of the wheel brakes or the like has low priority.

With the engine 8 in the illustrated embodiment, further, during a compression stroke of the four cycle engine, the cylinder may be rendered operative under a decompression state upon opening the intake valve or the exhaust valve or upon deviating timings at which the intake valve or the exhaust valve are actuated for thereby achieving the in-cylinder pressure variation suppression state.

However, in place of or in addition to the decompression state, the throttle opening may be positively opened during a period in which an in-cylinder capacity of a cylinder expands, i.e., for instance, during an intake stroke besides the cylinder operating on the compression stroke of the four cycle engine. This suppresses the occurrence of a vacuum to minimize a variation in in-cylinder pressure for thereby minimizing rotational resistance of the crankshaft. This allows a reduction in pumping loss of the engine 8. Besides, the engine 8 may take the form of a structure available to disconnect a mechanical coupling between the crankshaft and the piston to halt a reciprocating motion of the piston for achieving the in-cylinder pressure variation suppression state.

In the illustrated embodiment, moreover, the hybrid control means 52 employs the second electric motor as the electric motor during the operation in the regeneration mode. With the differential portion 11 placed in the continuously variable shifting state, the power transmitting path is mechanically coupled between the engine 8 and the drive wheels 38 to cause the drive wheels 38 to rotate the first electric motor M1.

Therefore, with the differential portion 11 placed in the non-differential state (in step-variable state), the first electric motor M1 and/or the second electric motor M2 may be used for regeneration purposes. Further, the drive apparatus may further include an electric motor, available to be rotated with the drive wheels, i.e., for instance, a third electric motor M3 besides the first electric motor M1 and/or the second electric motor M2. Under such a structure, during the regeneration mode, the hybrid control means 52 may performs the regeneration mode using the third electric motor M3 as the electric motor in place of or in addition to the first electric motor M1 and/or the second electric motor M2. Examples of such a third electric motor M3 may include a starter motor, operatively coupled to the engine 8, an electric motor operatively disposed on the output shaft 22 and electric motors, etc., for driving drive wheels (second drive wheels) different from the drive wheels 38.

In the illustrated embodiment mentioned above, furthermore, each of the automatic transmission portions 20, 70 is interposed in the power transmitting path between the transmitting member 18, acting as the output member of the differential portion 11 or the power distributing mechanism 16, and the drive wheels 38. However, the drive apparatus may include a power transmitting apparatus (transmission) of another type such as, for instance, a continuously variable transmission (CVT) forming one kind of an automatic transmission, an automatic transmission, formed in a normally meshing parallel two-shaft type well known as a manual transmission, in which a select cylinder or a shift cylinder is actuated to automatically shift the gear positions, and a manual transmission of a synchronizing mesh type with a gear position available to be manually shifted. With the continuously variable transmission (CVT) being employed, rendering the power transmitting mechanism 16 operative under a fixed shifting state allows a step-variable shifting state to be placed as a whole. As used herein, the term "step-variable shifting state" refers to a state in which drive power is transmitted mainly through a mechanical transmitting path without using an electric path. Besides, the continuously variable transmission may take the form of a structure wherein a plurality of preliminarily fixed gear ratios are stored in conformity to gear positions of the step-variable transmission whereby the automatic transmission portion 20, 70 performs the shifting using such a plurality of fixed gear ratios.

Alternatively, the present invention may be implemented without necessarily providing the automatic transmission portion 20, 70.

The switch device 46 in the illustrated embodiment has the shift lever 48 to be manipulated for selecting one of a plurality of shift positions. However, instead of such shift lever 48, following switch or device can be employed. That is, a switch being comprised of a pressing type switch and a sliding type switch and being selected to one of a plurality of shift positions; a device being selected to one of a plurality of shift positions in response not to the manipulation by the hand but to the driver's voice; and a device being selected to one of a plurality of shift positions in response to the manipulation by the foot, can be employed.

In the illustrated embodiment, the shifting range is established by manipulation of the shift lever 48 to the "M" position, but the shifting position i.e., speed position can be established by setting of the shifting step that is the maximum speed step for each shifting range. In this case, in the automatic transmission portion 20, 72, the shifting position is switched for executing the shifting action. For example, when the manual manipulation of the shift lever 48 to a shift-up position "+" and a shift-down position "−" at the "M" position is executed, any of the first gear position to the fourth gear position is set by the manipulation of the shift lever 48 in the automatic transmission portion 20.

Needless to say, above mentioned are mere illustration of the embodiments, and accordingly the present invention can be carried out in the various altered or improved modes based on knowledge of the skilled person in this technical field.

The invention claimed is:

1. A control device for a vehicular drive apparatus,
   the vehicular drive apparatus having a continuously variable shifting portion including a differential mechanism for distributing an output of an engine to a first electric motor and a transmitting member and a second electric motor configured to transmit power to a drive wheel and to receive power from the drive wheel to be operative as an electrically controlled continuously variable transmission, and a shifting portion disposed in a power transmitting path between the engine and the drive wheel, and
   the control device comprising:
   a differential state switch device disposed in the differential mechanism and operative to selectively switch the continuously variable shifting portion in a continuously variable shifting state enabling the continuously variable shifting portion to perform an electrically controlled continuously variable shifting operation and a non-continuously variable shifting state disenabling the electrically controlled continuously variable shifting operation of the continuously variable shifting portion;
   shifting control means operative to set a total speed ratio, defined with the continuously variable shifting portion and the shifting portion, to a lower vehicle speed side gear ratio than that defined for a given running condition of a vehicle when a need arises for a greater vehicle drive force or drive force source brake than those for the given running condition of the vehicle; and
   switching control means operative to switch the continuously variable shifting portion from the continuously variable shifting state to the non-continuously variable shifting state if a required vehicle drive force or drive force source brake is unavailable when the shifting control means sets the total speed ratio to the lower vehicle speed side gear ratio than that defined for the given running condition of the vehicle.

2. A control device for a vehicular drive apparatus according to claim 1, wherein the need arises for the greater vehicle drive force or drive force source brake than those required for the given running condition of the vehicle when the vehicle runs on an ascending road or a descending road.

3. A control device for a vehicular drive apparatus,
   the vehicular drive apparatus having a continuously variable shifting portion including a differential mechanism for distributing an output of an engine to a first electric motor and a transmitting member and a second electric motor configured to transmit power to a drive wheel and to receive power from the drive wheel to be operative as an electrically controlled continuously variable transmission, and a shifting portion disposed in a power transmitting path between the engine and the drive wheel,
   the control device comprising:
   a differential state switch device disposed in the differential mechanism and operative to selectively switch the continuously variable shifting portion in a continuously variable shifting state enabling the continuously variable shifting portion to perform an electrically controlled continuously variable shifting operation and a non-continuously variable shifting state disenabling the electrically controlled continuously variable shifting operation of the continuously variable shifting portion;
   shifting control means operative to set a total speed ratio, defined with the continuously variable shifting portion and the shifting portion, to a lower vehicle speed side gear ratio than that defined for a given running condition of a vehicle when a need arises for a greater vehicle drive force or drive force source brake than those for the given running condition of the vehicle; and
   switching control means operative to switch the continuously variable shifting portion from the continuously variable shifting state to the non-continuously variable shifting state if load torques of the first electric motor and/or the second electric motor are deviated from allowable ranges when the shifting control means sets the total speed ratio to the lower vehicle speed side gear ratio than that defined for the given running condition of the vehicle.

4. A control device for a vehicular drive apparatus according to claim 3, wherein the need arises for the greater vehicle drive force or drive force source brake than those required for the given running condition of the vehicle when the vehicle runs on an ascending road or a descending road.

5. A control device for a vehicular drive apparatus,
   the vehicular drive apparatus having a continuously variable shifting portion including a differential mechanism for distributing an output of an engine to a first electric motor and a transmitting member and a second electric motor configured to transmit power to a drive wheel and to receive power from the drive wheel to be operative as an electrically controlled continuously variable transmission, the control device comprising:
- a differential action limitation device disposed in the differential mechanism for limiting a differential action of the differential mechanism to thereby limit an operation of the continuously variable shifting portion as the electrically controlled continuously variable transmission; and
- engine brake control means operative to continuously vary the differential action of the differential mechanism by the differential action limitation device to obtain brake torque with engine brake during a speed reduction running.

6. A control device for a vehicular drive apparatus according to claim 5, wherein the engine brake control means is operative to place the differential mechanism of the continuously variable shifting portion in a non-differential state during the speed reduction running.

7. A control device for a vehicular drive apparatus according to claim 5, wherein the engine is configured to perform an in-cylinder pressure variation suppression operation, and
the engine brake control means varies an in-cylinder pressure variation suppression amount of the engine during the speed reduction running.

8. A control device for a vehicular drive apparatus according to claim 5, further comprising target speed reduction magnitude control means operative to determine brake torque to be effectuated by an engine brake, depending on whether or not the second electric motor is configured to regenerate to obtain the target speed reduction magnitude of the vehicle during the speed reduction running, and
wherein the target speed reduction magnitude control means serves to limit a differential action of the differential mechanism so as to obtain brake torque with the engine brake.

9. A control device for a vehicular drive apparatus according to claim 6, wherein the engine is configured to perform an in-cylinder pressure variation suppression operation, and
the engine brake control means varies an in-cylinder pressure variation suppression amount of the engine during the speed reduction running.

10. A control device for a vehicular drive apparatus,
the vehicular drive apparatus having a differential portion including a differential mechanism for distributing an output of an engine to a first electric motor and a transmitting member and a second electric motor configured to transmit power to a drive wheel and to receive power from the drive wheel,
the control device comprising:
- a differential action limitation device disposed in the differential mechanism for limiting a differential action of the differential mechanism to thereby limit a differential action of the differential portion; and
- engine brake control means operative to continuously vary the differential action of the differential portion by the differential action limitation device to obtain brake torque with engine brake during the speed reduction running.

11. A control device for a vehicular drive apparatus according to claim 10, wherein the engine brake control means places the differential portion in a non-differential state inoperative to perform the differential action during the speed reduction running.

12. A control device for a vehicular drive apparatus according to claim 10, wherein
the engine is configured to perform an in-cylinder pressure variation suppression operation, and
the engine brake control means varies an in-cylinder pressure variation suppression amount during the speed reduction running.

13. A control device for a vehicular drive apparatus according to claim 10, further comprising target speed reduction magnitude control means for determining brake torque with an engine brake, depending on whether or not the second electric motor is operative to regenerate, so as to allow the vehicle to obtain a target speed reduction magnitude during the speed reduction running, and
wherein the engine brake control means limits a differential action of the differential portion so as to obtain brake torque with the engine brake.

14. A control device for a vehicular drive apparatus according to claim 11, wherein
the engine is configured to perform an in-cylinder pressure variation suppression operation, and
the engine brake control means varies an in-cylinder pressure variation suppression amount during the speed reduction running.

15. A control device for a vehicular drive apparatus,
the vehicular drive apparatus having a differential portion including a differential mechanism for distributing an output of an engine to a first electric motor and a transmitting member and a second electric motor configured to transmit power to a drive wheel and to receive power from the drive wheel,
the control device comprising:
- a differential state switch device disposed in the differential mechanism for selectively switching the differential portion to a differential state enabling a differential action and a non-differential state disenabling the differential action; and
- regeneration control means for altering a regeneration amount depending on whether or not the differential portion is placed in the differential state during the speed reduction running such that the regeneration amount is larger in the differential state of the differential portion than in the non-differential state of the differential portion.

16. A control device for a vehicular drive apparatus according to claim 15, wherein the engine is configured to perform an in-cylinder pressure variation suppression control, and
the regeneration control means alters a regeneration amount based on an in-cylinder pressure variation suppression control amount appearing when the engine performs the in-cylinder pressure variation suppression control.

17. A control device for a vehicular drive apparatus according to claim 15, wherein the regeneration control means is operative to alter the regeneration amount depending on whether or not a fuel supply to the engine is stopped.

18. A control device for a vehicular drive apparatus according to claim 16, wherein the regeneration control means is operative to alter the regeneration amount depending on whether or not a fuel supply to the engine is stopped.

* * * * *